(12) United States Patent
Evans et al.

(10) Patent No.: US 11,158,004 B2
(45) Date of Patent: Oct. 26, 2021

(54) PROPERTY ASSESSMENT USING A VIRTUAL ASSISTANT

(71) Applicant: EIG Technology, Inc., Spokane, WA (US)

(72) Inventors: Jason D. Evans, Glen Rose, TX (US); Andrew J. Mccall, Spokane Valley, WA (US); Ann M. Foreyt, Spokane, WA (US); Fred A. Brown, Colbert, WA (US)

(73) Assignee: EIG Technology, Inc., Spokane, WA (US)

( * ) Notice: Subject to any disclaimer, the term of this patent is extended or adjusted under 35 U.S.C. 154(b) by 0 days.

(21) Appl. No.: 16/672,872

(22) Filed: Nov. 4, 2019

(65) Prior Publication Data

US 2020/0143481 A1 May 7, 2020

Related U.S. Application Data

(60) Provisional application No. 62/755,950, filed on Nov. 5, 2018.

(51) Int. Cl.
*G06Q 40/08* (2012.01)
*G06N 3/00* (2006.01)
*G01S 19/51* (2010.01)

(52) U.S. Cl.
CPC .............. *G06Q 40/08* (2013.01); *G01S 19/51* (2013.01); *G06N 3/006* (2013.01)

(58) Field of Classification Search
CPC ...... H04W 4/90; H04W 76/50; B64C 39/024; B64C 2201/128; B64C 2201/027; H04Q 9/00; G06Q 40/00; G06Q 40/08; G08B 25/016; H04M 3/5116; H04M 2203/355; G10L 15/18; G10L 15/26; G06F 16/90332
USPC .................................................. 705/4, 35–45
See application file for complete search history.

(56) References Cited

U.S. PATENT DOCUMENTS

| | | | |
|---|---|---|---|
| 6,504,908 B1 * | 1/2003 | Bellomo | ................ H04M 11/04 |
| | | | 379/38 |
| 7,103,585 B2 * | 9/2006 | Jowell | ..................... G06N 5/02 |
| | | | 706/45 |
| 8,346,578 B1 * | 1/2013 | Hopkins, III | ......... G06Q 40/00 |
| | | | 382/100 |

(Continued)

OTHER PUBLICATIONS

Kepuska, Veton; Bohouta, Gamal, "Next Geneation of Virtual Personal Assistants (Microsoft Cortana, Apple Siri, Amazon Alexa, and Google Home)", IEEE, Xplore, Feb. 22, 2018, pp. 99-103. (Year: 2018).*

(Continued)

*Primary Examiner* — Mohammad Z Shaikh
(74) *Attorney, Agent, or Firm* — Chang & Hale LLP

(57) ABSTRACT

Techniques and architectures for providing notifications regarding events, such as hurricanes, tornados, fires, floods, earthquakes, and so on, are discussed herein. For example, a user interface may be displayed with a map of a geographical area, an event visual representation representing an event, and an impact visual representation indicating an impact area where the event is estimated to impact. A request may be received to notify users associated with the impact area and customized notifications may be sent to users associated with the impact area. The customized notifications may be based on policy data for the users.

19 Claims, 26 Drawing Sheets

(56) References Cited

U.S. PATENT DOCUMENTS

| | | | | |
|---|---|---|---|---|
| 8,635,135 | B2* | 1/2014 | Stevenson | G06N 3/006 |
| | | | | 705/35 |
| 8,977,237 | B1* | 3/2015 | Sander | H04W 4/12 |
| | | | | 455/411 |
| 8,990,333 | B2* | 3/2015 | Johnson | H04L 12/1895 |
| | | | | 709/207 |
| 9,025,756 | B1* | 5/2015 | Graham | H04M 3/523 |
| | | | | 379/265.02 |
| 9,071,366 | B2* | 6/2015 | Gotoh | G08B 25/016 |
| 9,218,432 | B2* | 12/2015 | Miasnik | H04L 63/08 |
| 9,246,610 | B2* | 1/2016 | Johnson | H04L 12/1845 |
| 9,247,408 | B2* | 1/2016 | South | H04W 4/90 |
| 9,262,908 | B2* | 2/2016 | Mohler | G08B 27/005 |
| 9,280,759 | B2* | 3/2016 | Roth | G06F 3/048 |
| 9,292,805 | B2* | 3/2016 | Rochet | G06Q 50/10 |
| 9,509,424 | B2* | 11/2016 | Sasaki | G08B 27/006 |
| 9,572,002 | B2* | 2/2017 | South | G08B 27/006 |
| 9,600,997 | B1* | 3/2017 | Abrahams | G08B 21/10 |
| 9,728,052 | B2* | 8/2017 | Huh | G08B 7/066 |
| 9,824,188 | B2* | 11/2017 | Brown | G06F 3/167 |
| 9,892,463 | B1* | 2/2018 | Hakimi-Boushehri | |
| | | | | G06Q 40/08 |
| 9,898,912 | B1 | 2/2018 | Jordan et al. | |
| 9,928,553 | B1 | 3/2018 | Harvey et al. | |
| 10,037,668 | B1* | 7/2018 | DesGarennes | G08B 21/0415 |
| 10,134,092 | B1* | 11/2018 | Harvey | G06Q 40/08 |
| 10,212,570 | B1* | 2/2019 | Ramalingam | H04L 51/18 |
| 10,306,059 | B1* | 5/2019 | Bondareva | H04M 3/5166 |
| 10,387,961 | B1* | 8/2019 | Burgess | G06Q 40/08 |
| 10,410,509 | B2* | 9/2019 | Berry | G08B 25/016 |
| 10,419,489 | B2* | 9/2019 | Kalia | H04L 63/20 |
| 10,424,185 | B2* | 9/2019 | Cordes | G08B 25/10 |
| 2001/0032140 | A1* | 10/2001 | Hoffman | G06Q 30/02 |
| | | | | 705/26.43 |
| 2005/0080702 | A1 | 4/2005 | Modi | |
| 2007/0216535 | A1* | 9/2007 | Carrino | G06Q 10/10 |
| | | | | 340/573.1 |
| 2008/0001735 | A1* | 1/2008 | Tran | G06F 19/00 |
| | | | | 340/539.22 |
| 2008/0208721 | A1* | 8/2008 | Bertogg | G06Q 40/08 |
| | | | | 705/35 |
| 2009/0247113 | A1* | 10/2009 | Sennett | H04W 4/90 |
| | | | | 455/404.1 |
| 2009/0286502 | A1* | 11/2009 | Sennett | H04L 12/1895 |
| | | | | 455/404.1 |
| 2009/0286505 | A1* | 11/2009 | Kirk | G01C 21/20 |
| | | | | 455/404.2 |
| 2009/0309742 | A1* | 12/2009 | Alexander | G08B 27/006 |
| | | | | 340/601 |
| 2011/0196810 | A1* | 8/2011 | Bertogg | G06Q 40/06 |
| | | | | 705/36 R |
| 2012/0041903 | A1* | 2/2012 | Beilby | G06N 3/004 |
| | | | | 706/11 |
| 2013/0283168 | A1* | 10/2013 | Brown | G06F 3/04842 |
| | | | | 715/728 |
| 2013/0346333 | A1* | 12/2013 | Hassler | G06Q 10/107 |
| | | | | 705/325 |
| 2014/0074454 | A1* | 3/2014 | Brown | G06F 3/167 |
| | | | | 704/9 |
| 2014/0244266 | A1* | 8/2014 | Brown | G10L 15/22 |
| | | | | 704/275 |
| 2014/0245165 | A1* | 8/2014 | Battcher | G06Q 10/10 |
| | | | | 715/738 |
| 2015/0046194 | A1* | 2/2015 | Waddell | G06Q 40/04 |
| | | | | 705/4 |
| 2016/0071399 | A1* | 3/2016 | Altman | H04W 4/029 |
| | | | | 340/539.11 |
| 2017/0023702 | A1* | 1/2017 | Smyth | G01W 1/02 |
| 2017/0032466 | A1* | 2/2017 | Feldman | G06F 16/248 |
| 2017/0083622 | A1* | 3/2017 | Blanco | H04L 65/4069 |
| 2017/0283950 | A1* | 10/2017 | Takeda | C23C 16/50 |
| 2017/0289350 | A1* | 10/2017 | Philbin | H04L 67/146 |
| 2018/0075712 | A1* | 3/2018 | Field | G10L 17/22 |
| 2018/0197059 | A1* | 7/2018 | Kune | H01Q 1/2208 |
| 2018/0253954 | A1* | 9/2018 | Verma | G06F 3/017 |
| 2018/0310159 | A1* | 10/2018 | Katz | H04M 3/4217 |
| 2019/0043501 | A1* | 2/2019 | Ramaci | G16H 40/63 |
| 2019/0141463 | A1* | 5/2019 | Cabouli | B64C 39/024 |
| 2019/0166071 | A1* | 5/2019 | Lim | G06F 16/3329 |
| 2019/0174289 | A1* | 6/2019 | Martin | H04W 4/90 |
| 2019/0188797 | A1* | 6/2019 | Przechocki | G06N 20/00 |
| 2019/0251830 | A1* | 8/2019 | Guerreiro | G06F 16/9035 |
| 2019/0295544 | A1* | 9/2019 | Garcia | G06F 40/30 |
| 2019/0318283 | A1* | 10/2019 | Kelly | G06N 20/00 |
| 2019/0391827 | A1* | 12/2019 | Simanovich | G06F 9/453 |
| 2020/0059776 | A1* | 2/2020 | Martin | H04M 1/72424 |

OTHER PUBLICATIONS

International Search Report and Written Opinion of ISA dated Jan. 15, 2020 for PCT/US2019/059704, 16 pages.

Notification of Transmittal of the International Search Report and the Written Opinion of the International Searching Authority for PCT/US2019/059704, dated Jan. 15, 2020, 1 page.

* cited by examiner

```
                                    500
```

```
┌─────────────────────────────────────────────────────────────┐
│ Obtain a behavior profile for a user, the behavior profile   │
│ including preferences of the user for receiving information  │
│                           502                                │
└─────────────────────────────────────────────────────────────┘
                              │
                              ▼
┌─────────────────────────────────────────────────────────────┐
│        Receive property information for property of the user │
│                           504                                │
└─────────────────────────────────────────────────────────────┘
                              │
                              ▼
┌─────────────────────────────────────────────────────────────┐
│ Update the property information according to a schedule for │
│ the property and/or responsive to an event occurring that   │
│ involves the property                                       │
│                           506                                │
└─────────────────────────────────────────────────────────────┘
                              │
                              ▼
┌─────────────────────────────────────────────────────────────┐
│ Generate a notification based on the schedule for the       │
│ property or responsive to the event                         │
│                           508                                │
└─────────────────────────────────────────────────────────────┘
                              │
                              ▼
┌─────────────────────────────────────────────────────────────┐
│   Deliver the notification according to the behavior profile │
│                         of the user                          │
│                           510                                │
└─────────────────────────────────────────────────────────────┘
```

FIG. 5

PROPERTY ASSESSMENT USING A VIRTUAL ASSISTANT

CROSS-REFERENCE TO RELATED APPLICATIONS

This application claims priority to U.S. Provisional Application No. 62/755,950, filed Nov. 5, 2018, and entitled "Virtual Insurance Assistant and Concierge," the entire contents of which are incorporated herein by reference.

BACKGROUND

Systems for managing property, facilitating insurance claims, and performing a variety of other functions are often time consuming, use many resources, and introduce error. For instance, insurance systems that provide security and compensation for loss health, life, home, automobiles, and other forms of property require many hours, communication resources, and/or computational resources to process a claim. In one example, a response to a loss event, such as damage to property, requires that users make themselves available for a claims adjuster to visit the location of the damaged property. In this example, the user may be required to submit information to their insurance company (and/or the insurance companies of others involved in the loss event) numerous different times, resulting in user frustration and error.

Further, systems that facilitate maintenance and upkeep of property (e.g., home appliances, home heating and cooling systems, automobiles, etc.) are implemented with limited information and/or limited access to such information. For example, such systems only provide access to information in piecemeal format, such as in hard-copy user manuals and scattered on various webpages, if it is available at all. Without this information easily accessible to users, users often fail to perform these duties or perform them incorrectly, which often result in time and resource loss when the property fails.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 5 illustrates an example process flow of generating a notification for property and delivering the notification based on a behavior profile of a user in accordance with various embodiments.

DETAILED DESCRIPTION

Figure 1:
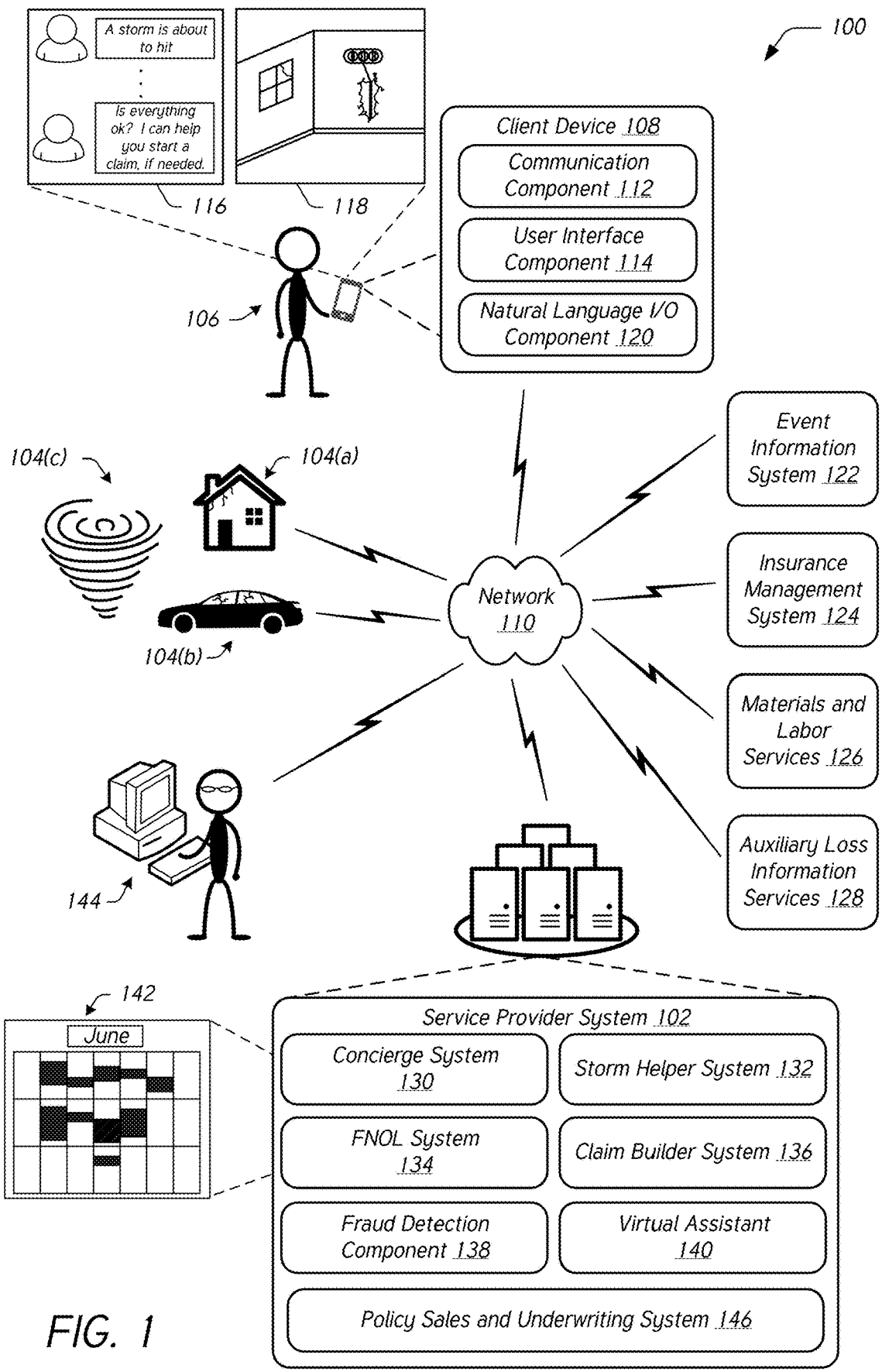
FIG. 1 illustrates an example computer-based virtual insurance assistant and concierge system in accordance with one or more embodiments.

Various non-limiting embodiments of the present disclosure will now be described to provide an overall understanding of the principles of the structure, function, and use of the virtual insurance assistant and concierge systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The presently disclosed example embodiments are generally directed to systems and techniques for utilizing natural language understanding, object recognition in digital images, human behavior profiling, and so on, to facilitate property maintenance, event handling (e.g., for fires, floods, hurricanes, tornadoes, etc.), and/or insurance responses. The systems and techniques generally allow a user to interact with an automated system to manage and maintain their property, prepare for or react to an event, efficiently provide an insurer with a notice of loss, receive an insurance claim estimate, and/or perform a variety of other functions without necessarily having to interact with a human insurance agent, materials suppliers, contractors for labor, and/or the like. In many examples, the systems and techniques may implement a virtual assistant that communicates with a user to facilitate such functionality. Although many examples are discussed in the context of managing damage caused by an event, such as a fire, flood, hurricane, tornado, etc., the systems and techniques may be used in a wide variety of contexts and applications without departing from the scope of this disclosure. For example, the systems and techniques may be used to remodel a property, decorate a property, and so forth.

For purposes of this application, the terms "insured," "policyholder," "member," "customer," and "user" may be used interchangeably and refer to an individual or group that participates in the techniques or systems disclosed herein. The terms "provider," "insurer," and "insurance agency" may be used interchangeably and refer to any individual, group, partnership, corporation, company, agency, or other entity that provides insurance services to customers.

As described in more detail below, in many examples, a virtual assistant (also referred to as a virtual agent or intelligent personal assistant) may be output to a user to facilitate various functions. The virtual assistant may be output in any suitable format, such as a virtual assistant on a web site with a text interface (e.g., a chatbot), a virtual assistant application on a mobile device, or a speech interface, for example. The virtual assistant may be output by displaying data (e.g., an icon or other information representing a virtual assistant), outputting audio (e.g., a response, a request, etc.), and so on. In some embodiments, the virtual assistant comprises a natural language dialog system that interacts with the user. A natural language dialog system is generally an automated system that is intended to engage a human in a conversation (using any of several modalities of input, such as text, touch, speech, gesture, etc.) for the purpose of helping the human achieve some goal. Oftentimes, a single input from a user does not contain sufficient information to allow a virtual assistant to provide a meaningful response. In such cases, the natural language dialog system may engage the user in a dialog to prompt the user to provide more information. This "back and forth" between the virtual assistant and the user continues until the virtual assistant has collected sufficient information to allow it to provide a meaningful response.

In some examples, a user may interact with a concierge system to determine how to subsequently promote the user to behave a certain way. For example, the concierge system may learn over time through interacting with a user to how to motivate the user to perform maintenance operations more regularly on a home, vehicle, or other property. For instance, some users respond a higher percentage of the time (e.g., greater than a threshold) to reminders on a digital calendar application, while other users respond a higher percentage of the time to text message reminders, and still others respond a higher percentage of the time if performing an action will result in a reward of some kind. From the learning, the concierge system may create a behavior profile, which is then used to motivate the user to perform the desired actions (e.g., consistently performing maintenance on the user's property). By performing regular maintenance, the user's property may be less likely to break down and may have a longer life than would otherwise occur with irregular and infrequent maintenance.

Additionally, or alternatively, in some examples, a user may interact with a storm helper system to provide the user with information regarding an event, such as a fire, flood, hurricane, etc. The information provided to the user by the storm helper system may include information that is relevant and personalized to the user, along with being specific to a particular event. The storm helper system may provide the user with relevant information before an event, such as a fastest evacuation route from the user's current location. The storm helper system also may provide the user with relevant information after an event, such as when it is safe to return to the user's home. The information provided to the user by the storm helper system may take a variety of forms based on preferences of the user, such as text message, email, a social media notification (e.g., Facebook® message), phone call, and so forth.

Further, in some examples, a user may interact with a first notice of loss (FNOL) system to notify an insurance company of a loss to property. A loss to property (or simply "loss" as used herein) generally is damage to property that results in a decrease in value of the property from a previous state. Examples of loss to property include vehicle accidents and/or damage to a home or other structure by an event. An event may be caused by nature, such as a hurricane, tornado, fire, etc. and/or may be caused by human activity, such as theft, fire, or other destruction. The FNOL system may guide the user through the notification of loss, typically without an insurance agent involved, thus allowing the user to document the first notice of loss immediately upon the loss occurring and without having to schedule an appointment with an insurance agent. The FNOL system may prompt the user through the necessary information to document the loss, such as through digital images, measurements, and/or qualitative or quantitative descriptions of the damage. The FNOL system may further prioritize the loss incurred by the user with notices of loss provided by other users for dispatch of insurance adjusters and/or repair personnel, thus efficiently allocating resources where they are most needed.

Moreover, in some examples, a user may interact with a claim builder system to document loss to property and/or provide the user with a claim estimate to remedy the loss. The claim builder system may leverage data obtained from a digital image of the loss, along with other information provided by the user, to generate outputs (e.g., natural language responses) that the user can understand in order to obtain information that will influence generating the claim estimate. The claim builder system can then narrow options for the user on materials and/or labor to be included in the claim estimate and can price materials and/or labor suitable for the claim estimate using available pricing information or by contacting materials and labor suppliers directly.

Example Environment

FIG. 1 is an illustration of an environment 100 in an example implementation that is operable to employ techniques described herein. The illustrated environment 100 includes a service provider system 102, items of property 104(a) and 104(b), an event 104(c) occurring at or near the items of property, a user 106, and a plurality of client devices, an example of which is illustrated as client device 108. These devices are communicatively coupled, one to another, via a network 110 and may be implemented as a computing device that may assume a wide variety of configurations.

A computing device, for instance, may be configured as a laptop computer, a desktop computer, a server, a smart phone, an electronic reader device, a mobile handset, a personal digital assistant (PDA), a portable navigation device, a portable gaming device, a VR device (e.g., VR headset), a tablet computer, a wearable computer (e.g., a watch, an optical head-mounted display (OHMD), etc.), a portable media player, a television, a set-top box, a computer system in a car, an appliance, a camera, a robot, a hologram system, a security system, a home-based computer system (e.g., intercom system, home media system, etc.), a projector, an automated teller machine (ATM), and so on. Thus, the computing device may range from full resource devices with substantial memory and processor resources (e.g., personal computers, game consoles) to a low-resource device with limited memory and/or processing resources (e.g., mobile devices, in some cases). Additionally, although a single computing device is shown, a computing device may be representative of a plurality of different devices, such as multiple servers utilized by a business to perform operations "over the cloud" as shown for the service provider system 102 and as further described in FIG. 19.

The client device 108 is configured to engage in user interaction with a communication component 112 of the client device. The user interaction may take a variety of forms, such as mouse inputs (e.g., click, hover, scroll), keyboard inputs (e.g., type, navigate, volume control), voice inputs (e.g., instructions, selections, inquiries), touch inputs (e.g., through a touch screen), and so forth. In some examples, the communication component 112 operates in cooperation with a user interface component 114 that may provide an interface for the client device 108 to enable users to communicate via the network 110, such as with other users, other computing devices, and/or a virtual assistant. The communication component 112 may be implemented using a variety of platforms including social networking platforms (e.g., Facebook®, Google+®, Instagram®, etc.), communication platforms (e.g., Slack®, WeeChat®, WhatsApp®, Skype®, etc.), virtual assistants (e.g., Siri®, Alexa®, Google®), and so forth.

The user interface component 114 may output a variety of user interfaces to enable user interaction with the client device 108 and/or the service provider system 102. For example, the user interface component 114 may enable the user 106 to communicate with other users and/or the service provider system 102 using a chat interface 116, where the user may input text, voice, digital images and/or video, and so forth. Alternatively or additionally, the user interface component 114 may enable the user 106 to utilize one or more custom interfaces 118 supported by the service provider system 102 (e.g., a website, an application, etc.). The custom interface 118 may provide functionality such as damage documentation, materials selection, scheduling assistance, behavior analysis, and so forth.

The client device 108 is also shown as including a natural language input/output (I/O) component 120, which is configured to receive and/or output natural language communications between the computing device 108 and the user 106. In one example, the natural language I/O component 120 is implemented with a virtual assistant, also known as an interactive agent, artificial conversational entity, virtual agent, intelligent personal assistant, or chatbot. The virtual assistant simulates conversation with human users via auditory or textual methods, especially over the network 110 and/or locally. In some examples, virtual assistants are designed to simulate how a human would behave as a conversational entity using natural language processing systems. Alternatively, or additionally, in some examples, a virtual assistant is implemented which scans for keywords in the user's input and generate replies with the most matching keywords or the most similar wording pattern.

The natural language I/O component 120 may work together with the user interface component 114 and/or the service provider system 102 to provide an integrated platform for natural language communication between the client device 108 and the user 106, such as through a virtual assistant, talk-to-text, and so forth. Thus, the natural language I/O component 120 is configured to virtually simulate a conversational entity to a user of the client device 108 as part of a dialog system to implement a natural language conversation. The natural language I/O component 120 provides natural language inputs received from a user to the communication component 112 of the client device 108, which may then be communicated to the service provider system 102 as appropriate. Further, the natural language I/O component 120 may receive responses or other content from the service provider system 102 and/or output the responses (or locally generated responses) to a user.

The illustrated environment 100 further includes a number of systems to support the service provider system 102, including but not limited to an event information system 122, an insurance management system 124, materials and labor services 126, and auxiliary loss information services 128. The systems 122-128 may be implemented as, and/or in conjunction with, a single computing device or a plurality of different devices, such as multiple servers utilized by a business to perform operations over the cloud as further described in FIG. 19. The service provider system 102 may call on one or multiple of the systems 122-128 to perform a service and/or provide information to the user 106 via the client device 108, such as part of a natural language conversation with the user or as part of a notification provided to the user, to name a few examples and as discussed in greater detail below.

The event information system 122, for instance, includes a variety of information sources regarding an event. In some examples, the event information system 122 is implemented with one or more databases. In some examples, an event may be a catastrophic event, such as a natural or man-made disaster that is unusually severe. Because catastrophic events are typically infrequent, especially with respect to a particular geographic location, many people are unfamiliar with what to do when a catastrophic event occurs, or where to find information on what to do in response to the catastrophic event. Further, many catastrophic events happen suddenly, and every moment that a person spends looking for information on what to do in response to the catastrophic event could result in additional property damage or could even increase the likelihood of harm to the person.

The variety of sources utilized by the event information system 122 may include, for example, government sources (e.g., the Federal Emergency Management Agency (FEMA), state/tribal disaster declarations, the National Weather Service, the Department of Health and Human Services, etc.), expert sources (e.g., WeatherWorks®, private volcanologists, private earthquake experts, etc.), national or local news sources, local police and/or fire departments, and/or social media sources (e.g., Facebook®, Twitter®, Reddit®, etc.), to name some examples. The sources included in the event information system 122 may provide information that may be useful before, during, and/or after the occurrence of an event, such as preparedness information, evacuation routes, locations of shelters, timing when it is possible to return to an area, expected utility service outage times, and so forth.

The insurance management system 124 includes various information regarding an insurance policy or policies of the user 106, which detail conditions and circumstances under which an insurer will compensate an insured. The insurance management system 124 may be associated with one or multiple insurance companies, such as State Farm®, Allstate®, Nationwide®, or United Services Automobile Association (USAA), to name a few examples. The insurance management system 124 may store information regarding a premium paid by the insured for an insurance policy or policies, deductible information, prior claims submitted by the insured, particular items of property covered by an insurance policy or policies, and so forth. The insurance management system 124 may also include insurance information for other users.

The materials and labor services 126 includes any number of sources that may be used to provide materials and/or labor for preventing or remedying a loss sustained by the user 106, or for improvements that the user may wish to make to the user's property. The materials and labor services 126, for instance, may include public materials information sources (e.g., publicly-accessible websites); private materials information sources (e.g., websites only accessible to persons having a contractor's license); contact and/or pricing information for contractors, mechanics, or building specialists; ratings for various materials, mechanics, and/or contractors, and so on. The materials and labor services 126 may also receive a notification on behalf of the user 106 via the client device 108 and/or the service provider system 102 indicating materials or labor that the user is interested in. In response, the materials and labor services 126 may generate a reply that includes information such as pricing of one or more materials, pricing of one or more labor options, a suggested time for delivery of materials or performance of labor, and so on.

The auxiliary loss information services 128 include sources that provide supplementary information. Examples of auxiliary loss information services 128 include satellites, drones, human insurance adjusters, and so forth. Auxiliary loss information services 128 may also include loss information submitted on proprietary forms provided by an insurance company, or loss information provided on standard industry forms. Further, the auxiliary loss information services 128 may include information provided by a public adjuster hired by a policyholder.

The service provider system 102 includes a number of systems to provide a variety of information to the user 106 in a user interface provided by the user interface component 114. For instance, the service provider system 102 summarizes and presents information drawn from the various systems 122-128 in a particular and specific manner.

One system provided by the service provider system 102 is a concierge system 130, which may obtain or generate a behavior profile of the user 106 for use in promoting the user to behave in a desired way. To generate a behavior profile, the concierge system 130 may utilize a virtual assistant to guide the user 106 through a series of questions to determine how the user is likely to behave in response to a variety of scenarios.

Alternatively, or additionally, the concierge system 130 may utilize machine learning or other forms or artificial intelligence to passively "learn" how the user is likely to behave in response to a variety of scenarios. For instance, the concierge system 130 may, with permission from a user, monitor notifications that the user receives and how the user responds to the respective notifications. The concierge system 130 may then use information gathered on how the user responds to the respective notifications to generate a behavior profile for the user. The concierge system 130 may also continuously adapt the behavior profile in real-time to ensure that the concierge system delivers notifications that are likely to cause a desired action on behalf of the user. In some cases, the concierge system 130 may obtain a behavior profile of the user from a remote source.

From information included in the behavior profile, the concierge system 130 may generate notifications to motivate the user 106 to perform desired actions, such as consistently performing maintenance on the user's property 104(a) and 104(b). The notifications are communicated to the client device 108 via the network 110, and may be output by the user interface component 114 and/or the natural language I/O component based on the user's behavior profile. By performing regular maintenance, the user's property may be less likely to break down and may have a longer life than would otherwise occur with irregular and infrequent maintenance.

The service provider system 102 may also include a storm helper system 132. The storm helper system 132 may provide the user 106 with information regarding an event 104(c) at or near the property 104(a) and/or 104(b) (e.g., events that have damaged property). The storm helper system 132 may filter information obtained from the event information system 122 to generate notifications for the user 106 that are based on accuracy and/or popularity of the information. Additionally, or alternatively, the information provided to the user 106 by the storm helper system 132 may include information that is relevant and/or personalized to the user 106, along with being accurate for the particular event. The storm helper system 132 may provide the user 106 with relevant information before, during, and/or after the event. Notifications provided by the storm helper system 132 may be communicated to the client device 108 via the network 110 and/or output by the communication component 112, the user interface component 114, and/or the natural language I/O component 120 based on preferences of the user 106, or a determined availability to deliver the information as a result of the event, such as text message, email, Facebook® message, phone call, and so forth.

A first notice of loss (FNOL) system 134 may also be included in the service provider system 102. The FNOL system 134 may enable the user 106 to notify an insurance company of a loss to the property 104(a) or 104(b), for example as a result of an event 104(c). The FNOL system 134 may guide the user 106 through the notification of loss, typically without a human insurance agent present, thus allowing the user to document the first notice of loss immediately upon the loss occurring and without having to schedule an appointment with an insurance agent, for example. The FNOL system 134 may prompt the user 106 to provide information to document the loss, such as through digital images, measurements, and/or qualitative or quantitative descriptions of the damage, which may then be communicated by the client device 108 to the FNOL system via the network 110.

The FNOL system 134 may leverage the auxiliary loss information services 128 to improve the loss response as well. For example, the FNOL system 134 may generate a suggestion for the user 106 to look for damage on the user's roof based on drone images of roof damage in the area of the user's property 104(*a*), where the user 106 may not have otherwise been aware of any damage to the user's roof. The FNOL system 134 may further prioritize the loss incurred by the user 106 with notices of loss provided by other users and information provided by the auxiliary loss information services 128 for dispatch of insurance adjusters and/or repair personnel, thus efficiently allocating resources where they are most needed following a loss event.

Furthermore, the service provider system 102 may include a claim builder system 136. The claim builder system 136 may assist the user 106 through the process of documenting loss to property (utilizing the user interface component 114 and/or the natural language I/O component 120 and via the network 110), and/or provide the user 106 with a claim estimate to remedy the loss. As such, the claim builder system 136 may facilitate processing to generate a claim. The claim builder system 136 may leverage data obtained from a digital image of the loss, qualitative or quantitative information provided by the user 106 about the loss, and/or the materials and labor services 126 to generate natural language outputs that the user 106 can understand in order to obtain information that will influence generating the claim estimate. In examples, the claim builder system 136 communicates with the FNOL system 134 to obtain information that is used in building a claim that corresponds to a loss reported using the FNOL system.

For example, the claim builder system 136 may receive a digital image from the user 106 of a tree fallen on the user's fence. After identifying the fence in the digital image (e.g., using object recognition) the claim builder system 136 generates a natural language output to ask the user 106 whether the portion of the fence damaged by the tree included a gate or other fence component. If the damaged portion of the fence did include a gate, the claim builder system 136 can update materials and labor necessary to repair or replace the damaged portion of the fence. The claim builder system 312 may narrow options for the user 106 on materials and/or labor to be included in the claim estimate from information obtained from the materials and labor services 126. Further, the claim builder system 136 may price materials and/or labor suitable for the claim estimate using available pricing information or by contacting materials and labor suppliers directly.

Additionally, the service provider system 102 may include a fraud detection component 138 to detect instances of fraud (e.g., during a process implemented by one or more of the various systems 130-136). Insurance fraud may be any act committed with the intent to obtain a fraudulent outcome from an insurance process, which may occur when a claimant attempts to obtain some benefit or advantage to which they are not otherwise entitled, or when an insurer knowingly denies some benefit that it is due. One common type of insurance fraud is opportunistic fraud, which consists of policyholders exaggerating otherwise legitimate claims. The fraud detection component 138 may reduce insurance fraud, including opportunistic fraud, by corroborating information amongst the various systems 130-136 (e.g., a model of a washing machine owned by the user 106 verified by the concierge system 130 when the user submits a claim via the claim builder system 136), enabling swift-to-immediate responses (e.g., minimizing time to deliberately falsify damages), and/or communicating in real time between the various systems 130-136 and third-party information sources such as the systems 118-124 to verify information.

Additionally, the fraud detection component 138 may be configured to "learn" (e.g., through machine learning and/or other artificial intelligence systems) from a single conversation with the user 106 and/or multiple conversations with many users, different inputs that increase trustworthiness of the user 106. The fraud detection component 138 may also evaluate facial expressions, voice changes, pause durations between user inputs, and so forth to determine the trustworthiness of the user 106. The trustworthiness of the user 106 determined by the fraud detection component 138 may be used for determining policies for the user, and/or for validation of claim underwriting, to name some examples. In some cases, the fraud detection component 138 may be configured to send a human to investigate and/or gather additional information in response to behavior that is determined to be likely of fraud, such as the user 106 refusing to answer requests by the various systems 130-136, providing evasive answers to requests by the various systems, suspicious facial expressions or voice changes, and so forth.

Further, the service provider system 102 may include a virtual assistant 140. The virtual assistant 140 may be implemented as a computer-based entity programmed to receive input, respond to input, and/or perform a task in a fashion that mimics a human consciousness. In many examples, the service provider system 102 operates in cooperation with the client device 108 to facilitate the virtual assistant 140 (e.g., to receive input, provide a response, perform a task, etc.). Although in other examples, the virtual assistant 140 may be implemented entirely by the client device 108. The virtual assistant 140 may be presented to the user 106 in any suitable format, such as a virtual assistant on a web site with a text interface utilizing the user interface component 114, a virtual assistant application on a mobile device again utilizing the user interface component 114, or a speech recognition interface over a phone line or a virtual assistant making use of the natural language I/O component 120, to name a few examples. In some examples, the virtual assistant 140 provides a response that includes content that is stored on the client device 108, while in other examples the virtual assistant 140 provides a response that includes content that is stored on the service provider system 102, the systems or services 122-128, and/or any other application, service, or source.

In some cases, the virtual assistant 140 implements a natural language dialog system that interacts with the user 106. A natural language dialog system is generally an automated system that is intended to engage a human in a conversation (using any of several modalities of human language) for the purpose of helping the human achieve some goal (e.g., a task). Oftentimes, a single input from a user does not contain sufficient information to allow the virtual assistant 140 to provide a meaningful response. In such cases, the natural language dialog system of the virtual assistant 140 may engage the user in a dialog to prompt the user to provide more information. This "back and forth" (or conversation) between the virtual assistant 140 and the user may continue until the virtual assistant has collected sufficient information to allow it to provide a meaningful response and/or perform a task.

In some examples, the service provider system 102 performs natural language processing (NLP) to implement the virtual assistant 140. For example, the service provider system 102 may perform speech recognition to convert audio (e.g., speech input) into text or other data, natural language understanding with text or other data to understand the text/other data (e.g., determining meaning, intent, etc.), natural language generation to generate a response for input, task formation to generate a task for input (which may include generating a response), and so on. A task may include any action, such as providing a response, searching content (e.g., web pages, files, etc.), outputting content (e.g., playing a song, displaying a picture, etc.), initiating a telephone call, setting a reminder, scheduling an appointment, sending a notification (e.g., text message, email, etc.), posting content on a social media site, and so on. In some examples, the service provider system 102 employs a neural network and/or machine learning to implement NLP techniques or other processing.

In some examples, the service provider system 102 uses contextual information to implement the concierge system 130, the storm helper system 132, the FNOL system 134, the claim builder system 136, the fraud detection component 138, and/or the virtual assistant 140. Contextual information may include:

A previous conversation with a user, which may have included inputs (e.g., text, voice, touch, etc.) received from the user, and/or digital images or video received from the user during the conversation.

A geolocation of a user, which may be determined using global positioning services (GPS), multilateration of radio signals between cell towers, location-based services, and so forth.

Preferences of a user, such as likes and dislikes, customizations set by the user, applications installed and/or used by the user, an order of tasks completed by the user, relationships that the user has with others (e.g., a "friend" on Facebook®, "following" on Twitter®, etc.), and so forth.

A type of device being used, such as a mobile device (e.g., Apple iPad®, Samsung Galaxy Note®, Google Pixel®, etc.), laptop computer, desktop computer, virtual agent, and so on.

The weather at a location of the user or property of the user, including temperature at the location.

A catastrophic event that is likely to occur, is occurring, or has occurred. For instance, this may include a status of a storm such as a hurricane, category of the storm, path of the storm, and so forth.

A number of insurance claims submitted by a user, types of insurance claims submitted by the user, and/or a number of insurance claims submitted by the user that were found to be fraudulent. These numbers may be compared to respective numbers submitted by other users or a threshold number, for instance, for use in insurance fraud detection.

In some examples, the service provider system 102 may perform NLP techniques based on contextual information. For example, the service provider system 102 may receive a user input such as, "where is the nearest place to get car wipers?" The service provider system 102 may use contextual information such as a maintenance schedule for the user's vehicle, a determination of whether the user is inside of the vehicle (e.g., determining that the user's mobile device is connected to the vehicle via Bluetooth®), and/or a determination of the current weather at the location of the user to first determine that the user means "windshield wipers" rather than, say, a disposable cleaning wipe for cars. Further, the service provider system 102 may reference the user's location to determine what is a "near" place that has windshield wipers available for purchase.

Another example of the service provider system 102 using contextual information may include using previous user inputs, such as user inputs received in a guided interaction with the user to document a loss, to fill out a claims form for an insurer. Yet another example of the service provider system 102 using contextual information may include accessing a building design from a contractor or architect to determine different rooms in a building, and/or what items may be included in different rooms. A variety of examples of the service provider system 102 using contextual information to implement the concierge system 130, the storm helper system 132, the FNOL system 134, the claim builder system 136, the fraud detection component 138, and/or the virtual assistant 140 are contemplated.

The various systems 130-136 may also utilize and/or generate one or more schedules 142 to coordinate the user 106 with the insurance management system 124, the materials and labor services 126, and so forth. For example, the concierge system 130 may obtain a schedule of the user 106 to determine optimized times for delivering notifications, scheduling repairs and/or maintenance by the materials and labor services 126, scheduling times for the user to perform repairs and/or maintenance, and so on. The schedule 142 generated by the concierge system 130 may obtain schedules from the materials and labor services 126 (e.g., automatically or input manually by an operator for the materials and labor services) for suggestions of repairs and/or maintenance. In another example, the storm helper system 132 may utilize a schedule 142 of the user 106 to determine whether the user is currently located in the path of a storm or other event. In yet another example, the claim builder system 136 may coordinate schedules 142 of the user 106 and different entities of the materials and labor services 126 (e.g., electrical, roofing, sheetrock/drywall, flooring, painting, landscaping, plumbing, etc.) to provide an optimized schedule for completing a project or fulfilling a claim submitted by the user. Alternatively or additionally, the user 106 may be provided with a user interface via the user interface component 114 to select from available materials and labor services 126 providers to fit the user's desired schedule.

Furthermore, the various systems 130-136 may be configured to escalate an interaction with the user 106 to one or more human reviewers 144 in certain scenarios. The human reviewer 144 may be, for example, an insurance adjuster, a customer services representative, a property troubleshooting specialist (e.g., an appliance expert, mechanic, etc.), and so forth. The various systems 130-136 may enable collaboration between the user 106 and the human reviewer 144 utilizing functionality provided by the various systems to promote efficiency, reduce costs and resources utilized to complete tasks, and reduce fraud, to name a few examples. Further, the various systems 130-136 may include escalation triggers, such as threshold amounts, keyword flags, and so forth which may cause a task or interaction to be escalated to the human reviewer 144.

The service provider system 102 may also include a policy sales and underwriting system 146. The policy sales and underwriting system 146 may gather information from the various systems 130-136 to generate an insurance policy and/or policies for the user 106 based on the information. For instance, the policy sales and underwriting system 146 may use information from the concierge system 130 on how often the user performs scheduled maintenance on different types of property, information from the storm helper system 132 on how the user reacts to being notified of events, information from the FNOL system 134 on how quickly the user reports a loss and detected fraud with reported losses, and/or information from the claim builder system 136 on types of claims and selections made by the user to repair property when a claim is submitted, to name a few examples. Using this information provides the policy sales and underwriting system 146 with a detailed picture on the user 106 in an insurability context and can give more accurate recommendations than conventional systems that simply rely upon lookup tables and previously submitted insurance claims to determine rates for new policies and/or renewing previous policies.

Accordingly, the service provider system 102 may be implemented in a variety of scenarios to provide users with a platform for efficient maintenance of property and/or recovery of resources should a loss occur. This provides significant advantages over conventional systems, which are time consuming and frustrating for users when users are maintaining their property or have experienced a loss. The below content provides various examples of the systems 130-136.

Concierge System

Figure 2:
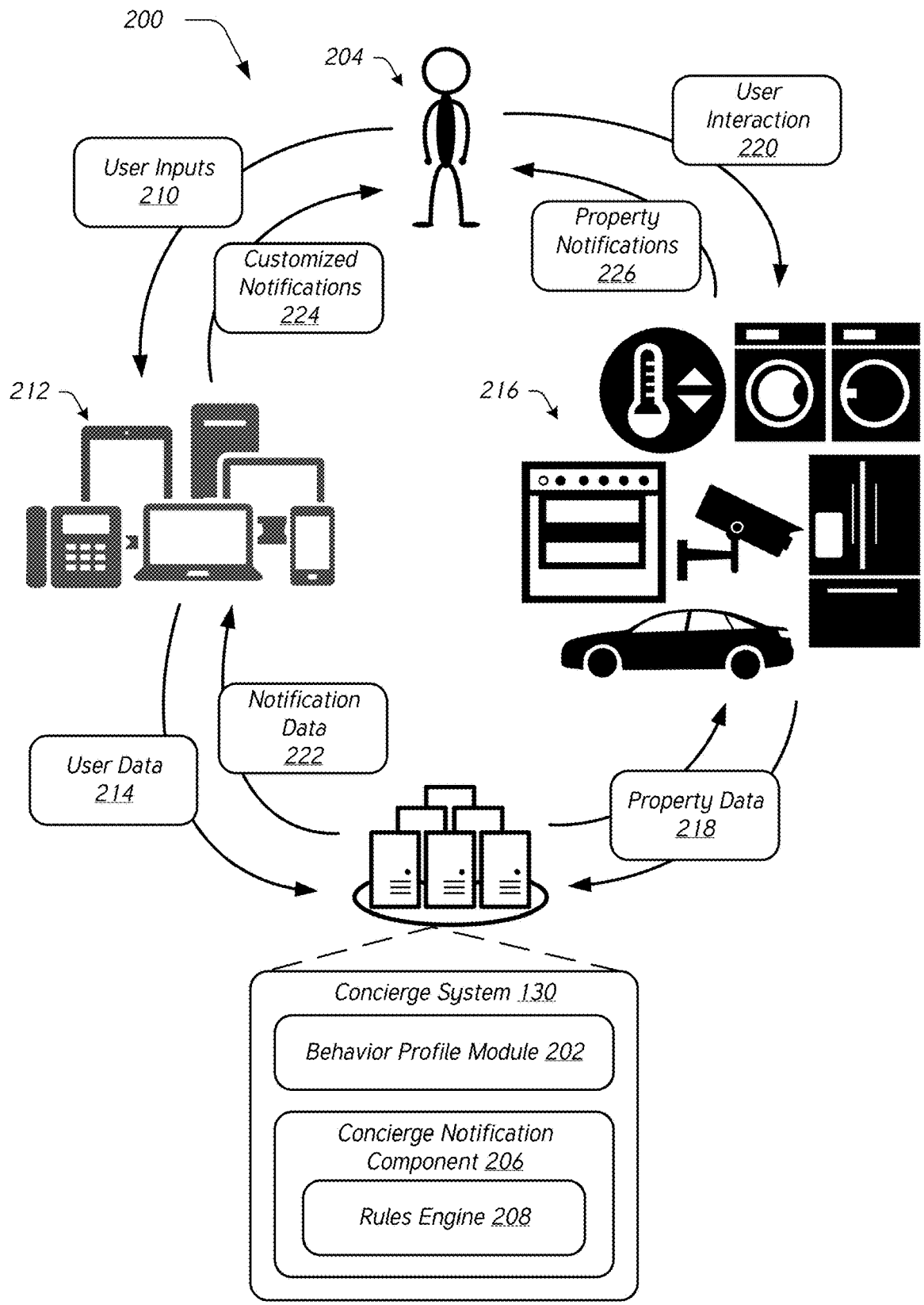
FIG. 2 illustrates example details of the concierge system of FIG. 1 in accordance with various embodiments.

FIG. 2 illustrates example details of the concierge system of FIG. 1 in an environment 200 in accordance with various embodiments. In this example, the concierge system 130 includes a behavior profile component 202 configured to determine a behavior profile of a user 204. The behavior profile may include information regarding how to influence behavior of the user to achieve a desired result. The behavior profile component 202 provides the behavior profile associated with the user 204 to a concierge notification component 206, which leverages the behavior profile using a rules engine 208 to communicate with the user to facilitate concierge services and/or enable proactive engagement.

The user 204 may provide user inputs 210 to one, or multiple, computing devices 212 to generate user data 214 to be used in a behavior profile for the user. In one example, the user inputs 210 may be provided by the user 204 in response to a guided activity or questionnaire executed by one or more of the computing devices 212 on behalf of the behavior profile component 202 of the concierge system 130. A guided activity or questionnaire may include questions such as:

Do you prefer to be prompted of tasks regardless of a number of times per day or week you may be prompted, or would you rather that tasks are grouped?

Rank the following motivations based on which is most important to you first, followed by decreasing importance: receiving an award, saving money, increasing free time, fear of punishment.

When you have multiple tasks to complete, would you prefer to receive a list to complete as you see fit, or would you prefer to receive a schedule of suggestions to complete the tasks?

Imagine that you have received the following notifications on your mobile device, generally all at the same time: a phone call, a text message, a calendar notification, and an email. Which do you view first? Which do you respond to first?

Is there a time of day that you do not wish to receive any notifications? Is there a time of day when you are reliably able to act on tasks outside of work and family obligations?

In another example, the user data 214 generated in response to the user inputs 210 may be leveraged by machine learning or other artificial intelligence techniques to learn the behavior profile of the user 204, without direct engagement on behalf of the concierge system 130. As discussed above, the concierge system 130 may, with permission from a user, monitor notifications that the user receives and how the user responds to the respective notifications by the user inputs 210. Then, the concierge system 130 may use machine learning to analyze the user inputs 210 for use in generating the behavior profile of the user 204. The user inputs 210 may also include information about property 216 of the user 204, such as types or items of property owned or maintained by the user, owner manuals for items of the property, desired preventative maintenance to be performed on the property, frequency of use, and so forth.

The concierge notification component 206 may also receive property data 218 from individual ones of the items of property 216, such as user interaction 220 with the property (e.g., when the property is used, who uses the property, a type of interaction with the property such as cooking, cleaning, driving, washing, increasing or decreasing temperature, etc.), self-reported damage or maintenance schedules, diagnostics data regarding an error (e.g., an error occurring on an appliance), current location of the property, and so on. The rules engine 208 of the concierge notification component 206 may utilize the property data 218 provided by the property 216 in generating notifications for the user 204 for maintenance operations for the respective property items. For example, the property data 218 may include a number of miles on an odometer of an automobile, and the rules engine 208 may utilize the number of miles to generate a notification that the automobile needs an oil change or other service. By providing the property data 218 from the property 216 directly to the concierge system 130, the user 204 does not need to recall when maintenance needs to be performed on the various types and items of property owned by the user.

The concierge system 130 may also provide property data 218 to items of the property 216. The property data 218 communicated to the property 216 from the concierge system 130 may include warranty updates, recall notices, user preferences, and other user settings, to name a few examples. For instance, the user 204 may provide a user input 210 to activate a "Fall Profile" for applicable items of the user's property 216. The Fall Profile may include settings for any number of devices of the property 216 to transition into the season of fall, such as a thermostat in the user's home set to a lower temperature, a porch light to be turned on at an earlier time as sunset occurs earlier, and/or settings of a security system to be activated during the day while the user's children are at school after being home for the summer.

The rules engine 208 of the concierge notification component 206 may utilize the user data 214, the property data 218, and other data sources such as locally stored or remotely accessed warranty and maintenance information (not pictured), to generate notification data 222. The notification data 222 may include instructions for the user 204 to employ in order to maintain and manage the property 216. The notification data 222 also includes directions on how to deliver the information according to the user's behavior profile, such that the user is inclined to consume and execute the instructions to maintain and manage the property 216. Utilizing the notification data 222, the computing devices 212 deliver customized notifications 224 to the user 204. The customized notifications 224 are delivered in accordance with the behavior profile of the user 204, such as by generating a calendar event, sending a text message, or emailing the user. Based on the behavior profile of the user, the customized notifications 224 may be delivered at different times and/or in different manners, such as one batch of notifications per week, grouping notifications by property type to deliver similar notifications together (e.g., notifications that satisfy similarity criteria), providing a notification suggestion daily, and so forth. Accordingly, the user 204 may receive the information to maintain the property 216 when, where, and/or how the user is likely to follow through on the maintenance and/or proactive activities, thus reducing the likelihood of the property breaking down and/or extending the life of the property.

The concierge notification component 206 may also send property data 218 to the property 216, where the property data instructs the property itself how and/or when to provide content to the user 204 on how to maintain the property. Based on the user's behavior profile, the concierge notification component 206 may determine that the user 204 is more likely to respond in a positive manner to notifications presented by the property 216 itself, rather than being presented a notification by one of the computing devices 212. Therefore, the property data 218 output by the concierge notification component 206 may include instructions to generate property notifications 226 to be output by the property 216. For example, the concierge notification component 206 may provide property data 218 to a dryer to output a property notification 226 once per year to remove and clean out the exhaust duct line from the dryer to the exterior in order to prevent house fires. The behavior profile of the user 204 may indicate that receiving this property notification 226 at the location of the dryer is more likely to result in the user removing and cleaning out the exhaust duct line than if the user received the property notification at a computing device 212 such as the user's smart phone.

Figure 3:
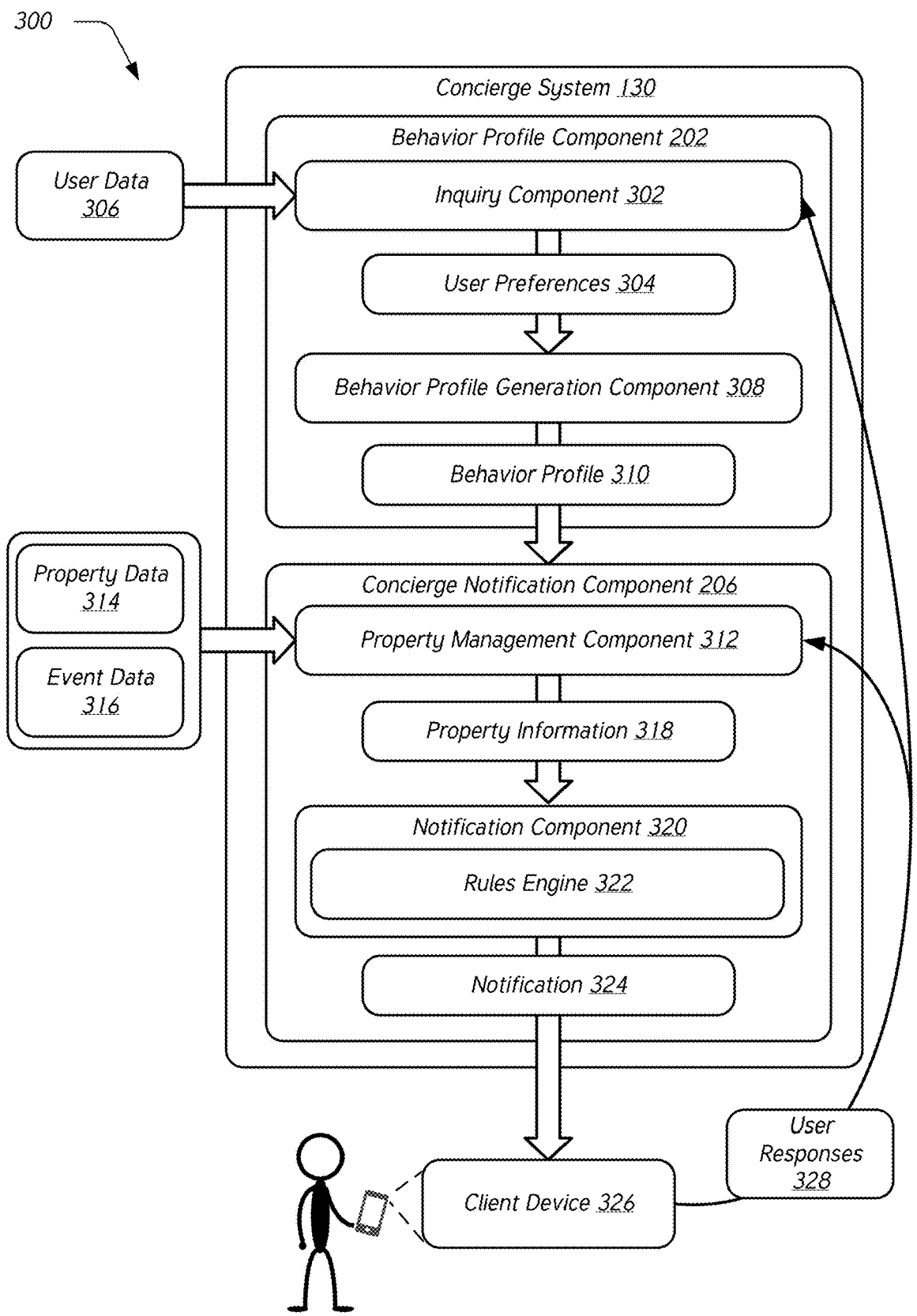
FIG. 3 illustrates an example behavior profile component and the concierge notification component of FIG. 2 in accordance with various embodiments.

FIG. 3 illustrates an example environment 300 including the behavior profile component 202 and the concierge notification component 206 of FIG. 2 in accordance with various embodiments. In this example, the behavior profile component 202 includes an inquiry component 302 that is configured to conduct a guided experience with a user to determine user preferences 304 for receiving property maintenance and management information. The inquiry component 302 obtains data for a user that may be used to influence the user's behavior, such as to perform maintenance on the user's property that will prevent future loss.

The guided experience may be performed using the virtual assistant 140 of FIG. 1, such that the guided experience has a "conversational feel" with the user, rather than simply a series of questions regarding the user's preferences. However, in some cases, the inquiry component 302 may utilize a simple questionnaire to obtain the user's preferences for receiving property maintenance and management information. In still other embodiments, the inquiry component 302 may instead monitor behavior of a user as the user interacts with one or more devices to determine which techniques influence the behavior of the user in a desired way. The inquiry component 302 may make use of a variety of information gathering techniques to generate the user preferences 304, such as decision trees, behavior trees, random forest methods, Markov chains, and so forth. Further, the guided experience provided by the inquiry component 302 may utilize various questions to determine the user preferences including different yes/no questions, wh-questions (who, what, where, when, why, how, etc.), choice questions that offer several different options as an answer, analysis questions (e.g., what are the part or features of . . . ?, Classify . . . according to . . . , etc.), synthesis questions (e.g., what would you infer from . . . ?, What solutions would you suggest for . . . ?, etc.), evaluation questions (e.g., do you agree that . . . ?, What is the most important . . . ?, Place the following in order of priority . . . , How would you decide about . . . ?, etc.), questions including hypothetical scenarios, and follow-up questions, to name some examples.

Alternatively or additionally, the inquiry component 302 may utilize machine learning or other artificial intelligence techniques to determine the user preferences 304. For example, the user data 306 may include information gathered by monitoring a user's interactions with various applications and/or with various devices. In one example, a user may reliably respond to calendar notifications in a timely manner, while putting off or failing to respond to email notifications. The user may not be aware of their own behavior with respect to these two types of notifications. Accordingly, by monitoring the user's behavior, machine learning can be used to make connections between how the user responds to calendar notifications versus email notifications, and use this information to generate the user preferences for receiving notifications such that the user is likely to proactively engage with such notifications.

To generate the user preferences 304, the inquiry component 302 may use any of the described techniques to obtain the user data 306 regarding how the user communicates, such as through email, a calendar application, Facebook® or other social networking application, instant messaging, telephone calling, and so forth. The inquiry component 302 may prioritize the techniques that the user employs for communication to generate the user preferences 304, such as by frequency of use or circumstances surrounding different uses of the different communication methods. Further, the inquiry component 302 may obtain user data 306 regarding how the user is motivated to perform tasks, and include what motivates the use in the user preferences 304. The inquiry component 302, for instance, may determine via the guided experience and/or machine learning, whether the user is motivated by extrinsic factors (e.g., money, praise, awards, etc.), and/or intrinsic factors (e.g., enjoyment, achievement, sense of competence, etc.).

Further, the inquiry component 302 may determine via the guided experience and/or machine learning how to obtain a user's trust. In examples, by gaining the trust of the user, the user is more likely to listen to and/or perform actions based on responses from the concierge system 130 and/or the service provider system 102. This may increase the safety of the user, the user's willingness to accept materials and labor recommendations, and/or confidence in any guidance provided. Therefore, the inquiry component 302 may determine factors that reduce the user's trust, such as requiring the user to repeat themselves, waiting on hold for long periods of time, requiring execution of frustrating tasks such as paperwork, inability to access a human representative, misrepresentation of a product or service, making promises that are not delivered, withholding bad news, and so forth. Similarly, the inquiry component 302 may determine factors that increase the user's trust, such as consistent pricing, being respectful of competition, and keeping promises, to name some examples. The inquiry component 302 may incorporate trust-building information into the user preferences 304.

A behavior profile generation component 308 may receive the user preferences 304, and/or use the user preferences to generate a behavior profile 310 for the user. The behavior profile 310 may include information on how to communicate with a user in an effective way to facilitate concierge services and enable proactive engagement by the user.

Proactive engagement may involve the user taking steps to maintain property before a problem arises. As discussed above, maintenance of property on a regular basis can prevent damage to property and delay deterioration of property, and/or can often save money, resources, and/or time, as opposed to reactionary measures when a problem occurs.

For example, the behavior profile generation component 308 includes in the behavior profile 310 a determined effective way to communicate with the user for various different types of property maintenance and management. This may involve different techniques for delivery of notifications based on the type of property indicated in the notification, a location of the user, a priority level of the notification, a total number of notifications to be delivered, a time or day of scheduled delivery of a notification, and so on. In one example, the behavior profile generation component 308 may determine, from the user preferences 304, that a user is only to receive a single notification about property maintenance that day, and that delivery of the notification to the user that is most likely (e.g., from among a plurality of notification methods) to result in proactive engagement is via text message (e.g., based on the user texting more than a threshold number of times). In another example, the behavior profile generation component 308 may also determine that a user is to receive three or more notifications about property maintenance that day, and that delivery of the notification to the user that is most likely (e.g., from among a plurality of notification methods) to result in proactive engagement is via email. A variety of alternate channels for delivery of notifications, and rules for such delivery based on user preferences, are also contemplated.

The behavior profile generation component 308 may also determine how the user is motivated in the behavior profile 310. The behavior profile generation component 308 may use a variety of techniques to determine how the user is motivated from information included in the user preferences 304, such as by applying the user preferences to a motivation variable scale. Including how the user is motivated in the behavior profile 310 increases the likelihood of proactive engagement by the user for property maintenance and management. For instance, if the user is intrinsically motivated by a desire to learn, the behavior profile generation component 308 may indicate in the behavior profile 310 that explanations of "why" maintenance should be performed are more likely to result in proactive engagement by the user, in comparison to other methods.

Additionally, or alternatively, the behavior profile generation component 308 may include information regarding how to build the user's trust in the behavior profile 310. In examples, the behavior profile generation component 308 may include information on both how to increase and decrease the user's trust, such that the ways to increase trust are promoted while the ways to decrease trust are avoided when generating notifications. For example, the behavior profile generation component 308 may determine that withholding bad news will significantly decrease the user's trust, and therefore includes in the behavior profile 310 that product recalls, for instance, should be prioritized in notifications.

The concierge notification component 206 may receive the behavior profile 310, and may use the behavior profile in generating notifications for the user that are likely to result in proactive engagement by the user for property maintenance and management. The concierge notification component 206 includes a property management component 312, which receives property data 314 related to one or more items of a user's property. The property data 314 describes characteristics of the property, such as type of property, model name/number, date purchased/obtained, materials included in the property, a maintenance schedule for the property, warranty information for the property, and so on. The property management component 312 may receive the property data 314 from a variety of sources, such as directly from the property (e.g., "smart" devices that are capable of communicating via the network 110 of FIG. 1), as user inputs via a client device, from web sites that include information about the property, and so forth. The property management component 312 stores the property data 314 for use in generating notifications about the property.

The property management component 312 may also be configured to update the received property data 314 as time progresses, including updating the property data according to a schedule for the property, and/or responsive to an event occurring that involves the property. The schedule for the property may be a timeline of scheduled or recommended maintenance and may also include a timeline of an estimation of deterioration of the property. The property management component 312 may obtain event data 316 which includes information on events that occur that involve the property, and update the property data 314 accordingly. Events that occur that involve the property may include past servicing or maintenance performed on the property, damage or another loss event that occurs to the property, upgrades or updates to the property, and so on. Updating the received property data 314 according to the schedule for the property may include incorporating whether or not scheduled or recommended maintenance is performed on the property, such as by leveraging the event data 316. The property management component 312 may generate property information 318 based on the received property data 314 and/or the property data as updated according to the schedule for the property and received event data 316.

A notification component 320 of the concierge notification component 206 may receive the property information 318, and a rules engine 322 included in the notification component 320 may generate a notification 324 using the behavior profile 310 and including the property information in a way that will promote proactive engagement by a user. The notification component 320 may generate the notification 324 based on the schedule for the property, and/or in response to an event that occurs that involves the property as noted in the event data 316. For instance, the property may be an air conditioning system attached to a user's home, which is recommended to have drain pans and lines flushed at least once per year to prevent water from backing up and causing damage to floors, walls, and furniture. The notification component 320 may generate a notification 324 based on a schedule associated with the air conditioning system received in the property data 314, and output the notification one year from the last time the air conditioning system was serviced as evidenced by the event data 316.

The rules engine 322 of the notification component 320 may also customize content within the notification 324 in a way that is likely to result in proactive engagement by a user according to the user's behavior profile 310. Continuing with the air conditioning system example, the rules engine 322 may determine from the behavior profile 310 that the user is extrinsically motivated by saving money, and thus can include information in the notification an amount of the user's energy bill that will be reduced if the service is performed, along with a potential cost of damages if water backs up in the air conditioning system and causes damage to the user's home. The rules engine 322 may cause the notification component 320 to omit information from the notification according to the user's behavior profile 310 as well. For instance, the notification component 320 may omit an offer for air conditioning services by a local heating and air conditioning company based on an indication in the behavior profile 310 that the user does not trust unsolicited offers.

Additionally, the rules engine 322 of the notification component 320 can cause the notification 324 to be delivered according to the behavior profile 310 of the user in order to increase the likelihood that the user will positively respond to the notification. The rules engine 322 may instruct the notification component 320 to deliver the notification 324 to a variety of different devices associated with the user (e.g., client devices, smart appliances, etc.), and deliver the notification using a variety of different platforms (e.g., email, text message, telephone call, virtual agent, social networking web site, etc.).

Again, continuing with the above air conditioning system example, the rules engine 322 of the notification component 320 may instruct the notification component 320 to output the notification 324 to a particular client device 326 of the user based on the behavior profile 310, such as the user's mobile phone. The rules engine 322 may determine from the behavior profile that the user, for instance, responds more frequently to text message notifications on their mobile phone in the spring when the air conditioning system is recommended to be scheduled. However, the rules engine 322 may change the delivery technique of the notification 324 to email delivered to multiple devices if the user puts off the service until the fall, as the behavior profile 310 indicates that the user is more likely to respond to emails during the fall season than to text messages.

Additionally, the user may provide one or more user responses 328 via the client device 326, which may be returned to the inquiry component 302 and/or the property management component 312. The user responses 328 may be part of a conversation with the user, such as via a virtual assistant implemented by the client device 326. In one example, the user responses 328 may be received by the inquiry component 302 as part of a conversation with the user to add information to the user's behavior profile. In another example, the user responses 328 may be received by the property management component 312 to provide updates on service or maintenance performed on the user's property, to update newly acquired and/or relinquished property of the user, questions on how/when/where/why service or maintenance can be performed, comments on previously performed service or maintenance, and so forth.

Figure 4:
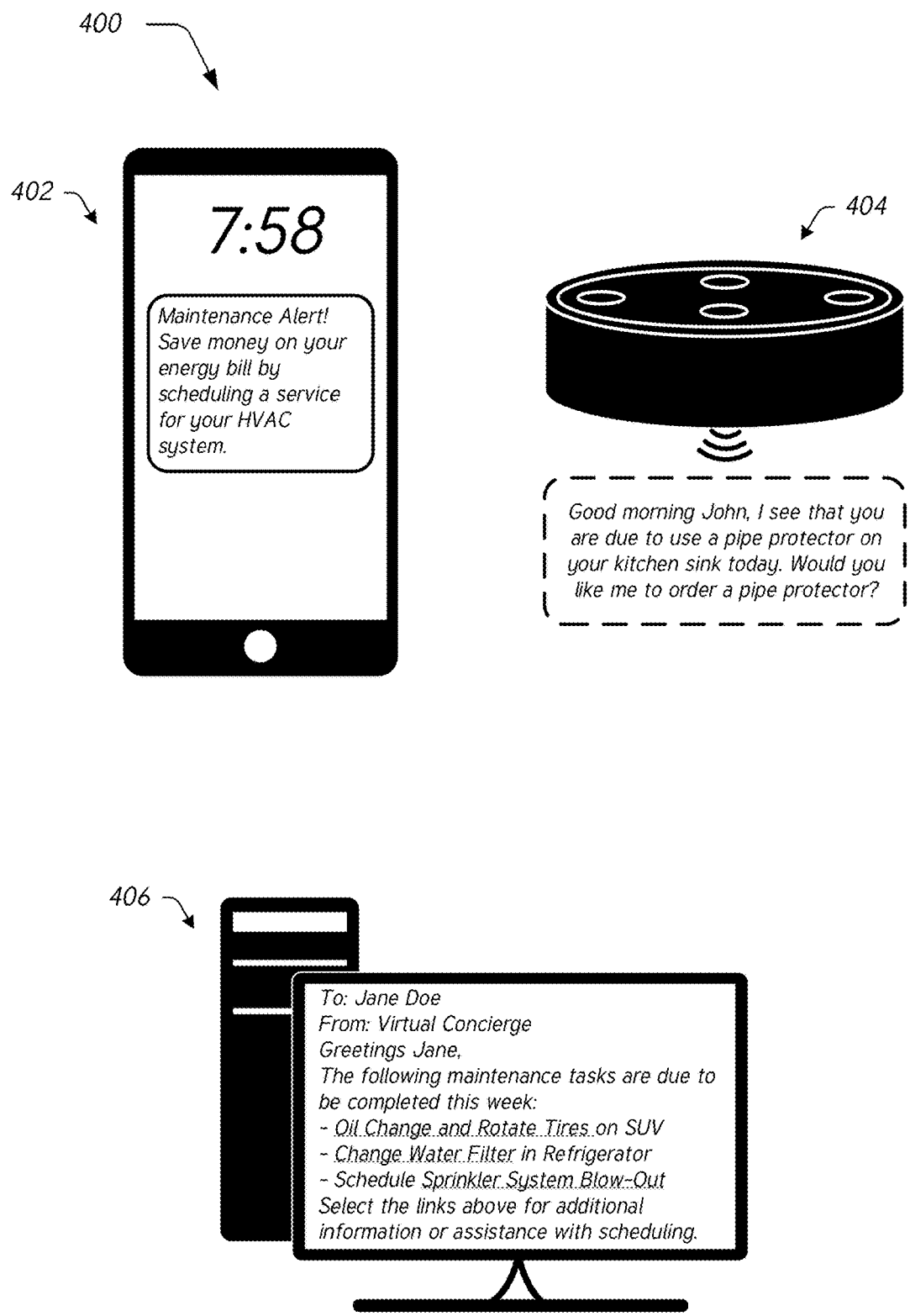
FIG. 4 illustrates a variety of notification types which may be provided by the concierge system of FIG. 2 in accordance with various embodiments.

FIG. 4 illustrates a variety of notification types 400 which may be provided by the concierge system of FIG. 2 in accordance with various embodiments. At 402, a first notification is provided to a user's mobile device by the concierge system 130 according to the user's behavior profile. In this example, the user's behavior profile indicates that the user is likely to proactively engage with a maintenance notification if the maintenance notification is delivered via a text message to the user's mobile device. Further, the user's behavior profile in this example may indicate that the user is likely to proactively engage with a maintenance notification if the maintenance notification is delivered to the user before the user arrives at work. Therefore, the first notification in this example has been delivered at 7:58 A.M. by text message to the user's mobile device (e.g., before the user arrives at work around 8 AM, which may be determined based on the user's current location and/or analyzing previous location data for the user). Additionally, or alternatively, the user's behavior profile in this example may indicate that the user is likely to proactively engage with a maintenance notification if the maintenance notification indicates that the user will save money by performing the suggested maintenance. Accordingly, the content of the maintenance notification indicates that the user will save money on an energy bill by scheduling a service for the user's HVAC system.

At 404, a second notification is provided to a user's virtual agent device by the concierge system 130 according to the user's behavior profile. In this example, the user's behavior profile indicates that the user is likely to proactively engage with a maintenance notification if the maintenance notification is delivered to the user's virtual agent as part of a daily to-do list that output via a speaker to the user by the virtual agent. The virtual agent in this example may be configured to interact with the user in a conversational way as the to-do list is read, such as by prompting the user to schedule appointments, set up calendar notifications, order goods, and so forth. The virtual agent thus has output the second notification as part of the to-do list through a speaker, and additionally prompted the user to purchase a product necessary to execute the maintenance task.

At 406, a third notification is provided to a user via email by the concierge system 130 according to the user's behavior profile. In this example, the user's behavior profile indicates that the user is likely to proactively engage with a maintenance notification if the maintenance notification is delivered to the user by email once a week. In addition, the user's behavior profile may indicate that the user is likely to proactively engage with a maintenance notification if the user is provided links to directly access additional information about the recommended maintenance, and directly access options for scheduling the recommended maintenance. Consequently, the third notification is delivered as an email message according to a weekly schedule and includes all recommended maintenance to be performed that week, along with hyperlinks for the user to access additional information and assistance with scheduling.

While a variety of notification embodiments are shown in FIG. 4, it should be readily apparent that notifications may be delivered by the concierge system 130 in any number of ways and by any suitable device, including home appliances, automobiles, home automation systems, and so forth. Notifications may be delivered according to how and when a user is likely to proactively engage with the notifications. Proactively engaging with a notification may include a user consuming (e.g., viewing or hearing) the notification, and/or performing an action recommended in the notification.

The following discussion describes techniques that may be implemented utilizing any of the systems and devices described herein. Aspects of the following procedure may be implemented in hardware, firmware, software, or a combination thereof. The procedure is shown as a set of blocks that specify operations performed by one or more devices and are not necessarily limited to the orders shown for performing the operations by the respective blocks. Further, in some examples, one or more of the operations may be removed (e.g., not performed). For ease of illustration, portions of the following discussion may refer to FIGS. 1-4. Although the operations may be performed in other environments and/or by other devices.

FIG. 5 illustrates an example process flow 500 of generating a notification for property and delivering the notification based on a behavior profile of a user in accordance with various embodiments. At block 502, a behavior profile is obtained for a user, where the behavior profile includes preferences of the user for receiving information. The behavior profile 310 may include information on how to communicate with the user in an effective way (e.g., a preferred way for the user) to facilitate concierge services and enable proactive engagement by the user. The preferences of the user for receiving information may indicate devices on which the user prefers to receive information (e.g., mobile phone, laptop or desktop computer, home appliance, etc.), platforms by which the user prefers to receive information (e.g., text message, email, calendar reminder, etc.), times that the user prefers to receive information, frequency that the user prefers to receive information, and so forth. Additionally, or alternatively, the behavior profile 310 may be leveraged to determine content to include in notifications, such as based on motivations of the user and/or how to build trust with the user.

At block 504, property information is received for property of the user. The property information may be included in the property data 314, which describes characteristics of the property such as type of property, model name/number, date purchased/obtained, materials included in the property, a maintenance schedule for the property, warranty information for the property, and so on.

At block 506, property information is updated according to a schedule for the property and/or responsive to an event occurring that involves the property. The schedule for the property may be a timeline of scheduled or recommended maintenance and/or may also include a timeline of an estimation of deterioration of the property, which may be included in the property information. The event occurring that involves the property may be based on the schedule, such as recommended maintenance being performed or not being performed. Alternatively, or additionally, the event occurring that involves the property may be an unscheduled event, such as a remodel or upgrade added to the property, unexpected damage to the property, and so on.

At block 508, a notification is generated based on the schedule for the property or responsive to the event. In either case, the notification may be generated to include suggested maintenance to be performed on the property to prevent damage to the property and delay deterioration of the property. In some cases, an event may occur that causes a notification to be generated outside of a maintenance schedule for the property, such as an automobile reporting an accident. In this case, a notification may be generated following the accident to remind a user to purchase new car seats for the user's children. Content included in the notification may be based on a user's behavior profile, such as content that is likely to motivate the user to proactively engage to perform recommended maintenance, or content that will increase the user's trust in the concierge system 130 or other systems associated with the service provider system 102.

At block 510, the notification is delivered according to the behavior profile of the user. The notification may be sent to one or more of a user's computing devices 212, and/or to one or more devices of the user's property 216, according to the user's behavior profile 310. Further, the notification may be sent according to the user's behavior profile 310 by a variety of platforms, such as email, text messages, calendar appointments, and so forth as described above. Additionally, or alternatively, the notification may be sent at any suitable time or at any suitable frequency based on the user's behavior profile 310.

Storm Helper System

Figure 6:
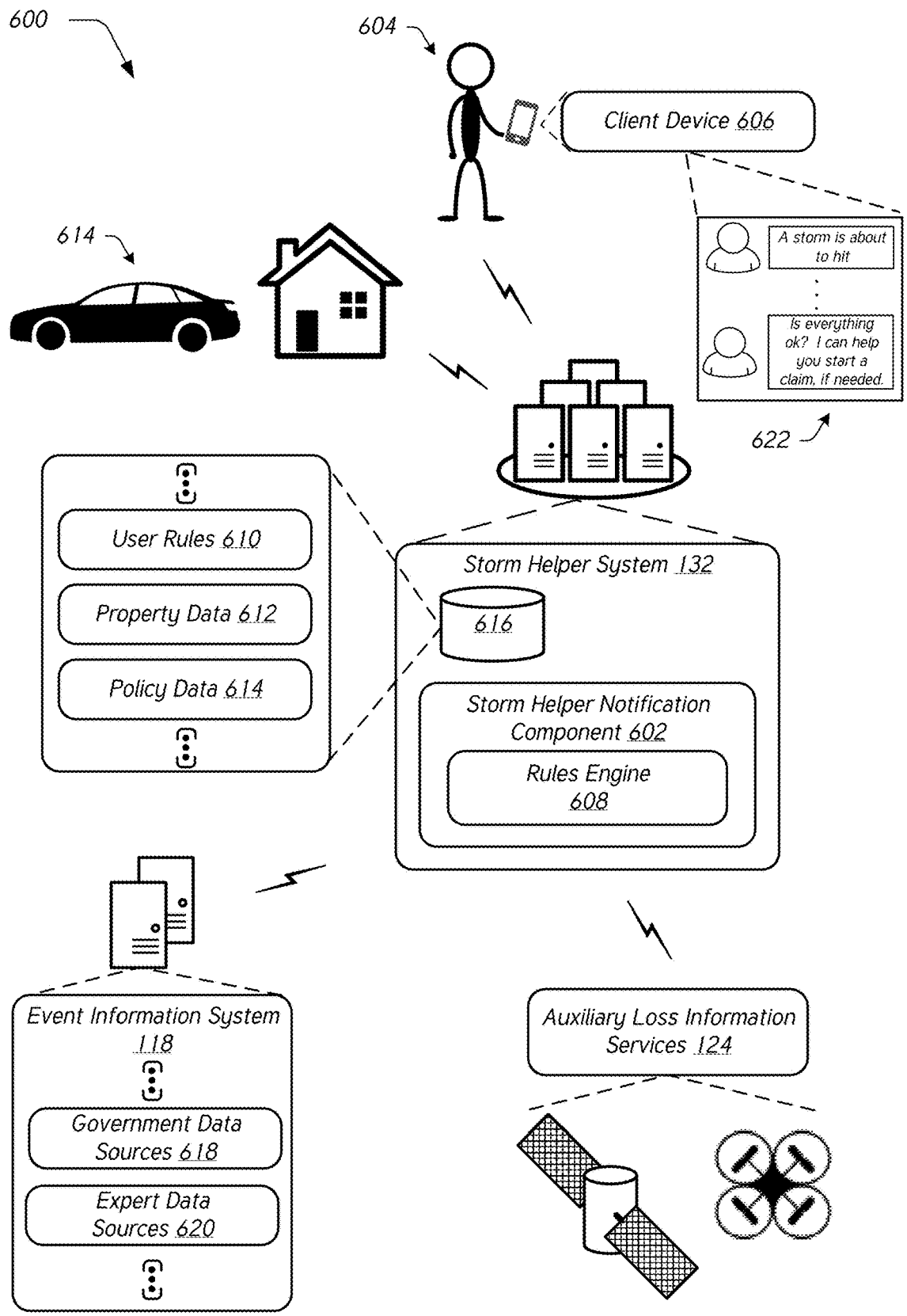
FIG. 6 illustrates examples details of the storm helper system of FIG. 1 in accordance with various embodiments.

FIG. 6 illustrates an example environment 600 that includes the storm helper system 132 of FIG. 1 in accordance with various embodiments. The storm helper system 132 includes a storm helper notification component 602 configured to proactively deliver event information to a user 604 via a client device 606. The event information may be relevant, personalized, and/or accurate with respect to the user 604. The event information may relate to an event that causes damage to property such as a catastrophic event, which may be a natural or man-made disaster that is unusually severe. Because some events, such as catastrophic events, occur infrequently, many people are unfamiliar with what to do when an event occurs, or where to find information on what to do in response to the event. Further, many events happen suddenly, and every moment that a person spends looking for information on what to do in response to the event could result in additional property damage or could even increase the likelihood of harm to the person.

The storm helper system 132 provides information efficiently and effectively on a person-by-person basis. The information may be customized to different items of the user's property that may be in harm's way. In particular, the storm helper notification component 602 utilizes a rules engine 608 to apply user rules 610, property data 612 associated with property 614 of the user 606, and/or policy data 616 associated with the user to information received from a variety of sources to ensure that the event information is relevant, personalized and/or accurate. The user rules 610 include preferences received from the user 604 on when, where, and/or how the user wishes to receive notifications regarding events. In other words, the user rules 610 describe how to get information to the user 604 when the user "needs" the information. The user rules 610 may include information such as which devices to send notifications to, which platforms are preferred to deliver notifications (e.g., text messages, email, Facebook® message, phone call, etc.), which device/platform to deliver notifications at different times, customized alert settings for event notifications (e.g., silent mode "override" to provide an auditory alert, different sounds to identify event notifications, etc.), and so forth.

The property data 612 includes information about the property 614 associated with the user 604. Although referred to herein generally as belonging to the user 604, the property 614 may be of interest to the user despite not being "owned" by the user, such as a home the user is renting and living in. The property data 612 may include information such as type of property, where the property is located, make or model of the property, updates to the property, damages to the property, estimated value of the property, and so forth. The policy data 614 includes information about an insurance policy or policies that belong to the user 604. The policy data 614 may include information about an insurance policy or policies that cover or otherwise correspond to the property 614, which may be leveraged to provide relevant information in response to an event involving the property. The storm helper system 132 may obtain and store the user rules 610, the property data 612, and the policy data 614 in storage 616 for use in generating notifications regarding events that may cause damage to the property 614.

The storm helper notification component 602 may obtain information regarding an event from a variety of sources. As described above, it can often be difficult for users to quickly locate a reliable source of information when an event, and particularly a catastrophic event such as a hurricane or tornado, occurs. This may be because these types of events occur infrequently and users are unfamiliar with where to obtain reliable and up-to-the-minute information, and/or reliable and up-to-the-minute information is simply difficult to locate. Accordingly, the storm helper notification component 602 may determine sources for different potential events ahead of time, and be ready to draw pertinent information to generate a relevant and accurate notification for the user 604 when the user "needs" the information.

For example, the storm helper notification component 602 may obtain information from the event information system 122 described above, which includes sources such as web pages and/or applications that provide information on different types of events. The variety of sources utilized by the event information system 122 may include, for example, government data sources 618 (e.g., the Federal Emergency Management Agency (FEMA), state/tribal disaster declarations, the National Weather Service, the United States Geologic Survey (USGS), the Department of Health and Human Services, etc.) and/or expert sources 620 (e.g., WeatherWorks®, private volcanologists, private earthquake experts, etc.). The event information system 122 may also gather information from other sources (not pictured) such as national or local news sources, local police and/or fire departments, and/or social media sources (e.g., Facebook®, Twitter®, Reddit®, etc.), to name some examples. The sources included in the event information system 122 may provide information that may be useful before, during, and/or after the occurrence of an event, such as preparedness information, evacuation routes, locations of shelters, timing when it is possible to return to an area, expected utility service outage times, and so forth.

Additionally, the storm helper notification component 602 may obtain information from the auxiliary loss information services 128 described above. The auxiliary loss information services 128 include sources that provide supplementary information in the case of a loss event. Examples of auxiliary loss information services 128 that may be leveraged by the storm helper notification component 602 include satellites, drones, seismographs, precipitation measurement tools, water flow and water level measurement tools, anemometers, and so forth.

When the storm helper notification component 602 receives an indication of an event, for instance from the event information system 122 and/or the auxiliary loss information services 128, the rules engine 608 may apply information obtained about the event to rules specific to the user 604 and the property 614 to inform the user how to act. For instance, the storm helper notification component 602 may receive an indication of a flood warning regarding a river on which the user 604 owns a vacation property. The storm helper notification component 602 thus generates and delivers a notification according to the user's preferences that includes information about the flood warning. The storm helper notification component 602 may customize the notification using the rules engine 608. Continuing with the above example, the rules engine 608 may determine that the user 604 is currently too far away from the vacation property (e.g., more than a threshold distance) to prepare the building in time for the potential flood (e.g., using location-based services). Therefore, the rules engine 608 may provide contact information in the notification for people or businesses nearby the vacation property that may assist with preparing the vacation property for the potential flood.

Alternatively or additionally, the storm helper system 132 may interact with the user 604 to deliver information about an event as part of a conversation with the user 604, such as by utilizing a virtual assistant implemented at least in part by the client device 606. The conversation may, in some examples, be displayed in a user interface 622 of the client device 606, although other examples are also considered (e.g., voice inputs received from the user and outputs via a speaker of the client device). For instance, the user interface 622 may allow the user to request additional information from the storm helper system 132 regarding an event, in which case the storm helper system 132 may leverage information from the information stored in storage 616, the event information system 118, and/or the auxiliary loss information services 124 as appropriate to generate responses as part of the conversation with the user. Furthermore, the conversation provided by the storm helper system 132 via the user interface 622 may allow the user 604 to provide feedback to the storm helper system to improve the functionality of the storm helper system 132, update information stored in storage 616, and so forth.

Figure 7:
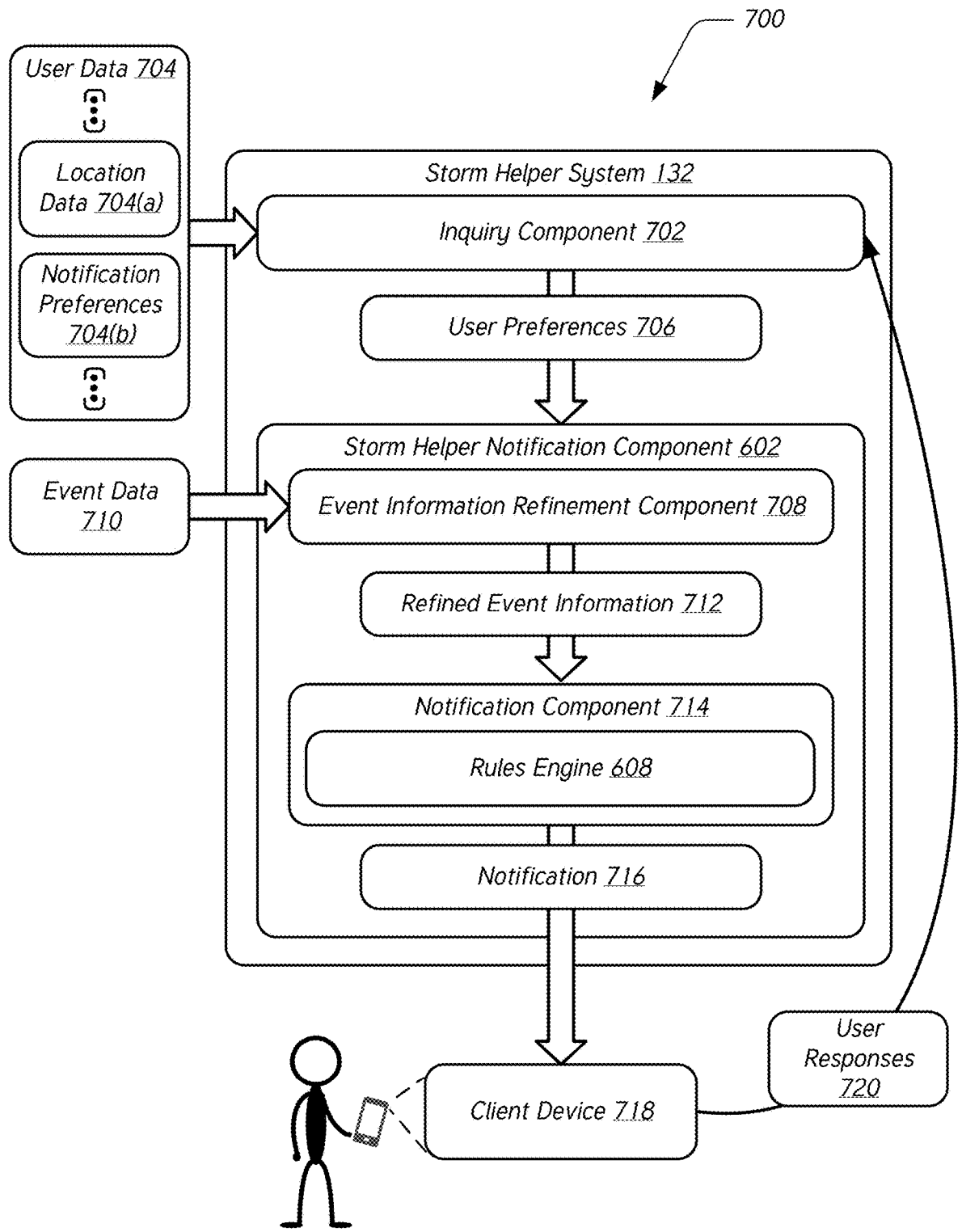
FIG. 7 illustrates examples details of the storm helper notification component of FIG. 6 in accordance with various embodiments.

Turning now to FIG. 7, an example system 700 is illustrated including example details of the storm helper notification component 602 of FIG. 6 in accordance with various embodiments. The storm helper system 132 in this example includes an inquiry component 702 that may receive user data 704 and generate user preferences 706 from the user data. The inquiry component 702 may be configured to interact with a user to determine the user's preferences for receiving information regarding events that may damage the user's property. The user data 704 may include information about the user, such as location data 704(a) and/or notification preferences 704(b). The location data 704(a) may include personalized information relating to locations of the user's property, locations where the user lives and/or works, locations of events that the user may attend (e.g., appointments, childcare/schools, gyms, hobbies, etc.), and so forth. The location data 704(a) may further include one or more maps depicting the locations just described. The notification preferences 704(b) may include personalized information relating to how the user wishes to receive notifications and/or content to be included in notifications regarding different types of events.

The inquiry component 702 may utilize one or more of the techniques described above with respect to the inquiry component 302 to generate the user preferences 706, such as a guided experience using the virtual assistant 140 that has a "conversational feel" with a user, a questionnaire to obtain the user's preferences, behavior monitoring of the user as the user interacts with one or more devices and/or communication platforms and analysis of monitored behavior using machine learning or other artificial intelligence techniques, and so forth. The inquiry component 702 may utilize the user data 704 to determine user preferences 706 for receiving notifications in situations, such as a catastrophic event, that may require imminent action on behalf of the user to prevent damage to the user's property or to keep the user safe.

In some examples, the user preferences 706 may be different from other user preferences in different scenarios, such as the user preferences 304 related to how the user prefers to receive property maintenance and management information. In some cases, the inquiry component 702 may generate different user preferences 706 for different items of a user's property, such as a type of property, value of property, location of property, and so forth. For example, a user may want the user's mobile phone to output an auditory alert for an event notification in relation to the user's home regardless of the mobile phone's settings at the time of the notification (e.g., the mobile phone being set to "silent," "vibrate," "airplane mode," and so forth), but would prefer to comply with the mobile phone's settings at the time of the notification for an event notification relating to the user's workplace.

An event information refinement component 708 of the storm helper notification component 602 then receives event data 710, where the event data may include an indication that an event has occurred or is likely to occur. For example, the event information refinement component 708 may receive an indication from a government or expert information source that a weather event such as a flood is likely to occur based on predicted rainfall in a particular area. Based on the indication that an event has occurred or is likely to occur, the event information refinement component 708 may retrieve additional event data 710, such as event information regarding the event from one or more sources. The event information refinement component 708 may leverage sources such as the government data sources 618, the expert data sources 620, and/or the auxiliary loss information services 128 to retrieve real-time information on the event.

The event information refinement component 708 may then determine an accuracy of the event information included in the event data 710 to be used in generating refined event information 712. The accuracy of the event information may be determined in a variety of ways. For example, different sources of information may be assigned values corresponding to reliability of past event information output by the respective sources. The values assigned to the respective sources may then be used to weight present and future information output by the sources for accuracy. In another example, event information from different sources may be compared, and event information having the highest number of sources outputting the same or similar information may be used to generate the refined event information 712.

By determining the accuracy of event information using numerous sources, the event information refinement component 708 can ensure that the user is getting accurate information about an event, which may or may not be independent of how "popular" event information may be. For instance, a hashtag "trending" on Twitter® may circulate amongst thousands of people with inaccurate information about an event, while a local government website accessed by a fraction of those same people may include different and more accurate information about the event. This may cause many people who received the inaccurate information to have damage occur to their property as a result. However, the event information refinement component 708 may obtain event information in this example from both the hashtag and the local government website, and determine that the local government website presents the more accurate event information. The event information refinement component 708 then includes the event information determined to be more accurate in the refined event information 712 for use in generating a notification for users about the event.

The event information refinement component 708 may also determine a relevance of the event information included in the event data 710 to the user based at least in part on the user preferences 706. For instance, relevance to the user may be based on a location of the user, other people associated with the user, and/or the user's property at a time of the event, and relative to a location of the event, as indicated in the user preferences 706. The user preferences 706 may indicate people other than the user that the user wishes to receive notifications about regarding events, such as members of the user's family and/or friends of the user. Events closer to the user, other people associated with the user, and/or the user's property may be more relevant to the user than events that are located farther away, as events closer to the user and/or the user's property may be more likely to cause damage to the user's property or to put the user in danger. Relevance to the user may also be based on other factors indicated in the user preferences 706, such as value of items of the user's property, severity of the event, a likelihood that the event will or will not occur, a time estimate of when the event will occur, and so forth.

A notification component 714 receives the refined event information 712 and the user preferences 706, and generates a notification 716 for the user regarding the event based at least in part on the accuracy of the event information and/or the relevance of the event information to the user. To do so, the notification component 714 may utilize the rules engine 608 to apply the user preferences 706 to the refined event information 712 to deliver information that the user wants to receive about the event, when the user wants to receive the information, and/or how the user wants to receive the information. In some cases, the rules engine 608 may customize content from the refined event information 712 to be included in the notification 716 based on the user preferences 706. In one such example, the rules engine 608 may direct a user to take a particular driving route during a snow storm based on the user preferences 706 indicating that the user prefers to drive in "snow corridors" (e.g., routes identified by a municipality where snow removal is prioritized when the municipality cannot keep arterials clear) when it is snowing.

The notification component 714 may then send the notification 716 to a client device 718 associated with the user for output via the client device 718. As discussed above, the notification component 714 may customize how the notification 716 is provided based on the user preferences 706, such as which device to send the notification to, which platforms are preferred to deliver the notification (e.g., text messages, email, Facebook® message, phone call, etc.), which device/platform to deliver notification based on a delivery time of the notification, customized alert settings for event notifications (e.g., silent mode "override" to provide an auditory alert, different sounds to identify event notifications, etc.), and so forth.

In many cases, event notifications are time sensitive (e.g., events occur quickly that may affect the safety of the user and/or may damage the user's property). In examples, the notification component 714 may determine a client device 718 of the user that is currently "active" (e.g., by detecting recent user inputs) and deliver the notification 716 to that particular client device. For instance, the notification component 714 may determine that the user is currently working on their desktop computer based on recent user inputs on a keyboard. Rather than sending the notification 716 to the user's mobile device in this case, the notification component 714 may send the notification directly to the desktop computer on which the user is working. The notification component 714 may even generate the notification in the particular application currently being used by the user (e.g., delivering a Facebook® message upon detection of the user's presence on Facebook®). In this way, the user is effectively alerted of an event that may cause damage to the user's property and/or endanger the user's safety, and can act on the notification sooner than with conventional event alert systems.

The user may be able to provide one or more user responses 720 to the notification 716, such as by implementing a virtual assistant via the client device 718. Continuing with the Facebook® example, the notification 716 may initiate a conversation with the user at the client device 718 providing the user with customized information about an event that is occurring and/or is about to occur by delivering a Facebook® message. Then, the user may respond to the Facebook® message with another Facebook® message requesting additional information about the event, without requiring the user to leave the application. The storm helper system 132 may leverage various information sources as described above and below to provide the requested information to the user in a way that is relevant and personalized to the user at the time of the conversation about the event. In one example, the user may respond to the Facebook® message asking the storm helper system 132 to deliver subsequent event updates to the user via text message, such as in a case where the user will be leaving their computer to prepare for the event. In another example, the user may respond to the Facebook® message asking for additional information from an expert about the event, in which case the storm helper system 132 may provide the user with a direct link to an expert's web site that the user may follow for the requested information. The storm helper system 132 thus may navigate between various applications and information sources to provide the user with information that is customized and relevant to the user before, during, and/or after an event occurs.

Figure 8:
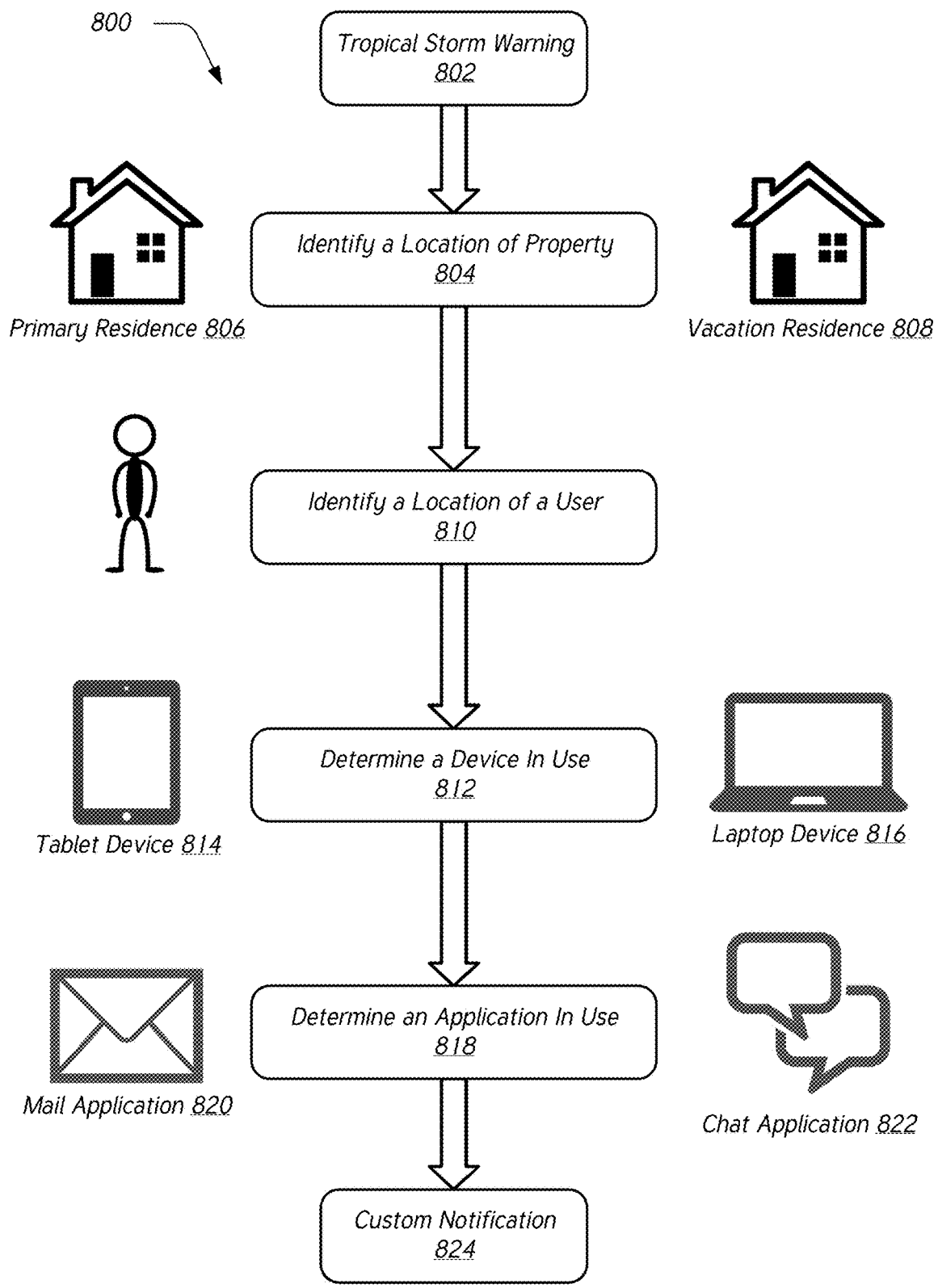
FIG. 8 illustrates a variety of notification types which may be provided by the storm helper system of FIG. 6 in accordance with various embodiments.

FIG. 8 illustrates example components 800 that may be used in generating a custom notification by the storm helper system 132 of FIG. 6 in accordance with various embodiments. In this example, a tropical storm warning 802 may cause the event information refinement component 708 of FIG. 7 to initiate generation of a notification. As discussed above, the event information refinement component 708 may gather data from a variety of sources, and refine the information based on how the information applies to a user and/or the user's property.

At 804, the event information refinement component 708 may identify a location of property associated with a user. In this example, two locations of property associated with the user are determined, a primary residence 806 and a vacation residence 808. The event information refinement component 708 in this example determines that only one of the locations of property, the vacation residence 808, is likely to be affected by the event identified in the tropical storm warning 802. In some cases, however, the event information refinement component 708 may determine that no property associated with a user is likely to be affected by an event, and thus may terminate generation of a notification for the tropical storm warning 802 at this time. While two locations of property are described, any number of locations may be analyzed with respect to an event location and likelihood of affecting property at the respective locations without departing from the scope of the disclosure.

At 810, the event information refinement component 708 may also determine a location of a user with respect to a location associated with the tropical storm warning 802. In this example, the event information refinement component may determine that the location of the user is at the same location as the primary residence 806 (e.g., within a threshold distance to the primary residence 806). The location of the user may be determined using location-based services, global navigation satellite system (GNSS) (e.g., global positioning systems (GPS)), multilateration of radio signals between cell towers, and so forth as described above. Because it is determined that the location of the user 810 in this example is at the location of the primary residence 806, and thus not impacted by the tropical storm, the event information refinement component 708 may refine the information for a notification accordingly. For example, the event information refinement component 708 may omit information regarding evacuation routes from a notification while including information about how to perform an act remotely, such as lower the thermostat in a refrigerator at the location of the vacation residence 808 to keep food fresh should the power go out during the storm, start a generator that is onsite at the vacation residence 808 and switch power over to the generator, etc.

In some examples, the location of the user may be approximately the same as a location of property. However, in some cases, the user may be far enough away from the location(s) of property that effects of an event may be different at the user's location than effects of the event at the location of the property. For instance, when the tropical storm warning 802 is received, the user may be over one hundred miles from the locations of the properties, at a sporting event, or on a business trip. In this scenario, the location of the user may be far enough away from the effects of the tropical storm that a warning, such as an evacuation warning, is not necessary to be included in a notification about the tropical storm. Other scenarios are also considered, such as the locations of the properties being a far enough distance from an event to not warrant a notification while the location of the user is close enough to the event to warrant a notification, and different notifications for the user and/or different items of property depending on a distance from an event, among others.

At 812, the notification component 714 of FIG. 7 may determine a device that is currently in use and/or a device designated in user preferences to deliver a notification to the user. In this example, the notification component 714 may determine that two devices associated with the user are active, a tablet device 814 and a laptop device 816. The notification component 714 may determine that the laptop device 816 is the device having a most recent user input, and thus determine in this example that the laptop device 816 should receive a notification such that the user receives time-sensitive information about the event faster. Other techniques for determining a device in use 812 that should receive a notification are contemplated, such as a device with auditory alerts activated, a device connected or not connected to a Wi-Fi network, a device logged in to an account associated with the user, and so forth.

At 818, the notification component 714 may determine an application that is in use, and use this information to determine where and/or how to send a notification. In this case, a mail application 820 and a chat application 822 are both in use on the laptop device 816. The notification component 714 may determine that although the mail application 820 is at the top of a z-order of windows open on the laptop device 816, the user is more likely to respond to a chat notification of the chat application 822 (e.g., based on historical data indicating that the user uses the chat application 822 more than a threshold amount). Therefore, at 824, the notification component 714 may generate a custom notification to be delivered via the chat application 822 active on the laptop device 816 that includes information based on the location of the property that may be affected by the tropical storm and the location of the user. In this way, the custom notification is relevant, personalized, and/or accurate with respect to the user, and is delivered to the user in an efficient way such that the user can quickly act on time-sensitive information included in the notification.

Figure 22:
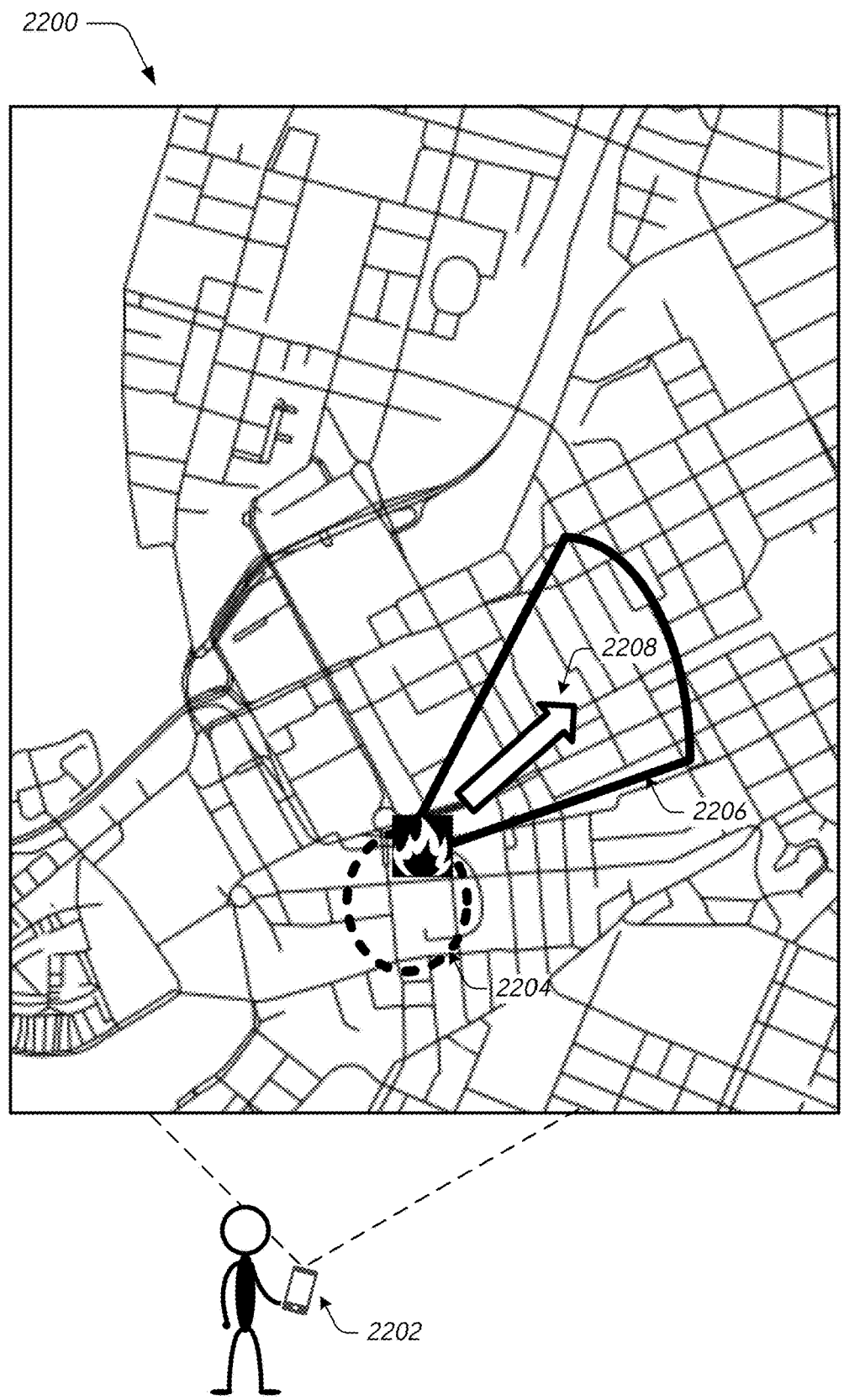
FIG. 22 illustrates an example map for proactively delivering messages to users and/or response personnel based on an event in accordance with various embodiments.

An example of a map that may be utilized by the storm helper system 132 for delivering information to users and/or response personnel is illustrated in FIG. 22 and is discussed in more detail below. The following discussion describes techniques that may be implemented utilizing any of the systems and devices described herein. Aspects of the following procedure may be implemented in hardware, firmware, software, or a combination thereof. The procedure is shown as a set of blocks that specify operations performed by one or more devices and are not necessarily limited to the orders shown for performing the operations by the respective blocks. Further, in some examples, one or more of the operations may be removed (e.g., not performed). For ease of illustration, portions of the following discussion may refer to FIGS. 1 and 6-8. Although the operations may be performed in other environments and/or by other devices.

Figure 9:
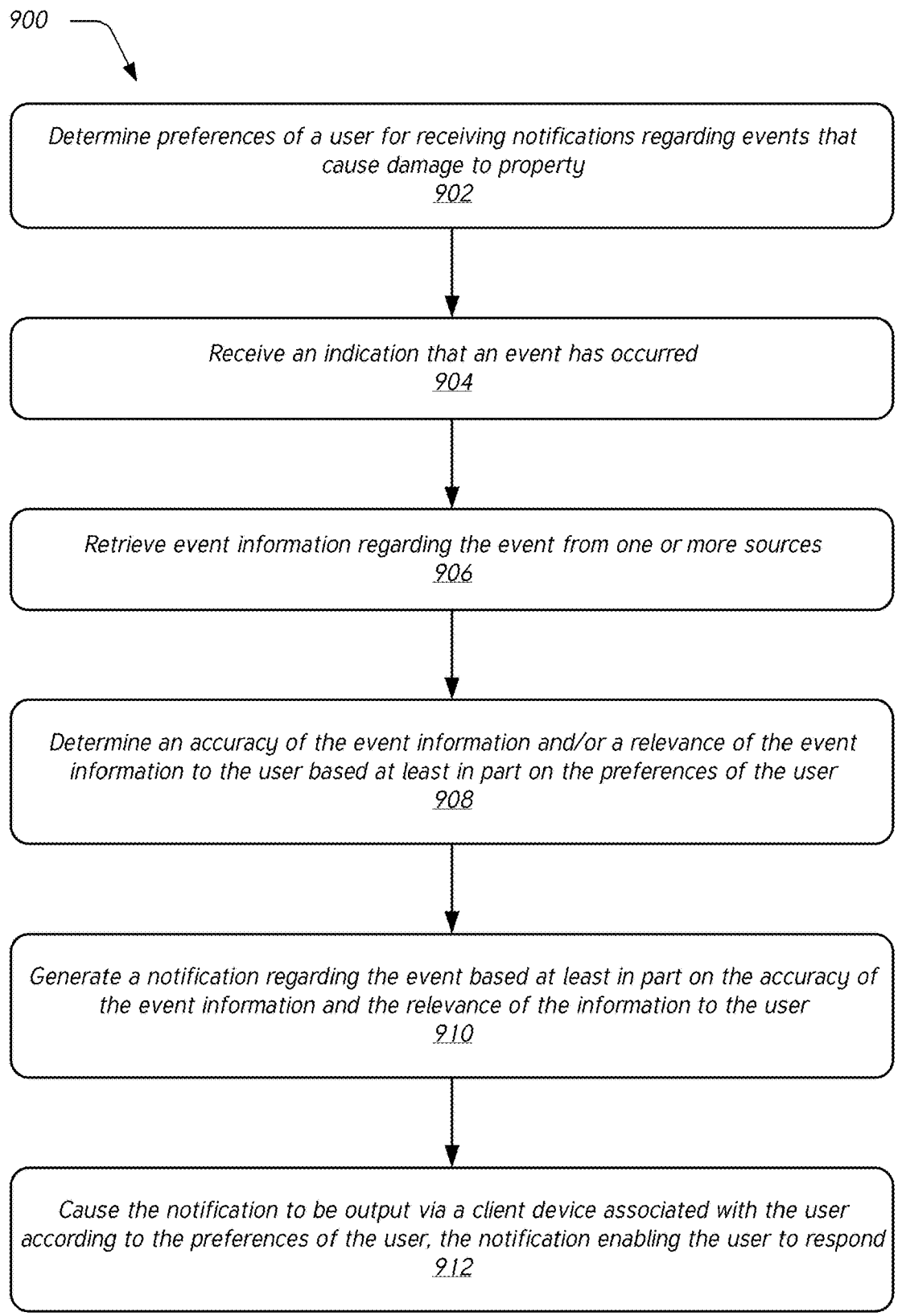
FIG. 9 illustrates an example process flow of generating a notification regarding an event based on the accuracy of event information and relevance of the event information to a user in accordance with various embodiments.

FIG. 9 illustrates an example process flow 900 of generating a notification regarding an event based on an accuracy of event information and/or relevance of the event information to a user in accordance with various embodiments. At block 902, preferences of a user for receiving notifications regarding events that cause damage to property are determined. In one example, the inquiry component 702 may receive user data and generate user preferences from the user data. The inquiry component 702 may be configured to interact with a user to determine the user's preferences for receiving information regarding events that may damage the user's property, such as through a guided experience or by monitoring user interactions with various devices and/or applications as described above. The inquiry component 702 may utilize the user data to determine user preferences for receiving notifications in situations, such as a catastrophic event, that may require imminent action on behalf of the user to prevent damage to the user's property or to keep the user safe.

At block 904, an indication that an event has occurred is received. For instance, the event information refinement component 708 receives event data that includes an indication that an event has occurred or is likely to occur. The indication may be received from a news source, the government data sources 618, the expert data sources 620, and/or the auxiliary loss information services 128. The event may be an event that can cause damage to property, and/or an event that could potentially endanger people. Along with the indication that an event has occurred or is likely to occur, data may be included indicating a location of the event, or a potential location where the event may travel. For instance, the indication may provide a projected path of a tornado, hurricane, flood, or other type of event.

At block 906, event information regarding the event is retrieved from one or more sources. The event information refinement component 708 may leverage sources such as the government data sources 618, the expert data sources 620, and/or the auxiliary loss information services 128 to retrieve real-time information on the event. Further, event information refinement component 708 may receive data regarding the event from "unofficial" sources, such as social networking sites, where users are permitted to post information without the information necessarily being fact-checked. The information regarding the event may be retrieved in an ongoing manner before, during, and/or after the event.

At block 908, an accuracy of the event information and/or a relevance of the event information to the user is determined based at least in part on the preferences of the user. The event information refinement component 708 may determine the accuracy of the event information in a variety of ways. For example, the event information refinement component 708 may limit information to a number of "trusted" sources, such as the government data sources 618, the expert data sources 620, and/or other sources that are designated as trusted. Alternatively, or additionally, the event information refinement component 708 may determine accuracy using the techniques described above, such as by assigning values corresponding to reliability of past event information output by the respective sources, then weighting present and future information output by the sources for accuracy. In another example, event information from different sources may be compared, and event information having the highest number of sources outputting the same or similar information may be used to generate the refined event information. Furthermore, the user may set preferences indicating which sources the user wishes to receive event information from, and the event information refinement component 708 may be limited to using such sources selected by the user.

The event information refinement component 708 may also determine a relevance of the event information to the user, such as based on the preferences of the user. The relevance of the event information to the user may be based on a location of property of the user, a location of the user, and/or a location of other people associated with the user. For example, the event information refinement component 708 may refine the event information based on a proximity of the user's property, the user, and/or other people associated with the user to the event, and include or exclude information that is pertinent based on the proximity. Relevance to the user may also be based on other factors indicated in the user preferences, such as value of items of the user's property, severity of the event, a likelihood that the event will or will not occur, a time estimate of when the event will occur, and so forth.

At block 910, a notification regarding the event is generated based at least in part on the accuracy of the event information and the relevance of the information to the user. For example, the notification component 714 may utilize the rules engine 608 to apply the user preferences to the refined event information to deliver information that the user wants to receive about the event, when the user wants to receive the information, and/or how the user wants to receive the information. In some cases, the rules engine 608 may customize content from the refined event information to be included in the notification based on the user preferences, such as by a determined location of the user, other people associated with the user, and/or the user's property in relation to a location of the event.

The notification component 714 may customize how the notification is to be output based on the user preferences, such as which device to send the notification to, which platforms are preferred to deliver the notification (e.g., text messages, email, Facebook® message, phone call, etc.), which device/platform to deliver notification based on a delivery time of the notification, customized alert settings for event notifications (e.g., silent mode "override" to provide an auditory alert, different sounds to identify event notifications, etc.), and so forth. For example, the notification component 714 may direct the notification to a device and/or application currently being used by the user, such that the user receives time-sensitive information about the event in an efficient manner.

Then, at block 912, the notification is caused to be output via a client device associated with the user according to the preferences of the user, where the notification enables the user to respond. The user may respond by requesting more information about the event, for instance, such as by requesting for subsequent updates about the event, supplementary information about the event information included in the notification, how the event may affect the user, other people, other locations, or the user's property, and so forth. In some examples, the notification may initiate a conversation with the user regarding the event, enabling the user to obtain desired information without navigating to numerous different locations which may take up valuable time. Further, as part of the conversation with the user, the storm helper system 132 may leverage various information sources (e.g., the event information system 118, the auxiliary loss information services 124, etc.) and/or preferences of the user (e.g., user rules 610, property data 612, policy data 614, etc.) to provide information. Additionally, as the conversation progresses, the storm helper system 132 may "learn" from responses provided by the user, such as by leveraging machine learning or other forms of artificial intelligence as described above.

First Notice of Loss (FNOL) System

Figure 10:
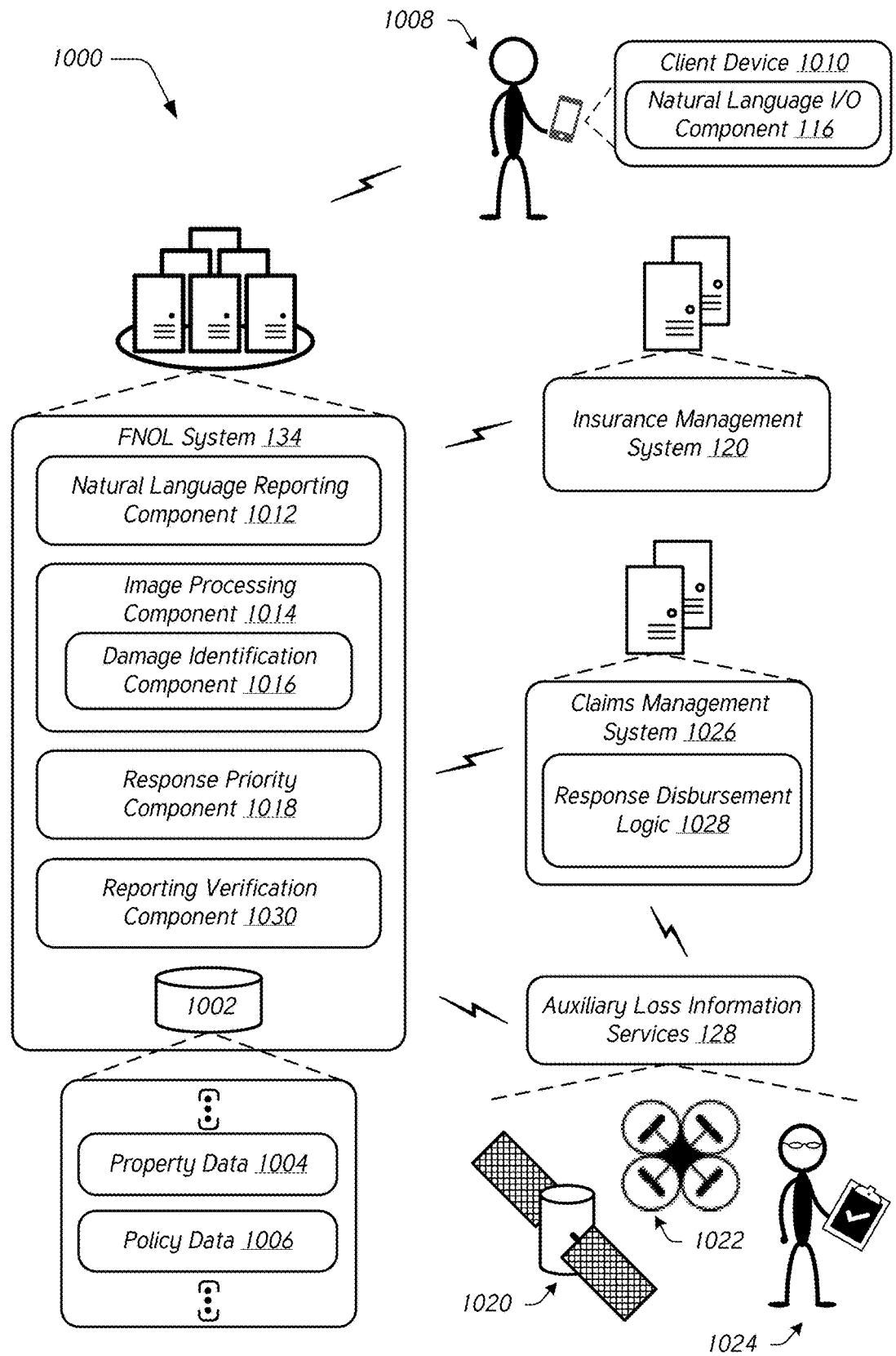
FIG. 10 illustrates example details of the first notice of loss (FNOL) system of FIG. 1 in accordance with various embodiments.

FIG. 10 illustrates an example environment 1000 that includes the first notice of loss (FNOL) system of FIG. 1 in accordance with various embodiments. The FNOL system 134 is shown may include storage 1002 to maintain property data 1004 and/or policy data 1006 for a user 1008. Storing the property data 1004 and the policy data 1006 allows the FNOL system 134 to access and utilize this data readily when a notice of loss is received from the user 1008, and continue to use this information with interactions with the user as the loss is reported.

The property data 1002 may include information about the property of the user 1008, such as location, type of property, model, size, additions or remodels to the property, previous damage or loss to the property, and so forth. The property data 1002 may be obtained from the user 1008 in a variety of ways, such as through a questionnaire filled out by the user, digital images of the property, accessing publicly available information (e.g., property records), and so forth. In some examples, the property data 1002 may be provided by a client device 1010 of the user 1008, such as by taking digital images with the client device and uploading the digital images to the FNOL system 134.

The policy data 1006 includes information about an insurance policy or policies that belong to the user 1008. The policy data 1006 may include information about an insurance policy or policies that cover or otherwise correspond to property indicated in the property data 1004, which may be leveraged to provide relevant information in response to an event involving the property. The policy data 1006 may be obtained from the insurance management system 124, and be updated should changes be made by the user 1008 and/or an insurer as indicated by the insurance management system. Alternatively or additionally, the FNOL system 134 may update the insurance management system 124 in response to a notice of loss reported to the FNOL system to enable the insurance management system to update deductible information, determine subsequent insurance rates, detect fraud, and so forth.

The FNOL system 134 may include a natural language reporting component 1012 configured to conduct natural language conversations with the user 1008 via the client device 1010 to assist the user with reporting a notice of loss. For example, the natural language reporting component 1012 may draw information from the property data 1004 and/or the policy data 1006 to generate inquiries and/or responses to be output by the natural language I/O component 120 of the client device 1010. The natural language I/O component 120 may virtually simulate a conversational entity to the user 1008 of the client device 1010 as part of a dialog system to implement a natural language conversation.

The natural language I/O component 120 receives natural language inputs from the user 1008 which may then be communicated to the natural language reporting component 1012 as appropriate. Further, the natural language I/O component 120 may receive responses or other content from the natural language reporting component 1012 and/or output the responses (or locally generated responses) to a user. In this example, the natural language reporting component 1012 and the natural language I/O component may facilitate a conversation with the user 1008 to report a loss that is easy for the user to understand and navigate. Additionally, by facilitating a natural language conversation with the user 1008 to report a loss, the natural language reporting component 1012 can improve functioning of a computing device of the FNOL system 134 by reducing incorrect information submitted by the user 1008 in reporting loss, thus reducing the amount of data needed to be stored in storage 1002.

The FNOL system 134 may also include an image processing component 1014 configured to analyze components of a digital image and/or video submitted by the user 1008 via the client device 1010 as part of reporting a loss. The image processing component 1014 may include a damage identification component 1016 that may automatically identify damage from a digital image and/or video submitted by the user 1008 using techniques such as object recognition or detection (e.g., using neural networks, such as convolutional neural networks). For example, the damage identification component 1016 may be capable of not only identifying what type of damage is present in a digital image, but also an extent of damage. For instance, the damage identification component 1016 may be able to identify a wall having mold damage and an area (e.g., a size and/or dimensions) of the wall that includes the mold damage. The damage identification component 1016 may determine an area, size, and/or dimensions of damage using a reference object, triangulation between multiple images, assuming a camera-to-object distance, requesting the image be taken from a particular distance from the damage (e.g., as part of a natural language conversation via the natural language reporting component 1012), and so forth.

Additionally, the FNOL system 134 may include a response priority component 1018 configured to prioritize reported losses for additional assessment and/or dispatching restoration or repair services. The response priority component 1018 may prioritize a loss reported by the user 1008 based on a number of factors, such as amount of damage sustained, likelihood that the user's property is "totaled" versus repairably damaged, urgency of repairing particular property type sustaining loss (e.g., restoring clean water may be a higher priority than repairing siding on a house), and so forth. The response priority component 1018 may also communicate with the auxiliary loss information services 128, such as satellites 1020, drones 1022, human damage assessors 1024, and so forth to determine areas that should be prioritized for further assistance.

In some examples, the response priority component 1018 may communicate with a claims management system 1026 to efficiently determine which notices of loss provided by a number of users should be prioritized by response personnel. The claims management system 1026 may include response disbursement logic 1028 to assist with determining how many response personnel are available, locations of response personnel, scheduling estimates for response personnel, and so forth. Further, the claims management system 1026 may communicate with the auxiliary loss information services 128 for receiving and/or determining current locations of human damage assessors 1024, determining routes for response personnel to take to efficiently access a loss reported by the user 1008, determining areas that may need assistance that are incapable of communication (e.g., using images from one or more satellites 1020, etc.), and so on.

The FNOL system 134 may further include a reporting verification component 1030 configured to verify aspects of a loss reported by the user 1008, such as to detect fraud. In one example, the reporting verification component 1030 verifies statements made by the user 1008 during a natural language conversation facilitated by the natural language reporting component 1012, with digital images provided by the user and analyzed by the image processing component 1014. The reporting verification component 1030 may detect discrepancies between information provided by the user 1008 during a conversation to report a loss and digital images associated with the reported loss, and in some cases may escalate the reported loss to a human assessor for further review.

In another example, the reporting verification component 1030 may determine discrepancies between information provided by the user 1008 in reporting a loss, and information received from the auxiliary loss information services 128. For instance, the user 1008 may report severe hail damage to the user's vehicle following a hail storm in the area. The reporting verification component 1030 may verify that the user's vehicle was in fact in the vicinity of the hail storm using location-based services of the vehicle along with images received from a satellite 1020 of the hail storm. The reporting verification component 1030 may also verify that damage reported by the user 1008 to the vehicle is similar to damage reported by other users in the area at the time of the hail storm based on images received from one or more drones 1022 and/or reports by human damage assessors 1024.

Figure 11:
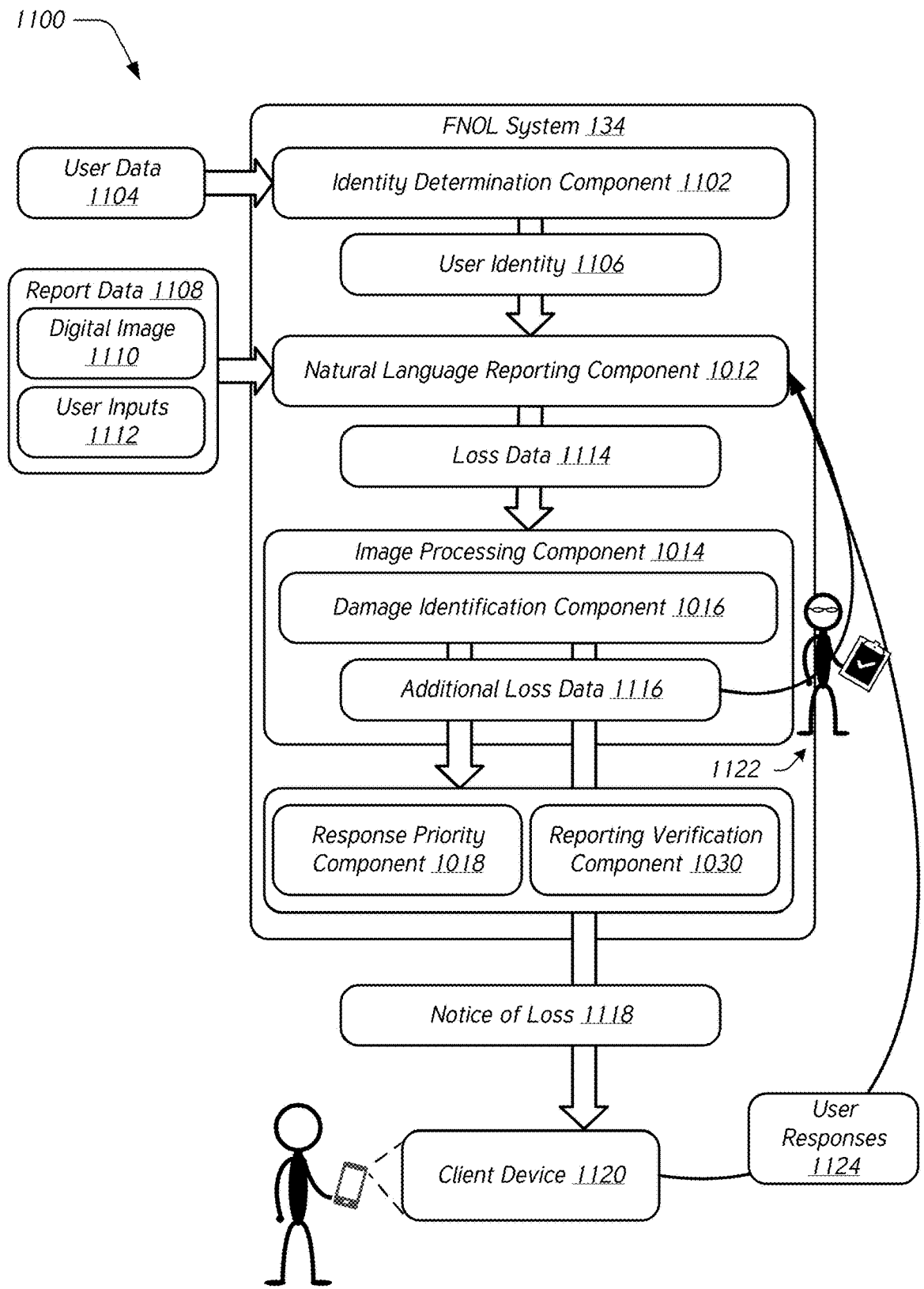
FIG. 11 illustrates an example system including the natural language reporting component and the image processing component of FIG. 10 in accordance with various embodiments.

FIG. 11 illustrates an example system 1100 including the natural language reporting component 1012 and the image processing component 1014 of FIG. 10 in accordance with various embodiments. When a user reports a loss, an identity determination component 1102 may verify an identity of the user. Verifying an identity of the user may be performed in a variety of ways, such as username/password authentication, two-factor or multiple-factor authentication, biometric authentication, facial recognition, and so forth. Once identified, the identity determination component 1102 may access user data 1104 associated with the verified user, such as from the property data 1004 and/or the policy data 1006 of FIG. 10 (not pictured). The identity determination component 1102 may also determine that a particular user is authorized to report a loss, which may be indicated in the policy data 1006 for instance. The identity determination component 1102 generates a user identity 1106 (e.g., user identity data), which may include an identity of a user attempting to report a loss along with property data 1004 and/or policy data 1006 which is authorized to be accessed by the user.

The natural language reporting component 1012 receives the user identity 1106 and uses various components of the user identity 1106 to conduct a natural language conversation with a user to assist with reporting a loss. For example, the natural language reporting component 1012 may identify elements within the user's insurance policy (e.g., included in the user identity 1106) that call for information to report a loss. The natural language reporting component 1012 may transform the elements within the user's insurance policy into natural language requests for the information, which can be output by a client device of the user. For instance, the natural language reporting component 1012 may, as part of a natural language conversation to report a loss, request information using yes/no questions, multiple-choice type questions, open-ended questions that allow the user freedom to respond, and so forth. Further, the natural language reporting component 1012 may also request that the user submit digital images and/or video associated with the loss as part of the conversation. In some cases, the natural language reporting component 1012 may require that the user capture the digital image and/or video at the time of request (e.g., as opposed to retrieving a stored digital image or video from a memory of the user's device) to assist with preventing fraud.

As part of the natural language conversation to report the loss, the natural language reporting component 1012 receives report data 1108 from a user. The report data 1108 may include a digital image 1110 or video, along with user inputs 1112. For example, the natural language reporting component 1012 may request that the user submit digital image of a broken window taken from the interior of a building, and a digital image of the broken window taken from the exterior of the building. The user may supply digital images 1110 of the broken window, one from the interior of the building and one from the exterior of the building as prompted. Once received, the natural language reporting component 1012 may ask the user to submit information on how the window was broken, such as to identify possible responsible third parties. The natural language reporting component 1012 may request this information in an open-ended way, allowing the user to "tell a story" of how the window was broken. The natural language reporting component 1012 may receive a text or voice user input 1112 responding to the request for information on how the window was broken.

The natural language reporting component 1012 may generate loss data 1114 by refining the report data 1108 received from a user. To generate the loss data 1114, the natural language reporting component 1012 may remove unnecessary user inputs 1112, and/or unnecessary portions of the user inputs, that are not relevant to report the loss or are redundant pieces of information. Alternatively or additionally, the natural language reporting component 1012 may delete digital images or video that are unnecessary, redundant, and/or of poor quality. By refining the information received from the user in the report data 1108, a computing device of the FNOL system is improved by reducing processing time of the loss data 1114 when analyzing the reported loss.

The image processing component 1014 receives the loss data 1114 and uses the loss data to process the digital image(s) 1110 received by the FNOL system 134. The image processing component 1014 may utilize various computer vision techniques to automatically identify objects within the digital image 1110, such as the object recognition techniques described above. In some cases, the image processing component 1014 may require that the user capture the digital image 1110 in real time (e.g., as a conversation to report the loss is taking place) to prevent fraud in the documentation of the loss. Alternatively or additionally, the image processing component 1014 may verify when the digital image 1110 was taken, e.g., from metadata associated with the digital image. The image processing component 1014 may, for instance, limit objects to detect within the digital image 1110 to objects identified from the user inputs 1112. In an example, the image processing component 1014 may determine that objects identified in the user inputs 1112 include the words "roof," "gutters," "window," and "siding." Therefore, the image processing component 1014 may limit detection of objects in the digital images to the listed categories, thus further reducing processing resources utilized by a computing device of the FNOL system.

Once objects are identified within a digital image 1110 (or video), the damage identification component 1016 may automatically identify damage to the objects. The damage identification component 1016 may be capable of not only identifying what type of damage is present in a digital image, but also an extent of damage incurred by the objects. The extent of the damage may relate to an area or size of the damage, and may also relate to types and/or quality of materials that incurred damage. Once again, the user inputs 1112 included in the loss data 1114 may be leveraged to reduce processing resources in determining damage in the digital image 1110. For instance, the user inputs 1112 may include a discussion of a tree falling on a house, which damaged the above-noted roof, gutters, window, and siding. Therefore, the damage identification component 1016 may limit analysis of the digital image 1110 to areas around a tree identified in the image, may use feature extraction and/or segmentation to determine areas around the tree to analyze for damage, and so forth.

The damage identification component 1016 generates additional loss data 1116 based on the user inputs 1112 and the analysis performed on the digital image 1110. The additional loss data 1116 may be used in a variety of ways to facilitate generation of a notice of loss 1118. In a first example, the additional loss data 1116 may be used by the natural language reporting component 1012 to build a conversation with the user by generating additional questions and/or remarks based on the objects and damage identified in the digital image. To do so, the additional loss data 1116 may be returned to the natural language reporting component 1012 for use in a continuing conversation with a user to report a loss. In this example, the additional loss data 1116 may indicate that additional user inputs 1112 and/or additional digital images 1110 or video is needed or requested to complete the generation of the notice of loss 1118. This may occur, for instance, when a discrepancy is identified between a user input 1112 and damage identified in the digital image 1110 by the damage identification component 1016, if additional damage is detected by the damage identification component in the digital image that the user was not aware of or did not identify in a user input, and so forth.

In another example, once it has been determined that enough information has been obtained from the user regarding the loss, the notice of loss 1118 may be output to a client device 1120 associated with the user. The notice of loss 1118 may include information such as an estimated damage amount, how to file a claim (e.g., using the claim builder system described below), immediate action that may need to be taken by the user (e.g., turning off water or electrical systems to prevent further damage), a timeframe in which a human assessor may arrive for further analysis, and so on. The notice of loss 1118 may also be output to the insurance management system 124 (not pictured) to document the loss and/or to begin the process of filing a claim, to name a few examples. The notice of loss 1118 may enable the user to provide one or more user responses 1124, such as by using a virtual assistant implemented by the client device 1120 as part of a conversation between the FNOL system 134 and the user regarding the loss. The conversation may enable the user to provide user responses 1124 such as questions about how the loss is analyzed, questions about the next steps in reporting the loss, and/or comments on the loss reporting process, to name a few examples. In examples, guiding a user through reporting a loss using the natural language conversation techniques and digital documentation at the time of the report as described herein is faster and more accurate than conventional techniques that require a human assessor who may take hours, days, weeks, or even months to arrive to document the loss.

In some cases, the additional loss data 1116 may be provided to a human reviewer 1122 to validate the information included in the additional loss data, detect fraud, and so forth. The damage identification component 1016 and/or the natural language reporting component 1012 may be configured to detect conditions that indicate the additional loss data 1116 should be sent to the human reviewer 1122. For example, inconsistencies between the user inputs 1112 and objects detected in the digital image 1110 by the damage identification component 1016 may cause the additional loss data 1116 to be sent to the human reviewer 1122. In another example, damage identified by the damage identification component 1016 exceeding a particular threshold (e.g., an estimated monetary threshold, an estimated area of damage incurred, etc.) may cause the additional loss data 1116 to be sent to the human reviewer 1122. The human reviewer 1122 may be able to provide responses in real time as the loss is reported, such as by providing natural language inputs to the natural language reporting component 1012. In this way, the human reviewer 1122 may assist with the process of reporting the loss, e.g., remotely, without having to visit the location of the loss. Further, the human reviewer 1122 may be selectively invoked based on the conditions set forth and/or learned by the FNOL system 134, thus prioritizing the resources of a human reviewer when losses occur.

Figure 12:
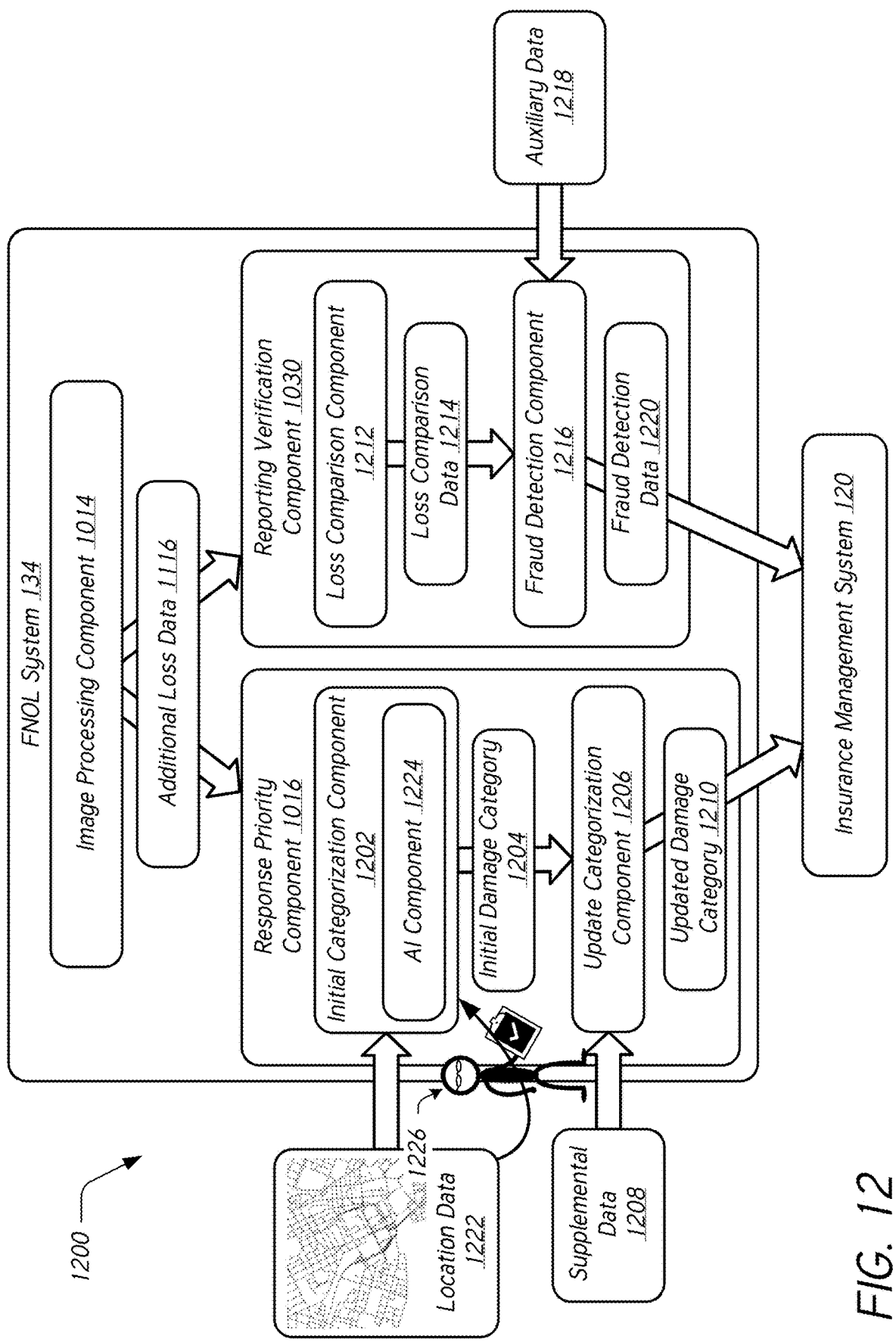
FIG. 12 illustrates an example system including the response priority component and the reporting verification component of FIG. 10 in accordance with various embodiments.

Alternatively or additionally, the additional loss data 1116 may be used by the response priority component 1018 and/or the reporting verification component 1030 to prioritize and verify the loss, respectively. For example, consider FIG. 12, which illustrates an example system 1200 including the response priority component 1018 and the reporting verification component 1030 of FIG. 10 in accordance with various embodiments. As discussed above, the response priority component 1016 may receive the additional loss data 1116 from the image processing component 1014. The additional loss data 1116 includes at least objects identified as damaged in the digital image 1110 (or video), and an extent of damage identified to the objects as identified by the damage identification component 1016.

The response priority component includes an initial categorization component 1202 configured to determine an initial prioritization category of the damage identified in the additional loss data 1116. For example, the initial categorization component 1202 may perform a "high level" analysis of the damage identified in the additional loss data 1116 to determine immediate action that may need to be taken as a result of the damage. The initial categorization component 1202 may receive location data 1222, which may include information such as locations that have been and/or are likely to be affected by an event, severity of damage to different locations, clusters of damage at different locations, and so forth. In some cases, the location data 1222 may be provided to a human reviewer 1226 before being received by the initial categorization component 1202, where the human reviewer 1226 may provide supplementary information and/or insights for prioritization, such as an indication to provide services to a neighborhood before a shopping mall despite the damage incurred by the two different areas. The initial categorization component 1202 may also include an artificial intelligence (AI) component 1224, which may be configured to "learn" from the additional loss data 1116, the location data 1222, and/or inputs provided by the human reviewer 1226 to continually improve prioritization of assistance in response to different types of events in different locations. In some examples, a map as part of the location data 1222 may circulate by the human reviewer 1226 and the AI component 1224 of the initial categorization component 1202 one or more times to refine the priority of dispatching assistance responses on the map.

In the case of a hurricane, for instance, a large number of losses are all typically reported within hours or days of one another, putting strain on assistance and conventional human analysis resources. In these types of scenarios, the initial categorization component 1202 may identify whether a particular user is able to stay in their home or whether it is too dangerous for the user to stay in their home. Additionally, the initial categorization component 1202 may determine whether the home can be fixed relatively quickly (e.g., repairing a small hole in the roof, replacing a single window, removal of large debris from an entry/exit, etc.), and thus enable the user to stay in the home once the quick repair is completed. In examples, the initial categorization component 1202 may prioritize properties based on damage (e.g., properties with more damage are categorized as needing attention sooner, while properties with less damage are categorized as needing attention later).

Using this information, the initial categorization component 1202 may generate an initial damage category 1204 associated with the user and/or an item of the user's property. The initial damage category 1204 may indicate an urgency to which the damage should be attended to. Attending to the damage may include assessment by a human assessor for verification of the damage, dispatching repair personnel to fix damage, and so on. The initial damage category 1204 may also be used to direct a user to leave their home, or that it is safe for the user to remain in their home until the damage is assessed and/or repaired, for example. The initial damage category 1204 may take on a variety of forms, such as a numeric scale (e.g., 1 to 10, percentage, etc.), color association, letter grade, and so forth. Using the FNOL system 134 to allow users to self-report losses and damage to property, and automatically categorizing the reports based on the self-reported damage, allows response personnel to focus on areas that need it most while efficiently returning users to their homes more quickly.

As the process to report a loss proceeds, an update categorization component 1206 may receive the initial damage category 1204, along with supplemental data 1208 regarding the loss. The supplemental data 1208 may be received as a conversation progresses with a user to assist the user with reporting the loss, providing additional details of damage incurred with user inputs and/or digital images and video. Alternatively or additionally, the update categorization component 1206 may utilize information provided in the location data 1222 to assist with updating response priority, such as to assist a cluster of houses with similar damage before servicing houses that are more spread out. In other words, the initial damage category 1204 provides an indication on a high level of whether an immediate response is necessary as a result of a loss, whereas the update categorization component 1206 generates additional information that may be helpful in prioritizing responses to individuals who may fall within the same initial damage category 1204.

Continuing with the hurricane example from above, an initial damage category 1204 may be assigned to a group of users whose homes are not damaged enough that the users need to leave, but do need swift attention. Following the assessment to determine the initial damage category 1204, the natural language reporting component 1012 may continue the process of obtaining information from individual users about the loss. The natural language reporting component 1012, for instance, may request that a first user submit digital images from different angles of roof damage such that the damage identification component 1016 may determine a size of the damage and complexity of repairing the damage to prevent additional damage from rainwater and debris entering the home.

The natural language reporting component 1012 may also request that a second user submit additional information about the second user's private drinking water well that may have been contaminated by hurricane flooding. Although both the first user and the second user fall into the same initial damage category 1204, the urgency to respond to the respective users may differ based on the supplemental data 1208 provided to the update categorization component 1206. The update categorization component 1206 may use the supplemental data 1208 to generate an updated damage category 1210, which may provide additional granularity on how to respond to different users in the same initial damage category 1204. The updated damage category 1210 may be output to the insurance management system 124 as pictured for use in dispatching additional human assessors, facilitating claims management, and so forth. The updated damage category 1210 may be output to other systems as well, such as the materials and labor services 126 of FIG. 1 to dispatch repair personnel and/or the auxiliary loss information services 128 of FIG. 1 to provide large-scale damage assessments for different locations, to name a few examples.

Although not explicitly pictured, the initial damage category 1204 and/or the updated damage category 1210 may be submitted to the human reviewer 1226 to provide input on the damage categorizations. The initial damage category 1204 and/or the updated damage category 1210 may be provided to the human reviewer 1226 on a macro (e.g., town-wide, city-wide, county-wide, etc.) basis, and/or a micro (e.g., individual home or commercial property) basis. The human reviewer 1226 may re-prioritize damage categories as appropriate, which may be used by the AI component and/or other artificial intelligence systems to "learn" how to better prioritize assistance responses. In one example, the human reviewer may select areas on a map to categorize for response priority level. The human reviewer, for instance, may recognize a dense area of houses that are damaged and the type of damaged reported by the users corresponding to the houses. Then, the human reviewer may select a region that includes houses without water and electricity as a high priority area for responders, so that such houses may be repaired before other houses with less severe damage and/or houses that users may remain in for a longer period before repair.

Additionally, a loss comparison component 1212 of the reporting verification component 1030 may receive the additional loss data 1116 to verify various aspects of the reported loss. For example, the loss comparison component 1212 may verify that the user inputs received from a user regarding the loss "match up" with the digital images or video provided by the user. Further, the loss comparison component 1212 may track the user inputs and/or the digital images or video provided by the user throughout a conversation with the user regarding the loss for consistency. Moreover, the loss comparison component 1212 may retrieve data from previous reported losses to ensure that the loss currently being reported is not a repeat of a previously reported loss, or that the loss currently being reported may have resulted from the user withholding repair of a previously reported loss. Therefore, the loss comparison component 1212 may continue to verify different aspects of loss reporting by a user over time, and generate loss comparison data 1214 which may be incorporated into an insurance profile for the particular user. The loss comparison data 1214, for instance, may be used in determining policy rates for individual users based on how trustworthy an individual user is in reporting loss.

Furthermore, a fraud detection component 1216 of the reporting verification component 1030 receives the loss comparison data 1214 and/or the additional loss data 1116, and uses said data to potentially detect fraud from a report of loss by a user. In addition to the verification performed by the loss comparison component 1212 to determine consistency of information provided by an individual user, the fraud detection component 1216 may compare the information provided by the user to outside information. One example is to compare loss information provided by a user with auxiliary loss data 1218, which may be obtained from the auxiliary loss information services 128 of FIG. 1.

The fraud detection component 1216 in this example may compare user inputs and/or digital images and video provided by a user to satellite images, drone images, human assessments, and/or other measurements and data provided by the auxiliary loss information services 128. For instance, the additional loss data 1116 may include information provided by a user claiming that the user's property sustained a broken window during a hurricane due to high force winds. The fraud detection component 1216 may verify wind speeds in the area of the user's property from auxiliary data 1218 provided by anemometers at the time of the hurricane. Additionally, the fraud detection component 1216 may access auxiliary data 1218 indicating how many other claims relating to wind speed were submitted from an area surrounding the user's property, and what the other claims related to.

The fraud detection component 1216 may determine that the wind speeds in the area of the user's property were generally not sufficient to break the user's window, and that other users in the area did not submit claims relating to damage due to high force winds. Then, the fraud detection component 1216 may flag the reported loss for further review by a human assessor, reject the reported loss, and/or request more information from the user on the reported loss, to name a few examples. The fraud detection component 1216 may generate fraud detection data 1220 based on the comparison of the user inputs and/or digital images and video regarding the reported loss to the auxiliary data 128. The fraud detection data 1220 may also be incorporated into an insurance profile for the particular user along with the loss comparison data 1214 for determining policy rates for individual users based on how trustworthy an individual user is in reporting loss. The fraud detection data 1220, along with the loss comparison data 1214, may be output to the insurance management system 124 as pictured for use in dispatching additional human assessors, facilitating claims management, and so forth.

Figure 13:
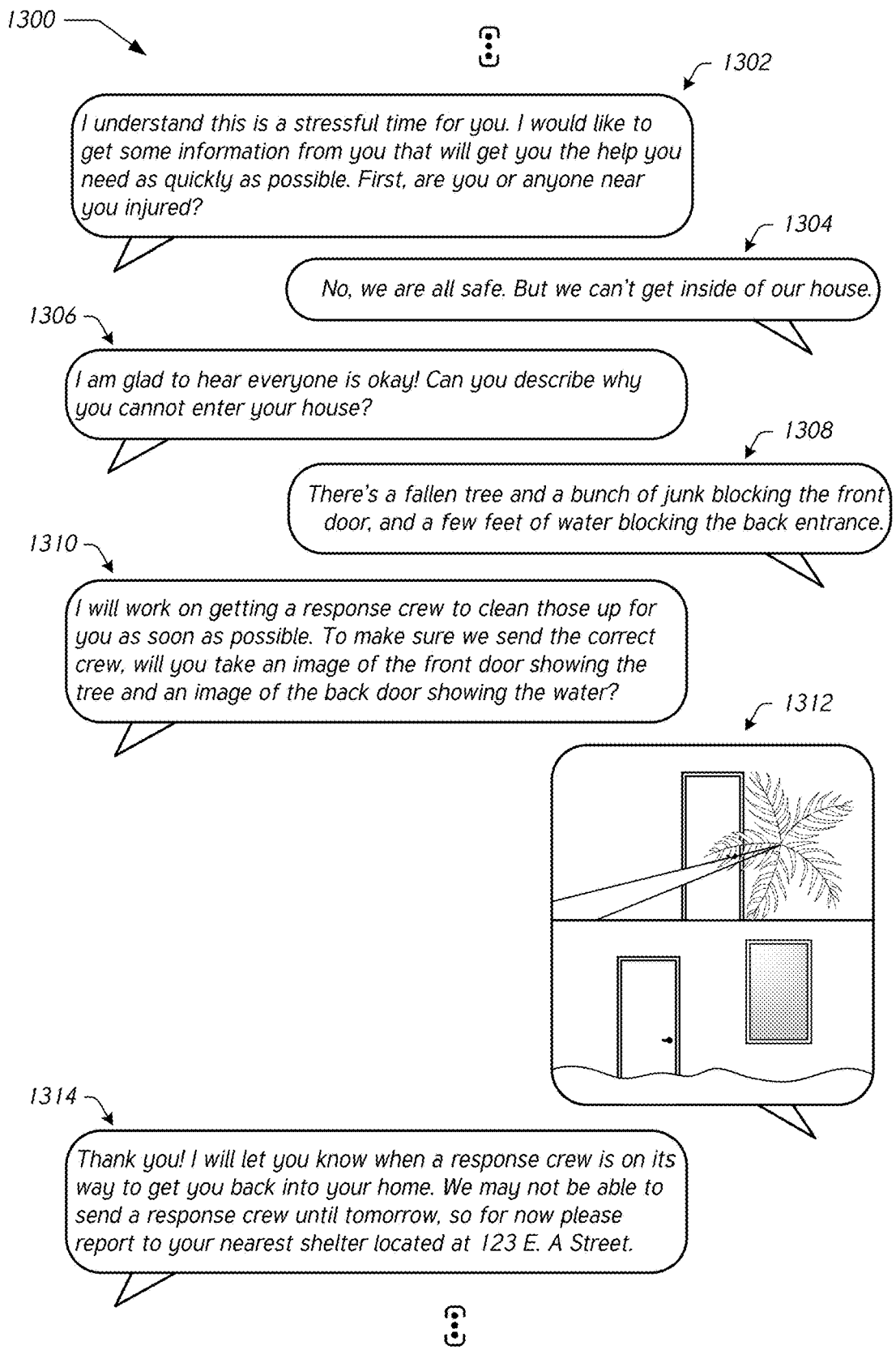
FIG. 13 illustrates an example conversation with a user utilizing the FNOL system of FIG. 10 in accordance with various embodiments.

FIG. 13 illustrates an example conversation 1300 with a user utilizing the FNOL system 134 in accordance with various embodiments. The conversation 1300 is shown taking place via text messaging between a user and the FNOL system 134. However, conversations to report losses using the FNOL system 134 may be implemented using various applications and communication methods, such as telephone calls, messaging interfaces (e.g., Skype®, Facebook® messenger, WhatsApp®, etc.), virtual assistants (e.g., Siri®, Alexa®, Google®), voice, and so forth. As indicated by the ellipses, the conversation 1300 may include portions before and/or after the depicted portion of the conversation conveying information between the FNOL system 134 and the user. For example, the FNOL system 134 may initiate the conversation 1300 with a user following a catastrophic event such as a hurricane, tornado, flood, or earthquake, while a user may initiate the conversation with the FNOL system following a more acute event such as a pipe bursting inside of the user's home, a fire at the user's home, and so forth.

A speech balloon 1302 includes the statement sent from the FNOL system 134 to a user stating, "I understand this is a stressful time for you. I would like to get some information from you that will get you the help you need as quickly as possible. First, are you or anyone near you injured?" The natural language reporting component 1012 of the FNOL system 134 in this example conveys a message to the user expressing concern for the user's situation, along with ensuring that the user and others around the user are uninjured. In some cases, receiving an indication that a person is injured may cause the natural language reporting component 1012 to put the user in touch with emergency services, such as an ambulance dispatcher.

However, a speech balloon 1304 received from the user says, "No, we are all safe. But we can't get inside of our house." The natural language reporting component 1012 may receive this user input and begin building a conversation with the user about the damage, while also prioritizing the reported damage for response and verifying the user's inputs for fraud. Further, the natural language reporting component 1012 may maintain a sympathetic demeanor in outputting requests and responses to the user, thus building the user's trust and reducing stress for the user following the loss event.

For example, the FNOL system 134 responds in a speech balloon 1306, "I am glad to hear everyone is okay! Can you describe why you cannot enter your house?" The FNOL system 134 asks the user an open-ended question in order to obtain more information on the damage to the property. Additionally, a reply by the user to the open-ended question in the speech balloon 1306 may allow the initial categorization component 1202 to begin the process of prioritizing the user's reported damage for response, if necessary.

The user replies in a speech balloon 1308, "There's a fallen tree and a bunch of junk blocking the front door, and a few feet of water blocking the back entrance." The natural language reporting component 1012 may, for instance, identify various keywords from the reply in the speech balloon 1308, such as "tree," and "blocking the front door," and "water blocking the back entrance." Further, this information may be passed on to the initial categorization component 1202 to determine a level of urgency to remedy the damage sustained by the property. The information may also be used by the loss comparison component 1212 to verify consistency within the user's account of damage keeping the user from entering the house.

Next, the FNOL system 134 responds in a speech balloon 1310, "I will work on getting a response crew to clean those up for you as soon as possible. To make sure we send the correct crew, will you take an image of the front door showing the tree and an image of the back door showing the water?" The natural language reporting component 1012 in this example uses reassuring language to make the user feel at ease about the damage to their home being taken care of. Further, the natural language reporting component 1012 requests images from the user of the two identified instances of damage to the house.

The user then replies with two images 1312, first an image of the front door blocked by a tree, along with an image of the back door blocked by water. The image processing component 1014 may, in some cases, compress the two images 1312 for faster processing and analysis, such as by lossless or lossy compression, cropping a digital image to a relevant portion depicting the asserted damage, transforming the image to grayscale, and so forth. The image processing component 1014 may also identify a time stamp associated with the digital images (e.g., from metadata received with the digital images). The time stamp may be used by the loss comparison component 1212 to verify that the digital images 1312 were taken within a threshold amount of time of an event (e.g., a hurricane), and/or were taken within a threshold amount of time preceding the conversation 1300, etc., to ensure that the images are in fact associated with the asserted loss.

Further, the damage identification component 1016 may analyze the damage depicted in the images 1312 to determine a size, extent, and/or materials involved in the damage. For example, the damage identification component 1016 may use the front door depicted in the first of the two images 1312 as a reference object to determine a relative size of the tree or other objects blocking the door. The damage identification component 1016 may output the estimated size of the tree to a response dispatcher to assist the response dispatcher in determining a number of personnel and/or equipment to send to remove the tree. Additionally, the damage identification component 1016 may use a window depicted in the second of the two images 1312 as a reference object to determine a depth and/or area of the water blocking the back door. Then, the damage identification component 1016 may output the estimated amount of water blocking the back door to a response dispatcher to assist with water removal from the house.

The FNOL system 134 then responds in a speech balloon 1314, "Thank you! I will let you know when a response crew is on its way to get you back into your home. We may not be able to send a response crew until tomorrow, so for now please report to your nearest shelter located at 123 E. A Street." In this example, the initial categorization component 1202 may determine that the user is not able to stay in their house for the time being, but the tree identified by the damage identification component 1016 is able to be removed within 24 hours to enable the user to access the interior of the house. Because of the relatively small amount of resources needed to remove the tree and thus allow the user back into the house, the damage reported in this example may be prioritized to be addressed before other, more serious damage that would take more time and resources to fix. In this way, the FNOL system 134 is able to return a larger number of users to their homes faster following damage than conventional systems, which may rely on a first-come, first-served basis for assistance.

Additionally, based on a determination that a response crew may not be able to access the user's house immediately, the FNOL system 134 provides the user with an alternative location for shelter until the user can again enter the house. In some examples, the FNOL system 134 may follow up with the user when the damage is fixed (e.g., by delivering a text message to the user), in this case the tree is removed from the front door allowing the user to enter the house. The FNOL system 134 may also provide tips on what to do when reentering the house to ensure safety and assist with subsequent damage assessment, such as turning off electricity, verifying water is safe to drink, taking photos or video of damage on the interior of the house, and so forth.

Figure 14:
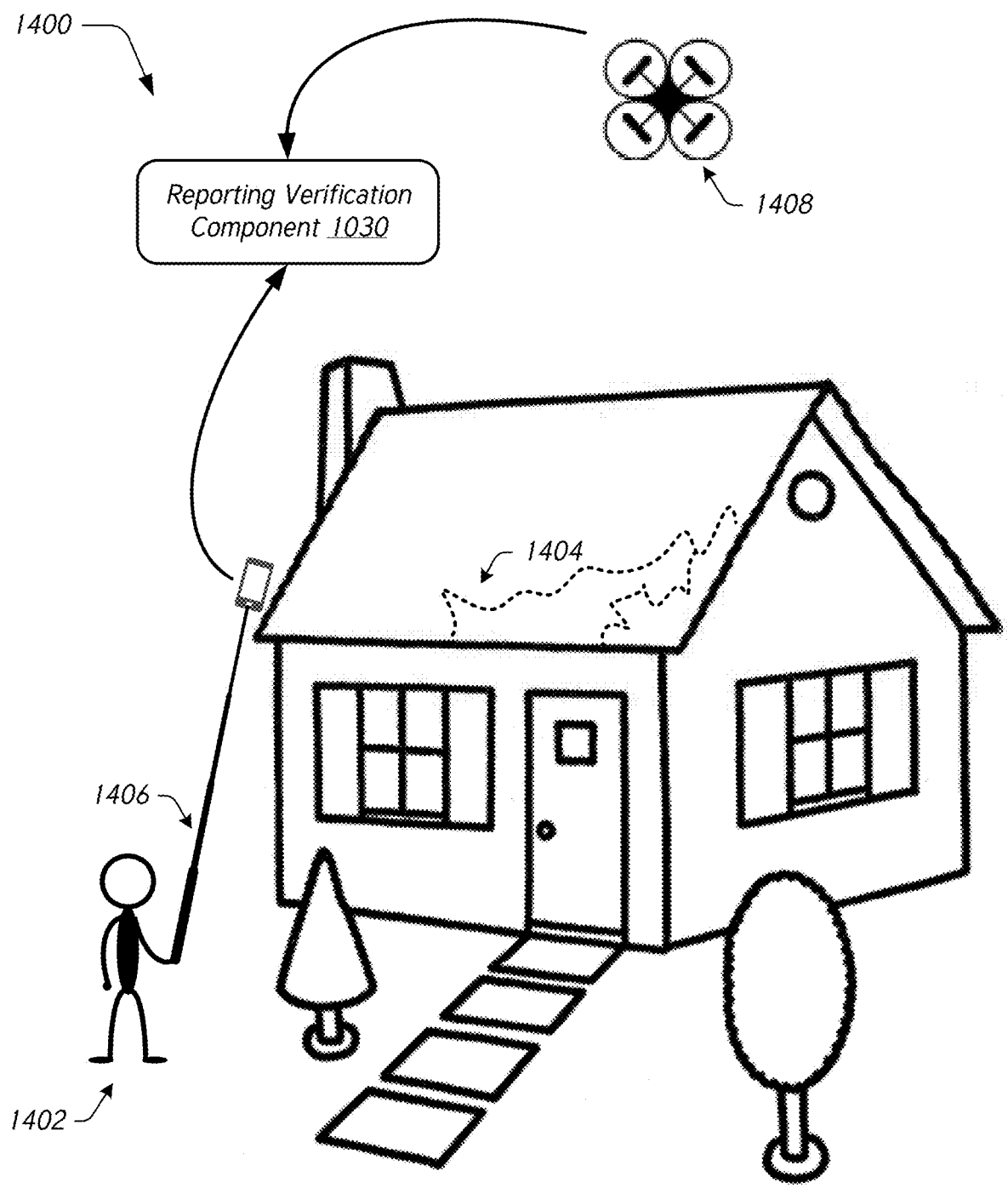
FIG. 14 illustrates an example system with a user providing an FNOL system with data for verification in accordance with various embodiments.

FIG. 14 illustrates an example system 1400 with a user 1402 providing the reporting verification component 1030 of the FNOL system 134 with data for verification in accordance with various embodiments. As discussed above, the reporting verification component 1030 may verify information provided by the user 1402 throughout a conversation to report a loss, along with following up with a user after the initial loss is reported to obtain additional information. In some cases, the reporting verification component 1030 may request digital images and/or video of damage 1404 to the user's property. The user 1402 may provide digital images and/or video using a mobile phone, tablet, camera, and so forth. In the example system 1400, the user 1402 uses a telescoping extender 1406 attached to the user's device to capture digital images and/or video of the damage 1404. The telescoping extender 1406 may allow the user to obtain digital images and/or video of damage that is difficult or dangerous to access without the telescoping extender, such as rooftops, narrow crevices, over unsteady surfaces (e.g., structurally unstable floors), over water, and so forth.

The reporting verification component 1030 may verify the information provided by the user 1402 from the auxiliary loss information services 128. In the depicted example system 1400, the damage 1404 is documented by a drone 1408 which may take digital images and/or video of the damage. The reporting verification component 1030 may verify that the damage 1404 documented in digital images and/or video submitted by the user 1402 coordinates with the damage as documented by the drone 1408, including but not limited to comparing time stamps, comparing extent of the damage, comparing locations of the damage, and so on.

Figure 15:
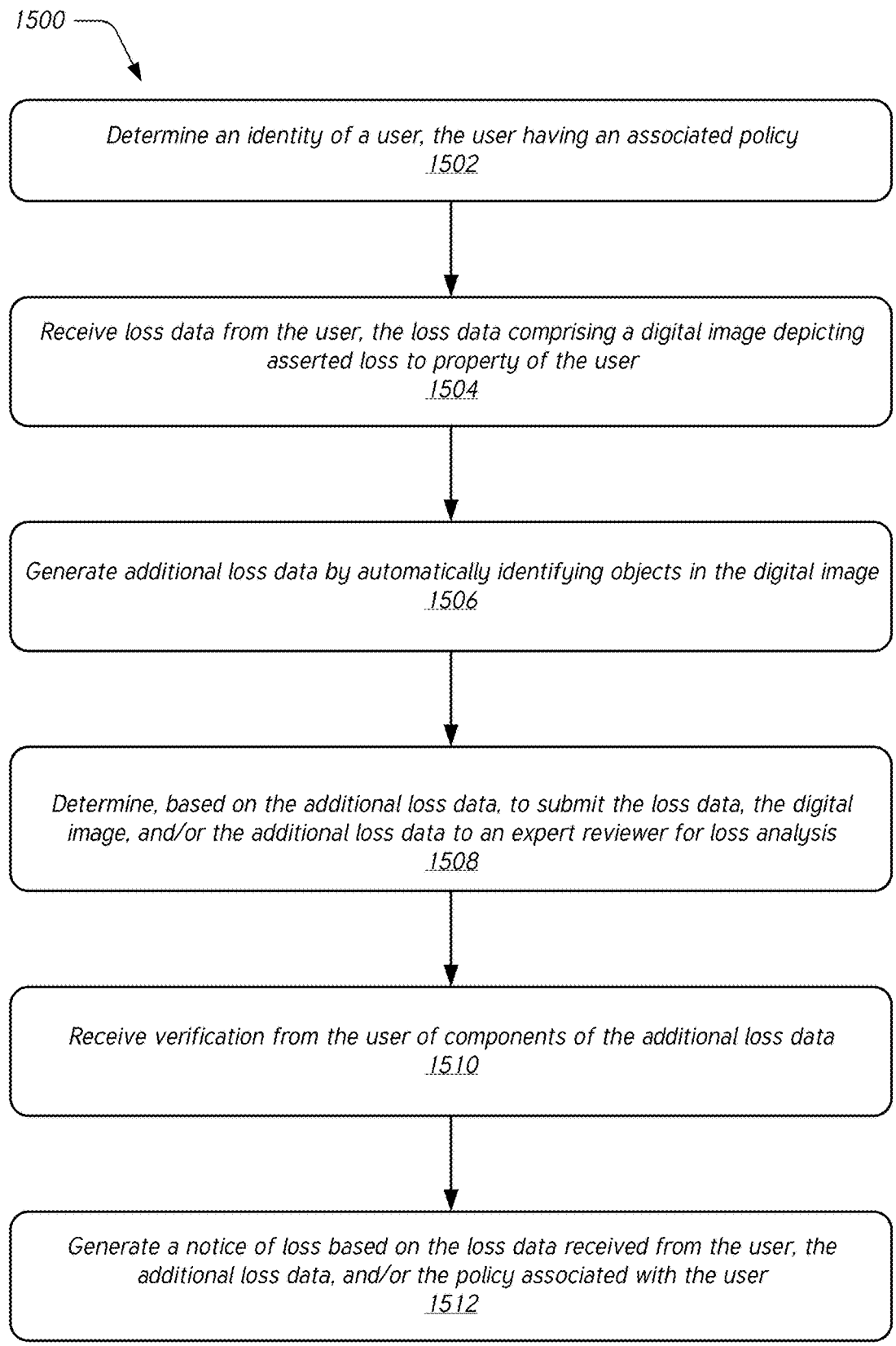
FIG. 15 illustrates an example process flow of generating a notice of loss based on loss data received from a user and identified objects in a digital image depicting asserted loss in accordance with various embodiments.
Figure 21:
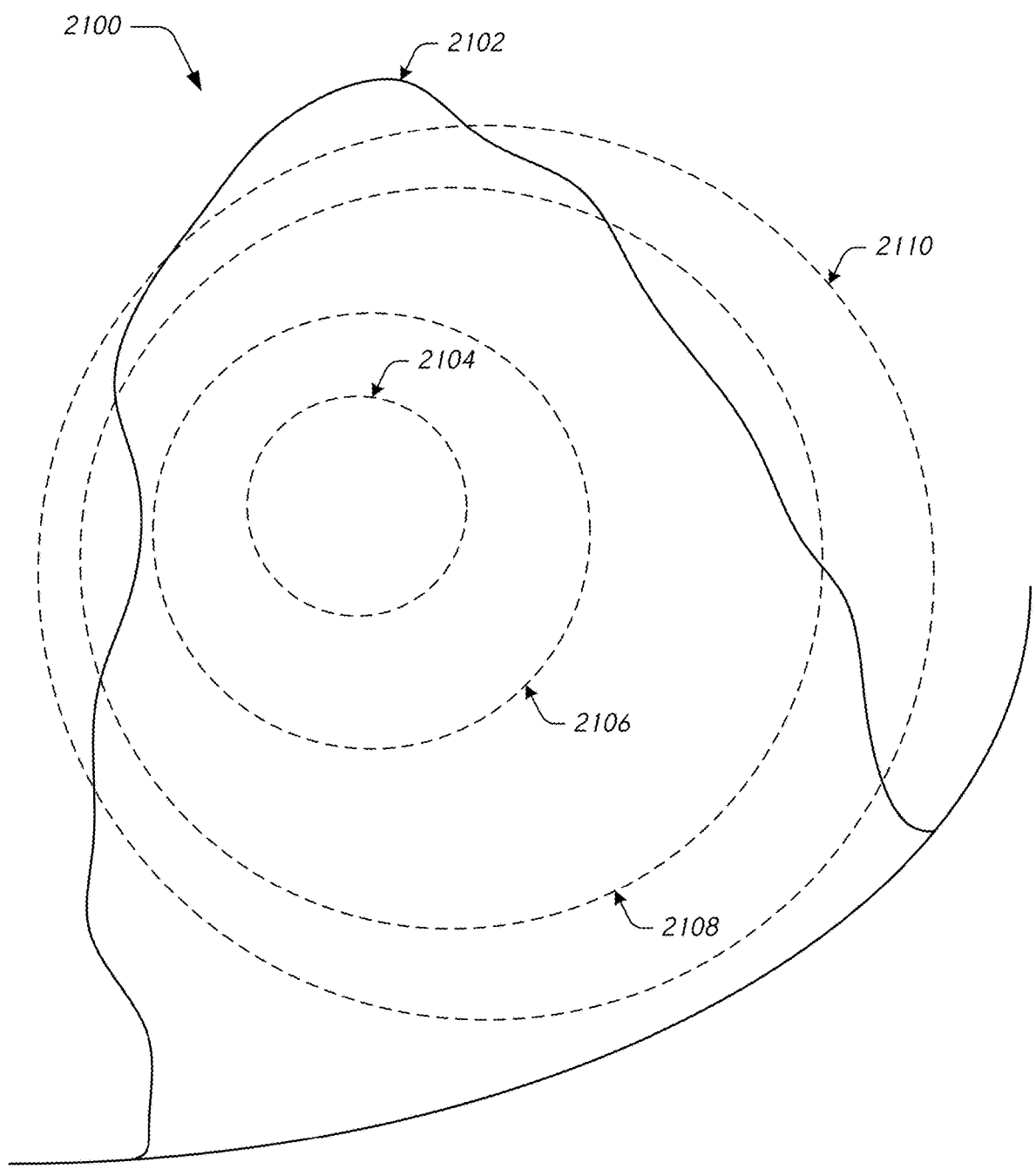
FIG. 21 illustrates an example map for representing areas with similar damage and/or delivering messages to users based on an event in accordance with various embodiments.

An example of a map that may be utilized by the FNOL system 134 for delivering information to users and/or response personnel is illustrated in FIG. 21 and is discussed in more detail below. FIG. 15 illustrates an example process flow 1500 of generating a notice of loss based on loss data received from a user and/or identified objects in a digital image depicting asserted loss in accordance with various embodiments. At block 1502, an identity of a user is determined, where the user has an associated policy. The identity of the user may include property associated with the user, such as property that is covered by the associated policy. The identity determination component 1102 may verify the identity of the user, along with determining that the user is authorized to report a loss of the property.

At block 1504, loss data is received from the user that comprises a digital image depicting asserted loss to property of the user. For example, the natural language reporting component 1012 receives user inputs describing the loss along with digital images and/or video depicting the loss. The natural language reporting component 1012 may conduct a natural language conversation with the user to obtain information to document the loss. To do so, the natural language reporting component 1012 may access the user's insurance policy and determine what information is "needed" to document a loss. Then, the natural language reporting component 1012 may translate the information requested by the insurance policy associated with the user into an easy to understand conversation to obtain the information.

At block 1506, additional loss data is generated by automatically identifying objects in the digital image. For instance, the damage identification component 1016 may generate additional loss data indicating a size of damage relating to the loss. To do so, the damage identification component 1016 may use a reference object in the digital image with a known size to determine a relative size of the damage depicted. The damage identification component 1016 may also identify objects and/or materials that are damaged from the digital image for use in quantifying a loss, identifying safety concerns, selecting response teams to remedy the loss, and so forth. Alternatively or additionally, the response priority component 1018 may generate additional loss data by utilizing the identified objects in the digital image, such as to provide an initial damage category 1204 and/or an updated damage category 1210 as described above. Furthermore, the reporting verification component 1030 may also generate additional loss data by utilizing the identified objects in the digital image, such as to verify consistency within a conversation with the user in the loss comparison data 1214 and/or to verify consistency of the loss from auxiliary data 1218 for the fraud detection data 1220 as discussed above.

At block 1508, the loss data, the digital image, and/or the additional loss data are determined to be submitted to an expert reviewer for loss analysis. The determination to submit the loss data to the expert reviewer may be based on particular words provided by user inputs, inconsistencies during a conversation with the user about a loss, inconsistencies of user inputs with other reported damage in an area surrounding the user, and so forth. The determination to submit the digital image to the expert reviewer may be based on a type and/or severity of damage identified by the damage identification component 1016, inconsistencies between damage identified by the damage identification component and user inputs regarding the damage, a timestamp associated with the digital image (e.g., the timestamp not coordinating with an event that took place being asserted to have caused the damage), and so on. The expert reviewer may review the loss data, the digital image, and/or the additional loss data and request additional information and/or digital images or video from the user, dispatch a human reviewer to the location of the alleged damage, provide an assessment to the insurance management system 120, etc.

At block 1510, verification is received from the user of components of the additional loss data. The verification may be received as part of a natural language conversation with the user to verify all and/or part of the damage. For example, one or more portions of the additional loss data 1116 may be provided to the user to verify damage identified by the damage identification component 1016 in the digital image 1110 that was submitted by the user. The user may be prompted to verify a size/area of damage, materials damaged, cause of damage, and so forth. If the user fails to verify the damage (e.g., does not provide an answer to a request, provides an input that indicates the damage identified by the damage identification component 1016 is incorrect, etc.), the case may be sent to the expert reviewer for further analysis, such as dispatching a human reviewer to consult with the user on the asserted damage.

Information provided by an expert reviewer and/or the user regarding the damage may be used by machine learning or other artificial intelligence systems to improve the natural language reporting component 1012, the image processing component 1014, the response priority component 1018, and/or the reporting verification component 1030. For example, the information provided by the user may be used to improve requests and/or conversation techniques by the natural language reporting component 1012 to promote desired responses in subsequent damage reporting scenarios. The information provided by the expert reviewer and/or the user may also be used by the image processing component 1014 to improve object recognition and damage identification in digital images submitted in subsequent damage reporting scenarios. Other examples are also contemplated.

At block 1512, a notice of loss is generated based on the loss data received from the user, the additional loss data, and/or the policy associated with the user. For example, the natural language reporting component 1012 may output a notice of loss to a client device associated with the user which may include information such as an estimated damage amount, how to file a claim (e.g., using the claim builder system described below), immediate action that may need to be taken by the user (e.g., turning off water or electrical systems to prevent further damage), a timeframe in which a human assessor may arrive for further analysis, and so on. The notice of loss may also be output to the insurance management system 124 to document the loss and/or to begin the process of filing a claim, to name a few examples.

Claim Builder System

Figure 16:
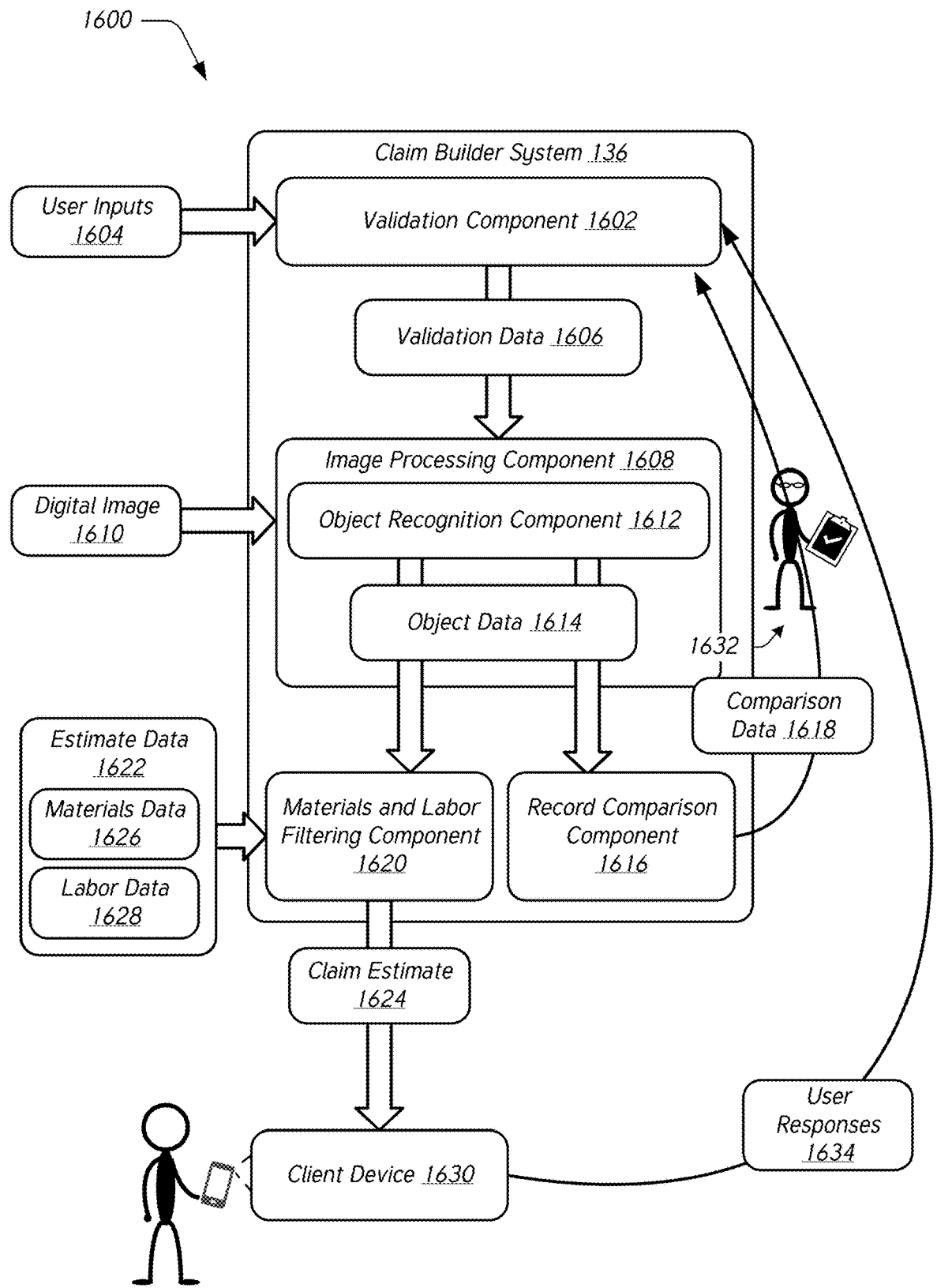
FIG. 16 illustrates example details of the claim builder system of FIG. 1 in accordance with various embodiments.

FIG. 16 illustrates an example system 1600 including details of the claim builder system 136 of FIG. 1 in accordance with various embodiments. A validation component 1602 of the claim builder system 136 may receive one or more user inputs 1604 relating to a claim submission by a user. The user inputs 1604 may indicate an identity of a user, a policy associated with the user, a location or item of property of the user associated with the loss submission, an event that occurred that caused the asserted loss, and so forth. The validation component 1602 may be configured to guide the user through obtaining information which will be used to build a claim for the user, such as by providing the user with a questionnaire or a guided conversation with the user by a virtual assistant, to name a few examples. The validation component 1602 may validate the user inputs 1604 associated with the asserted loss with stored records of property and/or one or more insurance policies associated with the user, which may include updating property and/or policy information based on the user inputs. The validation component 1602 may generate validation data 1606 from the user inputs 1604. The validation data 1606 may include information on the asserted loss which is refined based on the type of loss, property included in the loss submission, a policy covering the loss submission, and so on.

An image processing component 1608 may receive the validation data 1606 and determine one or more items of property from the validation data that the user asserts have sustained a loss. Additionally, the image processing component 1608 may receive one or more digital images 1610 or video from the user depicting the property that the user asserts has sustained a loss. The image processing component 1608 may include an object recognition component 1612 that may automatically identify objects and/or damage from the digital image 1610 or video using techniques such as object recognition or detection (e.g., using convolutional neural networks). For example, object recognition component 1612 may be capable of not only identifying what type of damage is present in a digital image, but also an extent of damage and materials that have been damaged. For instance, the object recognition component 1612 may be able to identify a broken window, a size of the break in the window (e.g., area and/or dimensions), a brand of the window, a model of the window, and so forth. The object recognition component 1612 may determine an area, size, and/or dimensions of damage using a reference object, triangulation between multiple images, detecting a camera-to-object distance (e.g., using a depth sensor), requesting the image be taken from a particular distance from the damage (e.g., as part of a natural language conversation via the validation component 1602), and so forth. The object recognition component 1612 may utilize various computer vision techniques to automatically identify objects within the digital image 1610, such as the object recognition techniques described above.

In some cases, the image processing component 1608 may require that the user capture the digital image 1610 in real time (e.g., as a conversation to submit the claim is taking place) to prevent fraud in the documentation of the loss. Alternatively or additionally, the image processing component 1608 may verify when the digital image 1610 was taken, e.g., from metadata associated with the digital image. The image processing component 1608 may, for instance, limit objects to detect within the digital image 1610 to objects identified from the user inputs 1604. In a specific example, the image processing component 1608 may determine that objects identified in the user inputs 1604 include the words "roof," "gutters," "window," and "siding." Therefore, the image processing component 1608 may limit detection of objects in the digital images to the listed categories, thus further reducing processing resources utilized by a computing device of the claim builder system 136.

The object recognition component 1612 may generate object data 1614 based on the validation data 1606 and/or the digital images 1610 or video received from the user. The object data 1614 may include information such as types of materials identified in the loss submission (e.g., by one or both of the user inputs 1604 or the digital image 1610), quantities of the identified materials identified in the loss submission, sizes of materials identified in the loss submission, and so forth. A record comparison component 1616 receives the object data 1614, and may use the object data to compare the asserted loss with previous losses asserted by the user, such as to detect fraud in the asserted loss. Alternatively or additionally, the record comparison component 1616 may use the object data 1614 to compare the asserted loss with an insurance policy associated with the user to determine whether the loss is covered by the policy and how much of the loss is covered by the policy (e.g., whether the loss meets a deductible of the policy, whether the loss exceeds a maximum payout of the policy, etc.). Furthermore, the record comparison component 1616 may compare the property included in the asserted loss with records of property owned by the user. For instance, the user may assert a loss to a hot tub on the user's property, however the record comparison component 1616 may determine that no record of the hot tub existed on the user's previous insurance policy documentation and thus the loss may not be covered by the user's policy.

The record comparison component 1616 may generate comparison data 1618 indicating discrepancies with the loss asserted by the user. The comparison data 1618 may be output to the validation component 1602 to be used in a conversation with the user regarding the loss. For instance, the validation component 1602 may request additional information from the user regarding the discrepancies included in the comparison data 1618. Continuing with the hot tub example, the validation component 1602 may ask the user whether the user had recently submitted an insurance rider for the hot tub to supplement the user's standard policy. In another example, the record comparison component 1616 may identify that the user previously submitted a claim for water damage and was paid for the claim, and is now submitting a claim for mold damage. Thus, the validation component 1602 may request additional information from the user to assist in determining whether the user fixed the water damage or collected the insurance claim payout, and is now submitting an additional claim due to a direct effect of not fixing the previous damage.

The comparison data 1618 may also be output to an expert reviewer 1632 to review all or part of the information submitted by the user about the claim. The record comparison component 1616, for instance, may flag portions of the comparison data 1618 for review by the expert reviewer 1632 based on threshold amounts of damage asserted (e.g., size of damage, monetary value of damage, etc.), types of property damaged (e.g., as based on an insurance policy of the user), previous claims that the user may be reasserting, and so forth.

The validation component 1602 may continue to collect information from the user until sufficient information is gathered to generate a claim for the insurer, such as through a natural language conversation with the user regarding the asserted damage and/or the user's insurance policy. The validation component 1602 may also utilize the object data 1614 to assist the user in describing the asserted damage by outputting natural language and plain language descriptions of components depicted in the digital image 1610. For example, a user may be asserting a claim based on damage to a wall. The validation component 1602 may ask the user to take pictures of a hole in the wall, which may be used by the object recognition component 1612 to determine materials used to construct the wall. The object recognition component 1612 may use "stock" images of different wall materials to identify which materials were used to construct the damaged wall, for instance.

A materials and labor filtering component 1620 may also receive the object data 1614, along with estimate data 1622 to use in generating a claim estimate 1624. The estimate data 1622 may include materials data 1626, such as pricing of different materials to repair the asserted loss, delivery times of different materials, vendors of different materials, and so forth. The estimate data 1622 may also include labor data 1628, such as pricing of labor to repair the asserted loss, availability of different labor entities, reliability and/or quality ratings of different labor entities, and so on. The materials and labor filtering component 1620 may filter the materials data 1626 and/or the labor data 1628 to provide a claim estimate based on a variety of factors, such as fastest estimated time to completion, closest match to damaged materials, lowest price of materials and/or labor, highest ratings of materials and/or labor, and materials and/or labor vendors previously used by the user, to name a few examples.

The materials and labor filtering component 1620 outputs the claim estimate 1624 to a client device 1630 of the user, who may select from options included in the claim estimate to remedy the asserted loss as described in more detail below. The materials and labor filtering component 1620 may generate the claim estimate 1624 in natural, plain language that includes descriptions that are easy for users with little or no construction knowledge to understand. The materials and labor filtering component 1620 may output the claim estimate 1624 as part of a natural language conversation with the user about the claim, such as using a virtual assistant of the client device 1630. The virtual assistant of the client device 1630 may enable the user to provide user responses 1634, such as part of the natural language conversation with the user about the claim. The validation component 1602, for instance, may be configured to enable clarification by the user regarding the claim, such as follow-up statements and/or questions about the user inputs, digital images and/or video input by the user, and/or the estimate data used to generate the claim estimate. Further, the validation component 1602 may be configured to execute a goal-based dialog with the user as part of a natural language conversation about the claim, where the goal-based dialog uses prompts, statements, questions, and so forth to accomplish a task (e.g., getting sufficient information from the user to generate the claim estimate).

Figure 17:
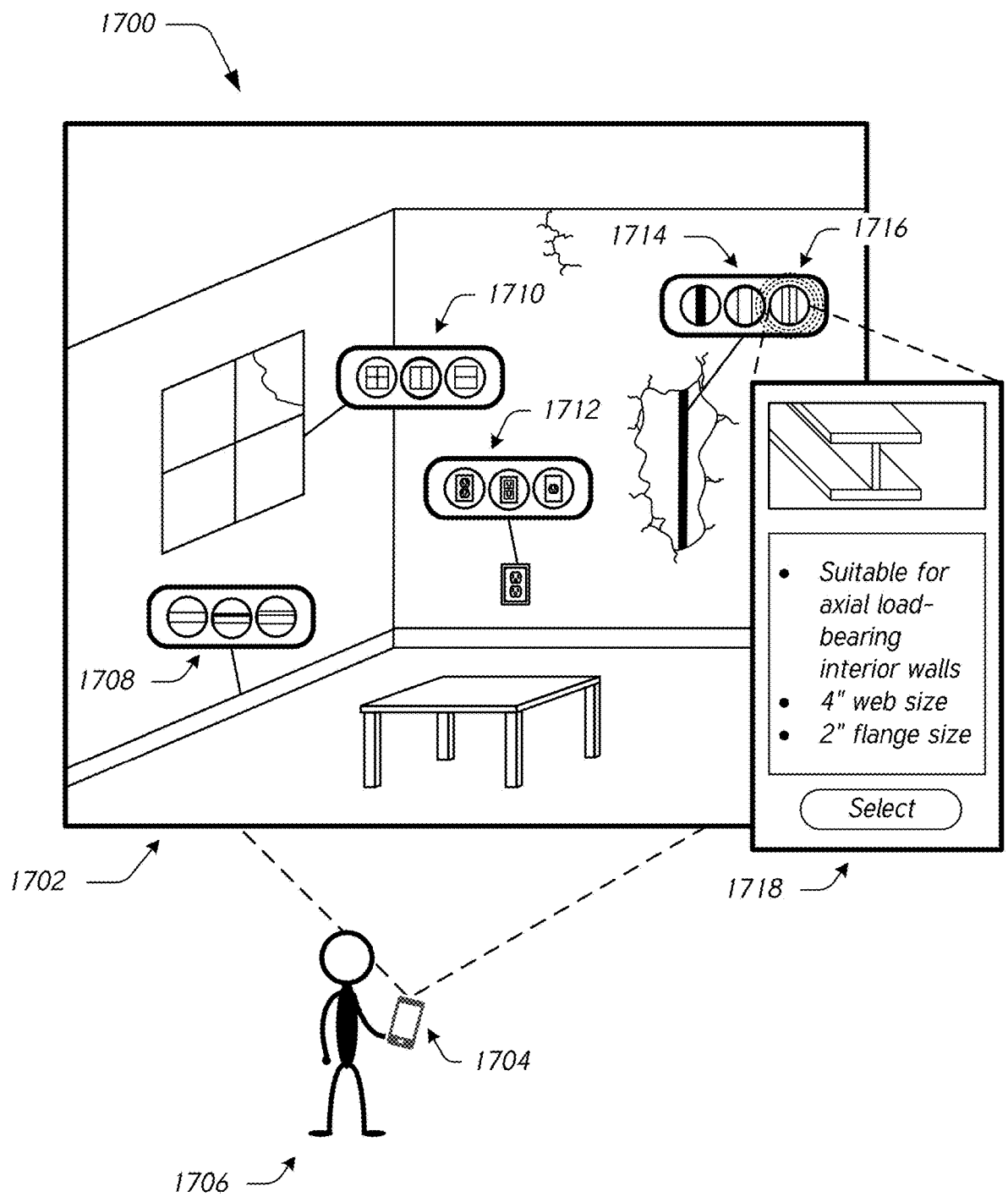
FIG. 17 illustrates an example user interface provided by the claim builder system of FIG. 1 in accordance with various embodiments.

FIG. 17 illustrates an example system 1700 including a user interface 1702 provided by the claim builder system 136 of FIG. 1 in accordance with various embodiments. The user interface 1702 may be displayed by a client device 1704 of a user 1706 who is reporting a loss using the claim builder system 136. The user interface 1702 may include a digital image of a room captured by a camera of the client device 1704, for example. The object recognition component 1612 may identify the room in the digital image, along with various components of the room. As part of building a claim estimate, the claim builder system 136 may select variations of different components to replace components that are damaged, and/or would need to be replaced as part of repairing damage. The claim builder system 136 may narrow the choices to be displayed in the user interface 1702 based on price, availability, similarity to the current component, trends, desired features, and/or ease of installation, to name a few examples.

For example, a trim menu 1708 is displayed in the user interface 1702 having three different trim replacement options. The trim menu 1708 is displayed in the user interface 1702 with an indicator showing which component of the room is related to the items in the menu. A window menu 1710 is displayed with three window options to replace a broken window in the room, with an indicator showing the window related to the items in the menu. In some cases, a digital image may have more than one component of a component type with each respective component having different features (e.g., different sized windows), and each component may have a corresponding menu with different selectable options.

Additionally, an outlet menu 1712 is displayed with three outlet replacement options with an indicator showing the outlet corresponding to the items in the menu. The outlet menu 1712, for instance, may include an upgrade from a standard outlet to an outlet with USB plug-ins, which may be provided as an option based on current trends in outlet installations. Although the user may be given different outlets to choose from in the outlet menu 1712, the claim builder system 136 may assume selections of components that need to be replaced, such as wiring behind the outlet. The claim builder system 136 may make certain component selections without the user's input for non-cosmetic components, components that may require expert knowledge (e.g., an electrician or plumber), and so forth.

Further, a framing menu 1714 is displayed with three different framing replacement options with an indicator showing the damaged portion of the room's frame in the menu. The framing menu 1714 may include an upgrade to a stronger framing component, such as steel beams, based on the damage incurred to the frame at the particular location. The user interface 1702, in some examples, may provide an incentive to select the stronger framing component such as a reduced insurance premium rate, as the stronger framing component may reduce the likelihood of damage in the future. The framing menu 1714 may also include a same or similar component to the component currently included in the wall of the room.

The user 1706 may initiate a selection 1716 of one of the options displayed in the framing menu 1714, such as via a touch input on the client device 1704. In response to the selection 1716, the user interface 1702 may display additional information regarding the selected option in a pop-up 1718. The additional information displayed in the pop-up 1718 may include features that led to selection of the particular option for inclusion in the framing menu 1714, such as size, price, safety features, relevance to the location where the option would be incorporated (e.g., the beam is suitable for load-bearing interior walls, and the beam has been selected for this menu based on an identification by the object recognition component 1612 that the wall is an interior load bearing wall), and so forth. The user may "select" the option in the pop-up 1718 to be included as part of the estimate, and continue making selections of other components of the room using similar pop-ups corresponding to respective components until the claim estimate is complete.

In examples, the user interface 1702 is implemented in an Augmented Reality (AR) context by overlaying user interface icons over real-time images of an environment in which the client device 1704 is located. In other examples, the user interface 1702 is implemented in other contexts, such as displaying user interface icons over a 3D generated model that represents a user's house, displaying user interface icons over a previously captured image of a user's house, etc.

Figure 18:
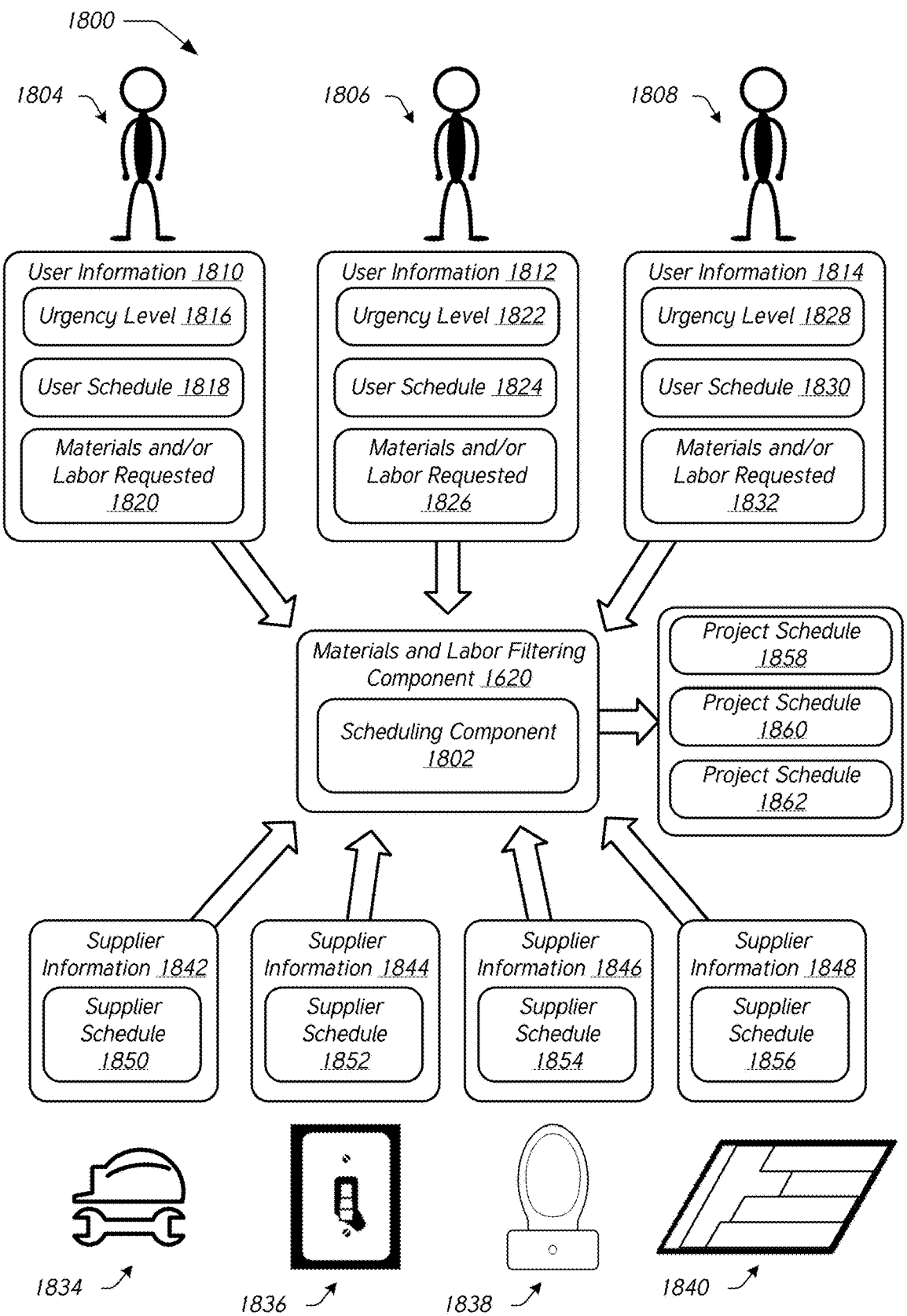
FIG. 18 illustrates an example of inputs that may be used by the scheduling component of the claim builder system of FIG. 15 in accordance with various embodiments.

FIG. 18 illustrates an example system 1800 including inputs that may be used by the materials and labor filtering component 1620 of the claim builder system 136 of FIG. 15 in accordance with various embodiments. In this example, the materials and labor filtering component 1620 may include a scheduling component 1802 configured to generate project schedules to optimize resources and/or a workforce as part of claims submitted by users. The system 1800 includes a first user 1804, a second user 1806, and a third user 1808, each of which have submitted requests for work to be performed as part of a claim. Although three users are pictured, any number of users may be incorporated into scheduling by the scheduling component 1802 without departing from the scope of the disclosure.

The scheduling component 1802 may receive user information 1810, 1812, and 1814 associated respectively with the first user 1804, the second user 1806, and the third user 1808. The user information 1810 may include an urgency level 1816 associated with a claim submitted by the user 1804, a schedule 1818 of the user 1804, and/or materials and/or labor requested 1820 by the user 1804. Additionally, the user information 1812 may include an urgency level 1822 associated with a claim submitted by the user 1806, a schedule 1824 of the user 1806, and/or materials and/or labor requested 1826 by the user 1806. Further, the user information 1814 may include an urgency level 1828 associated with a claim submitted by the user 1808, a schedule 1830 of the user 1808, and/or materials and/or labor requested 1832 by the user 1808.

The urgency levels 1816, 1822, and 1828 may be associated with an urgency of the claim and/or project that the user is requesting. For example, the first user 1804 may have a broken pipe that is causing the user's house to flood, which may cause the user 1804 to have a higher urgency level 1816 included in the user information 1810 than the urgency level 1828 assigned to the third user 1808 who had a tree fall on an outbuilding. The user schedules 1818, 1824, and 1830 may be obtained from digital calendars associated with the respective users 1804, 1806, and 1808, and may be used by the scheduling component 1802 to determine times when the respective users are available to coordinate work as needed. The materials and/or labor requested 1820, 1826, and 1832 correspond to work that has been requested as part of the claim and/or project, and may include selections made by the user as described in relation to FIG. 17, and/or selections automatically determined by the materials and labor filtering component 1620.

The system 1800 may also include various suppliers, such as a general contractor 1834, an electrician 1836, a plumber 1838, and/or a flooring installer 1840. While only four types of suppliers and a single supplier entity for the described types are shown for simplicity, any number of suppliers may be included for scheduling by the scheduling component 1802 without departing from the scope of the disclosure. The scheduling component 1802 may receive supplier information 1842, 1844, 1846, and 1848 associated respectively with the general contractor 1834, the electrician 1836, the plumber 1838, and the flooring installer 1840.

The supplier information 1842 may include a supplier schedule 1850 for the general contractor 1834. The supplier information 1844 may include a supplier schedule 1852 for the electrician 1836. The supplier information 1846 may include a supplier schedule 1854 for the plumber 1838. The supplier information 1848 may include a supplier schedule 1856 for the flooring installer 1840. The supplier information 1842, 1844, 1846, and 1848 may include additional information to be used by the materials and labor filtering component 1620 to assist with scheduling, such as locations of the suppliers (e.g., a "headquarters" and/or locations of other jobs on the respective suppliers' schedules), ratings of the suppliers, completion times for different project types, and so forth which may be used to select suppliers for different projects.

Figure 19:
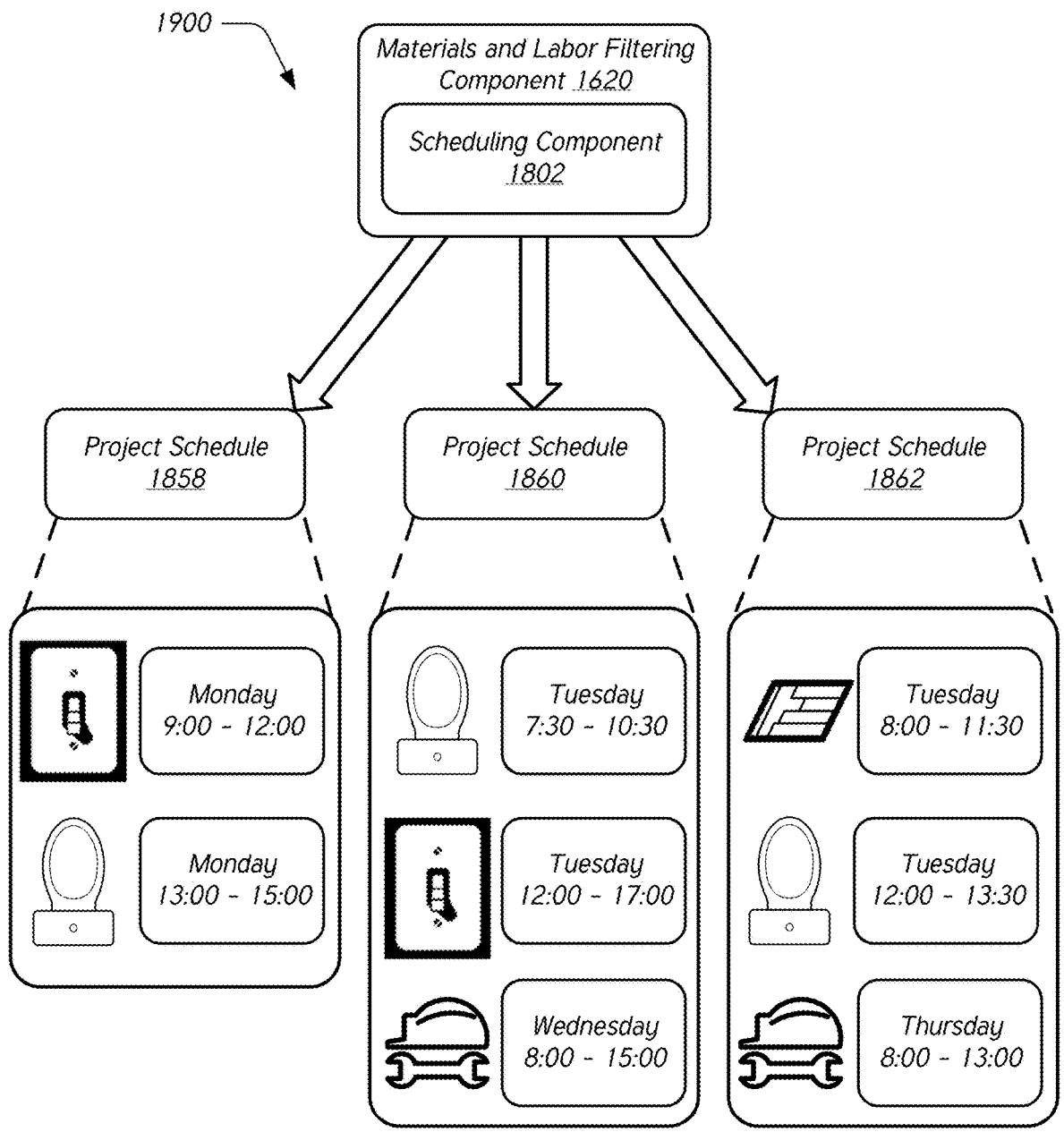
FIG. 19 illustrates example project schedules that may be output by the scheduling component of FIG. 18 in accordance with various embodiments.

The scheduling component 1802 uses the user information 1810, 1812, and 1814, along with the supplier information 1842, 1844, 1846, and 1848 to generate a project schedule 1858 for the first user 1804, a project schedule 1860 for the second user 1806, and a project schedule for the third user 1808. Additional details of the project schedules 1858, 1860, and 1862 are shown in FIG. 19, which illustrates an example system 1900 including the project schedules that may be output by the scheduling component 1802 of FIG. 18 in accordance with various embodiments.

The first project schedule 1858 for the first user 1804 may include the electrician 1836 scheduled to perform work from 9:00-12:00. The time estimate may be provided by the electrician 1836 themselves based on the materials and/or labor requested 1820 by the user 1804. Alternatively or additionally, the time estimate may be determined automatically by the scheduling component 1802 based on the materials and/or labor requested 1820 by the user 1804 and average times to complete similar projects by the particular electrician 1836 and/or other electricians. The project schedule 1858 may also include the plumber 1838 scheduled to perform work from 13:00-15:00. The scheduling component 1802 may leave a "buffer" of time between the work to be performed by the electrician 1836 and the work to be performed by the plumber 1838 (in this case, one hour), to allow for unforeseen occurrences during the electrician's work. In this way, the scheduling component 1802 may prevent circumstances where the plumber 1838 is waiting on the electrician 1836 to finish before the plumber may start working on the project, thus increasing efficiency to finish the project faster.

The second project schedule 1860 for the second user 1806 may include the plumber 1838 and the electrician 1836 scheduled for work on Tuesday, with the general contractor 1834 scheduled to perform work on Wednesday. The scheduling component 1802 may generate the schedule 1860 in this manner based on a determination by the materials and labor filtering component 1620 that the work to be performed by the general contractor 1834 should take place after the work to be performed by the plumber 1838 and the electrician 1836. For example, the materials and labor filtering component 1620 may determine, based on the object data 1614 received from the object recognition component 1612, that new sheetrock will need to be installed following the plumbing and electrical repairs. Therefore, the scheduling component 1802 automatically schedules the plumber 1838, the electrician 1836, and the general contractor 1834 according to an order that the work is to be completed, using the objects automatically detected in a digital image of damage provided by the second user 1806.

The third project schedule 1862 for the third user 1808 may include the flooring installer 1840 and the plumber 1838 scheduled for work on Tuesday, with the general contractor 1834 scheduled for work on Thursday. The plumber 1838 in this example is scheduled for two jobs on Tuesday, one for the project schedule 1860 and one for the project schedule 1862. The scheduling component 1802 may provide a "buffer" of time to allow the plumber to take care of unforeseen occurrences during the plumber's work, and may also allow for travel time between a location of the project associated with the project schedule 1860 and a location associated with the project schedule 1862. The travel time between the projects may account for traffic, stops to pick up supplies needed for the project schedule 1862, stops to drop off waste from the project schedule 1860, and so forth. Furthermore, the scheduling component 1802 may order the project schedules 1860 and 1862 such that the plumber 1838 travels on a "critical path." A "critical path" may include shorter travel times between stops, rather than instructing the plumber to cross a same area multiple times in one day to complete multiple jobs. In this way, the scheduling component 1802 may allow the plumber 1838 (and other suppliers) to complete a greater number of jobs at different locations within a day or work shift, while also increasing efficiency in completing projects for users who have work to be done.

Figure 20:
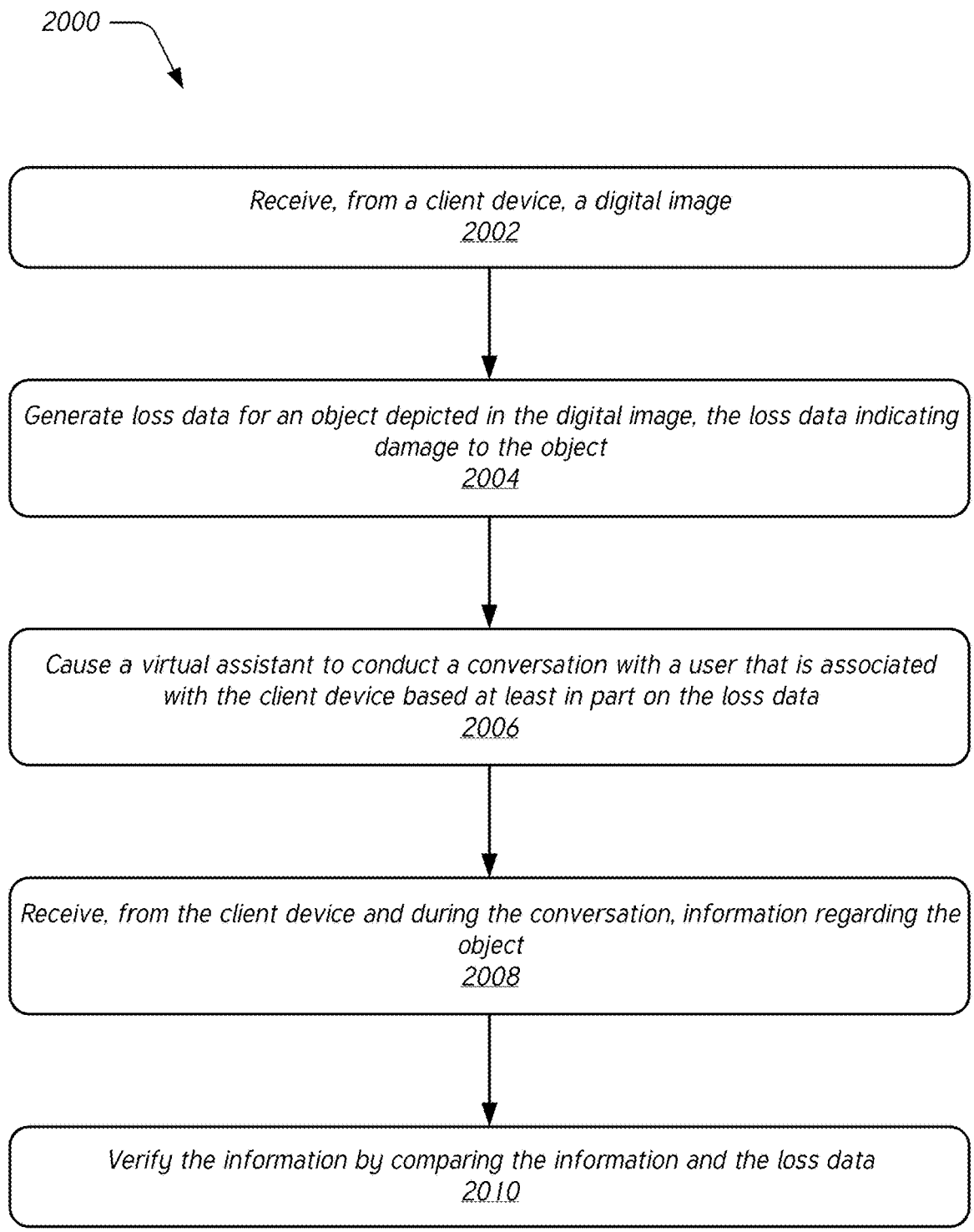
FIG. 20 illustrates a process flow of conducting a conversation with a user based on an identified object in a digital image and loss data generated based on comparing properties of the identified object to known properties for similar objects in accordance with various embodiments.

FIG. 20 illustrates a process flow 2000 of conducting a conversation with a user based on an identified object in a digital image and loss data generated based on comparing properties of the identified object to known properties for similar objects in accordance with various embodiments. At block 2002, a digital image is received from a client device. The digital image may be received by the claim builder system 136 as part of a claim submission asserting a loss or damage to a user's property.

At block 2004, loss data for an object depicted in the digital image is generated, where the loss data indicates damage to the object. For example, the object recognition component 1612 may identify a portion of a building (e.g., a kitchen, living room, roof, etc.), structure (e.g., garage, fence, pool, etc.), or other type of property from the digital image to determine a "context" for objects within the digital image. The object recognition component 1612 may then identify damage to one or more objects in the digital image using, for instance, deep learning or machine learning algorithms to identify different types of damage and/or materials involved in the damage, reference objects and/or multiple digital images of the object to determine size or area of damage, and so forth.

At block 2006, a virtual assistant conducts a conversation with a user that is associated with the client device based at least in part on the loss data. The user may be identified as a policy holder for an insurance policy covering the damaged property, and may be authenticated using the various authentication techniques described above to be allowed access to submit the claim. The virtual assistant may be implemented using text outputs (e.g., text messages, instant messages, etc.), auditory outputs (e.g., by "smart" speakers, mobile devices, etc.), and so forth.

The virtual assistant may be configured to transform the loss data obtained from the digital image into natural, plain language that is easy for users to understand, such that the claim builder system 136 receives sufficient information to complete the claim submission. In some examples, the claim builder system 136 may use decision trees to execute the conversation with the user based on where damage is identified in the digital image. For instance, the claim builder system 136 may follow a decision tree to collect particular information about damage to floors before turning the conversation to another decision tree to collect information about damage to walls.

At block 2008, information regarding the object is received from the client device and during the conversation. For example, the claim builder system 136 may receive user inputs answering questions or requests regarding the reported loss, such as requests for measurements of the damage, make and/or model of an item of property sustaining damage, updates or changes made to the property that may affect the value of the claim, and so on. Alternatively or additionally, the claim builder system 136 may receive selections in a user interface, such as the user interface 1702, that include components to repair and/or replace damaged property identified in the digital image to include in a claim estimate.

At block 2010, the information is verified by comparing the information and the loss data. For example, the record comparison component 1616 may compare dimensions of damage submitted by the user with dimensions of damage identified by the object recognition component. In another example, the record comparison component 1616 may compare information submitted by the user as part of the claim submission regarding the property with information included in the user's insurance policy. Furthermore, the record comparison component 1616 may compare damage reported by the user as part of the claim submission with damage reported by other users in an area surrounding the user's property to verify that the damage was sustained as the result of an event, such as a hurricane, flood, or tornado. Based on the verification, the validation component 1602 may request more information from the user, and/or a human assessor may be dispatched to a location of the property for further verification of damage, to name a few examples.

FIG. 21 illustrates an example map 2100 for representing areas with similar damage and/or delivering messages to users based on an event in accordance with various embodiments. A border 2102 may represent an area of a city or town, for instance, where an event has occurred causing damage to property. The border 2102 may correspond to other areas, such as a county, state, province, country, a user-defined area, and so forth. In a first example, the map 2100 may be used to indicate status levels of damage, such as for the insurance management system 120. The status levels may correspond to the areas 2104, 2106, 2108, and/or 2110, where a center area 2104 corresponds to an area with the most severe damage, and expanding out through the areas 2106, 2108, and 2110 with less severe damage, respectively.

The status levels may be determined by the FNOL system 134 as losses as a result of an event are reported by individuals and data corresponding to the losses is aggregated by the FNOL system. Alternatively or additionally, the status levels may be determined and/or refined by an expert reviewer, which may then be used by the FNOL system 134 and one or more machine learning or other artificial intelligence systems to "learn" how to determine the status levels based on reported damage. Thus, the map 2100 may provide the insurance management system 120 and/or other relief dispatchers with a visual representation of where damage is severe, which areas to respond to first, which areas have sustained different types of damage (e.g., to dispatch different types of relief and/or repair services), and so forth.

Alternatively or additionally, the map 2100 may be used to deliver personalized messages to users in response to the event. For instance, the FNOL system 134 may determine that a large number of users in the area 2106 (e.g., greater than a threshold amount and/or percentage of users for the area) have reported broken windows on their homes due to flying debris in high winds. The FNOL system 134 in this example may also determine that fewer users in the areas 2108 and 2110 (e.g., below the threshold amount and/or percentage of users in the area) have reported broken windows. The FNOL system 134 may use this information to generate a first notification for users in the area 2106, such as, "We have noticed a large number of reports of broken windows from flying debris in your area. Have you encountered any broken windows to your property as a result of the storm?" The FNOL system 134 may also use this information to generate a second notification for users in the areas 2108 and 2110 that are not specific to windows, such as, "I hope you are safe following the storm. Do you have any damage to your property that you would like to report?"

Continuing with the same example, the FNOL system 134 may determine that a significant number of users have not provided any notification following the event in the area 2104 (e.g., greater than a threshold amount and/or percentage of users for the area). For instance, the users in the area 2104 may have sustained injuries and/or damage that prevents the users from reporting a loss. In this case, the FNOL system 134 may deliver a customized notification to the users in the area 2104 to ask the users if they have any injuries, need immediate assistance (e.g., an ambulance or emergency response team), and/or have a loss to report. Then, the FNOL system 134 may guide the users through a conversation to provide the users with assistance based on a current situation of the individual users.

FIG. 22 illustrates an example map 2200 for proactively delivering messages to users and/or response personnel based on an event in accordance with various embodiments. The map may be displayed by a client device 2202 to provide information about an event that is occurring and/or is likely to occur. The event described in relation to FIG. 22 is a fire, although other examples of events are considered, such as hurricanes, earthquakes, tropical storms, tornados, floods, and so forth. The map 2200 may provide users and/or response personnel with an indication 2204 of where the fire has already affected. This may give users with property in an area indicated by the indication 2204 an idea of whether their property was damaged by the event. Additionally, the indication 2204 may provide response personnel with areas to direct efforts, such as ambulance and/or emergency response teams.

Furthermore, the map 2200 may include an indication 2206 of where the fire (or other event type) is likely to impact before the fire is resolved, along with a direction of travel 2208 of the fire. The indication 2206 and/or the direction of travel 2208 may provide users who are located in an area referenced by the indication 2206 to leave in order to promote safety of the users. In addition, the indication 2206 and/or the direction of travel 2208 may provide response personnel with information on where to go to perform proactive measures, such as fireproofing homes (e.g., wetting down roofs, wetting down exposed wood, removing exterior flammable items, etc.), notifying people located in the area (e.g., people without access to other notification systems), and so forth. The storm helper system 132 may provide different response personnel having different functions with routes, addresses, locations, and/or directions to specific areas in either the indication 2204 and/or the indication 2206 on the map 2200 where their functions are needed. Furthermore, the indication 2206 and/or the direction of travel 2208 may be leveraged by the storm helper system 132 to deliver an evacuation notice to users in the path of the fire, such as by determining a current location of a user (e.g., using GPS, location-based services, etc.), property of a user in the path, and so forth.

Additional Example Processes

Figure 23:
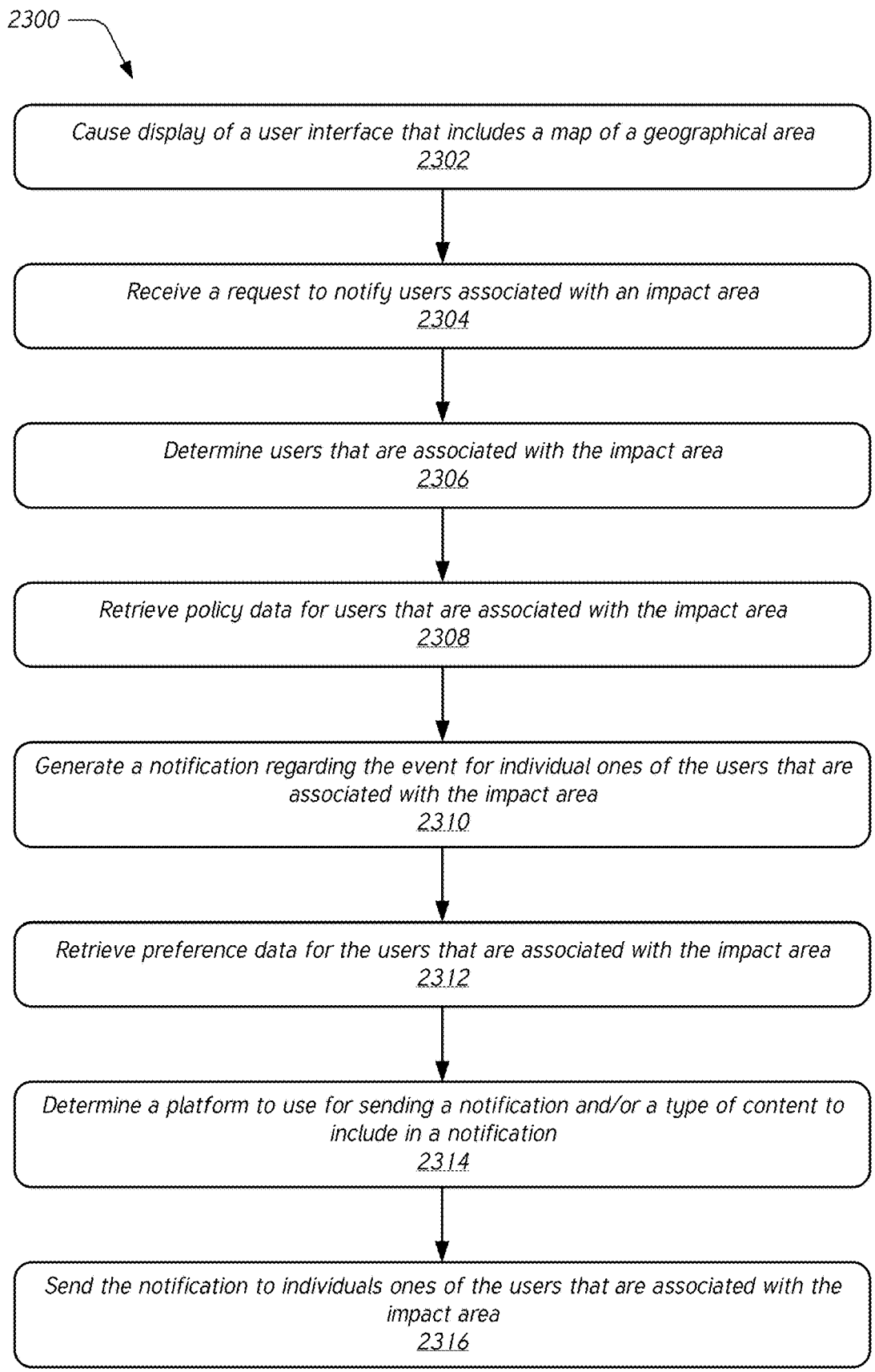
FIG. 23 illustrates a process flow of providing a notification regarding an event in accordance with various embodiments.

FIG. 23 illustrates a process flow 2300 of providing a notification regarding an event in accordance with various embodiments. The process 2300 may be performed by any of the devices discussed herein, such as a service provider system, a client device, a combination thereof, and so on.

At block 2302, a user interface is caused to be displayed. For example, user interface data may be sent to a computing device for display of a user interface via the computing device. The user interface may include a map of a geographical area, an event visual representation representing an event, and/or an impact visual representation indicating an impact area where the event is estimated to impact (e.g., a geographical area where the event is likely to cause damage). The event visual representation and/or the impact visual representation may be displayed in an overlaid manner on the map. The event may include a hurricane, a tornado, a fire, a flood, an earthquake, etc.

At block 2304, a request is received to notify users associated with an impact area. For example, a user may interact with the user interface on a computing device to select the impact visual representation and provide input requesting that a notification be sent to users within the impact area. The computing device can send a request to a service provider to notify users associated with the impact area.

At block 2306, users that are associated with the impact area are determined. For example, policy data may be searched to identify users that have property located within the impact area. The policy data may include address information for multiple users.

At block 2308, policy data for users that are associated with the impact area are retrieved. For example, policy data for the users that have property located within the impact area may be retrieved from a database for analysis and/or processing. The database may store policy data for multiple users. Policy data for a user may include information about an insurance policy for the user.

At block 2310, a notification is generated regarding the event. For example, a customized notification may be generated for individual ones of the users that are associated with the impact area based on policy data for individual ones of the users. A customized notification may be personalized for a particular user. In some embodiments, a customized notification for a user is based on preference data for the user, such as preference data retrieved at block 2312.

At block 2312, preference data for users that are associated with the impact area is retrieved. For example, preference data for users that associated with the impact area may be retrieved from a database for analysis and/or processing. The database may store preference data for multiple users. Preference data may specify a variety of preferences for a user, such as a preference for receiving a notification.

At block 2314, a platform to use for sending a notification and/or a type of content to include in a notification is determined. For example, based on preference data for a user, a determination may be made to use a platform when sending a customized notification for the user and/or to include a type of content in the customized notification for the user. In some embodiments, a platform may include an email platform, a text messaging platform, a social media platform, a telephone platform, and so on.

At block 2316, a notification is sent to individual ones of the users that are associated with the impact area. For example, a customized notification may be sent to a client device of a user that is associated with the impact area. In some embodiments, a customized notification may initiate a conversation between a user and a virtual assistant. For example, the user may select a notification to have a conversation with a virtual assistant regarding an event. In some embodiments, a notification may be sent to a user via a specific platform, such as a platform determined at block 2314. Further, in some embodiments, a notification may include content that is based on a specific type of content, such as content determined to use at block 2314.

Figure 24:
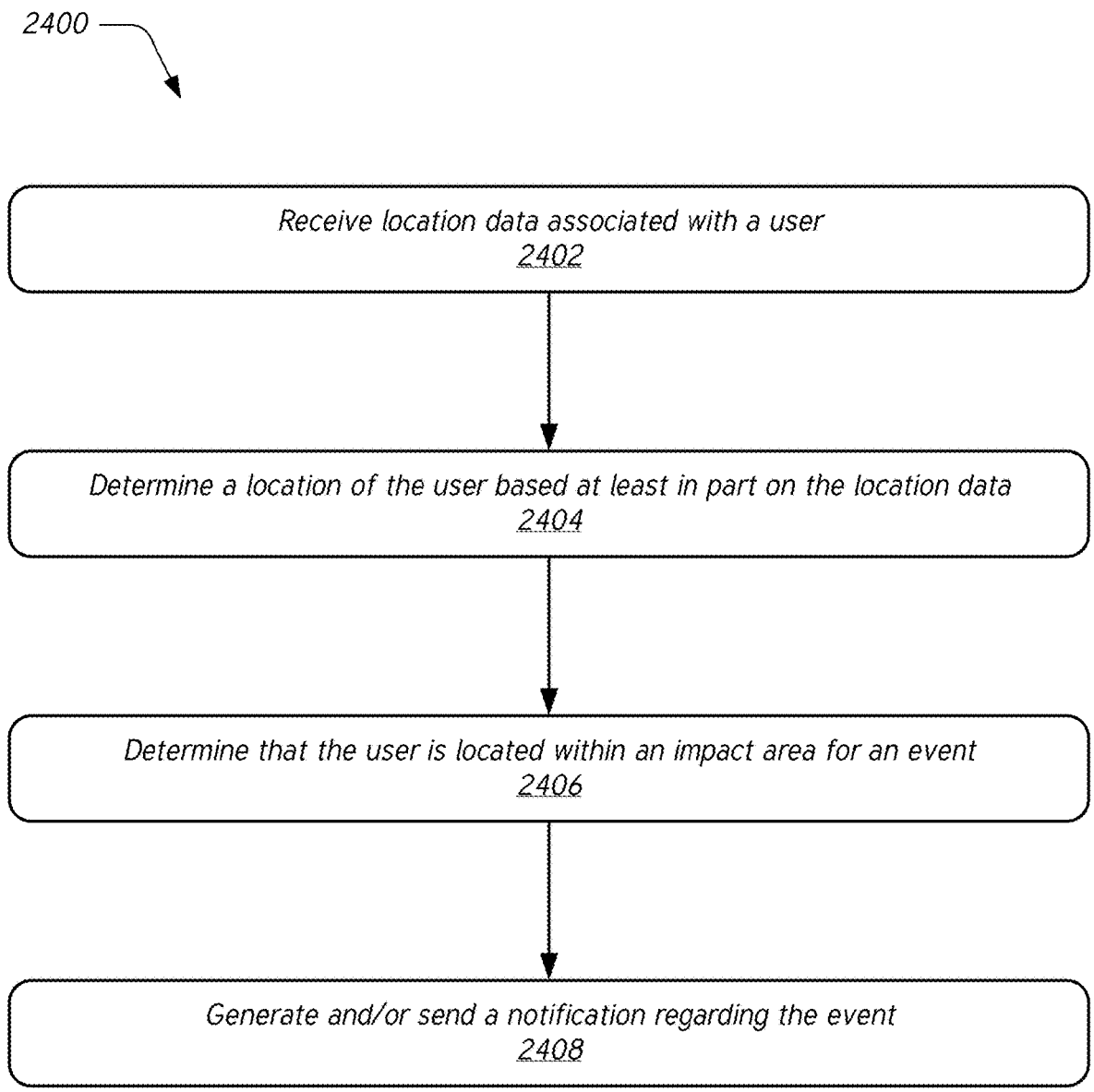
FIG. 24 illustrates a process flow of providing a notification regarding an event based on a location of a user in accordance with various embodiments.

FIG. 24 illustrates a process flow 2400 of providing a notification regarding an event based on a location of a user in accordance with various embodiments. The process 2400 may be performed by any of the devices discussed herein, such as a service provider system, a client device, a combination thereof, and so on.

At block 2402, location data associated with a user is received. For example, location data may be received from a satellite-based navigation system, client device, a device associated with a cellular network, etc., where the location data indicates a geographical location of a user. In some embodiments, location data indicates a cellular region where a user is located (e.g., a cellular tower with which a user's phone has communicated).

At block 2404, a location of the user is determined based at least in part on the location data. For example, a geographical location of a user may be determined based on the location data received at block 2402.

At block 2406, a user that is located within an impact area for an event is determined. For example, based on a location of a user determined at block 2404, a determination may be made as to whether or not the user is currently located within an impact area associated with an event.

At block 2408, a notification regarding an event is generated and/or sent. For example, based on determining that a user is located within an impact area for an event at block 2406, a notification regarding the event may be sent to the user to notify the user of the event. In some embodiments, a notification may include an evacuation route that is based on a current location of the user.

Figure 25:
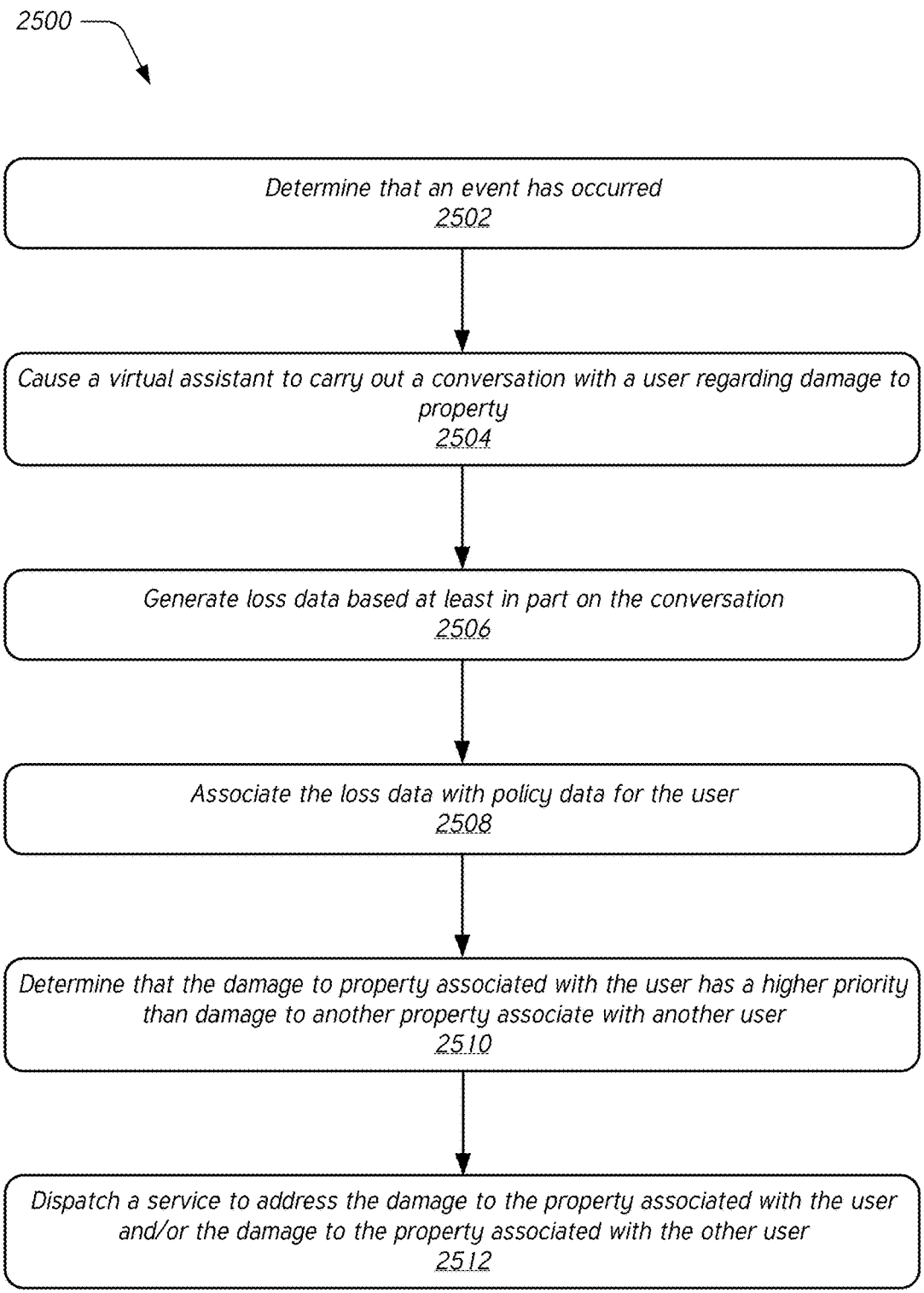
FIG. 25 illustrates a process flow of generating loss data based on a conversation with a virtual assistant and/or dispatching services to address damage to property in accordance with various embodiments.

FIG. 25 illustrates a process flow 2500 of generating loss data based on a conversation with a virtual assistant and/or dispatching services to address damage to property in accordance with various embodiments. The process 2500 may be performed by any of the devices discussed herein, such as a service provider system, a client device, a combination thereof, and so on.

At block 2502, a determination is made that an event has occurred. For example, an indication may be received from one or more sources that an event has occurred.

At block 2504, a virtual assistant is caused to carry out a conversation with the user regarding damage to property associated with the user. For example, based on determining that an event has occurred and/or that the user or property for the user is located in an impact area, a notification may be provided to the user to initiate a conversation with a virtual assistant to assess any damage to the property of the user (e.g., to obtain loss information regarding damage to the property associated with the user).

At block 2506, loss data is generated based at least in part on the conversation. For example, user input, data, or other information may be received from the user during the conversation with the virtual assistant. Such user input, data, or other information may be used to determine loss data indicating damage to property associated with the user.

At block 2508, loss data is associated with policy data for the user. For example, the loss data generated at block 2506 may be associated with policy data for a user (e.g., stored within the policy data).

At block 2510, a determination is made that the damage to property associated with the user has a higher priority than damage to another property associated with another user. For example, it may be determined that damage to property associated with a first user has a higher priority to address than damage to property associated with a second user when an amount of the damage to the property associated with the first user is greater (or less) than an amount of damage to the property associated with the second user, a likelihood that the property associated with the first user is repairable is higher (or lower) than a likelihood that the property associated with the second user is repairable, a type of damage to the property associate with the first user is a more urgent type of damage (e.g., loss of water, gas leak, etc.) than a type of damage to property associated with the second user, etc.

At block 2512, a service is dispatched to address the damage to the property associated with the user and/or the damage to the property associated with the other user. For example, a notification requesting that a property be repaired may be sent to a service, such as the materials and labor service. In some embodiments, services are dispatched in a particular order based on a priority level of repairs, such as based on a determination made at block 2510.

Example System and Device

Figure 26:
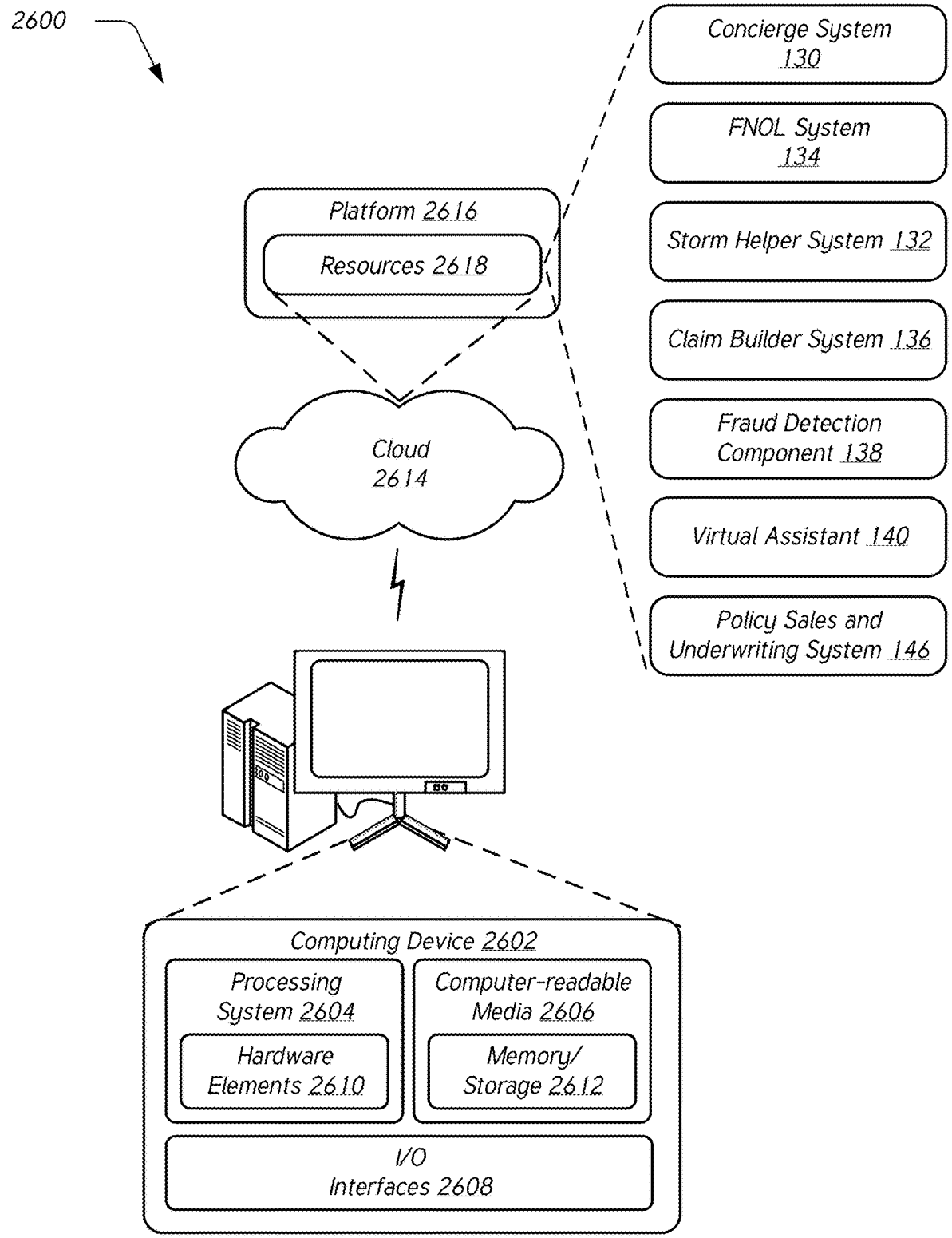
FIG. 26 illustrates an example system including various components of an example device that can be implemented to perform techniques described herein.

FIG. 26 illustrates an example system 2600 that includes an example computing device 2602 that is representative of one or more computing systems, devices, and/or components that may implement the various techniques described herein. This is illustrated through inclusion of the concierge system 130, the storm helper system 132, the FNOL system 134, the claim builder system 136, the fraud detection component 138, the virtual assistant 140, and the policy sales and underwriting system 146. The computing device 2602 may be, for example, a server of a service provider, a device associated with a client (e.g., a client device), an on-chip system, and/or any other suitable computing device or computing system.

The example computing device 2602 as illustrated includes a processing system 2604, one or more computer-readable media 2606, and one or more I/O interface 2608 that are communicatively coupled, one to another. Although not shown, the computing device 2602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines. The computing device 2602 may also include a depth camera to detect distances to objects, surfaces, and so forth in an environment. Such depth data may be analyzed to perform any of the techniques described herein, such as analyzing an environment to determine what the environment "looks like," identifying objects in the environment, etc.

The processing system 2604 is representative of functionality to perform one or more operations using hardware. Accordingly, the processing system 2604 is illustrated as including hardware element 2610 that may be configured as processors, functional blocks, and so forth. This may include implementation in hardware as an application specific integrated circuit or other logic device formed using one or more semiconductors. The hardware elements 2610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The processing system 2604 may include various types of processors, such as one or more central processing units (CPUs), one or more graphics processing units (GPUs), one or more microprocessors, and so forth.

The computer-readable storage media 2606 is illustrated as including memory/storage 2612. The memory/storage 2612 represents memory/storage capacity associated with one or more computer-readable media. The memory/storage component 2612 may include volatile media (such as random access memory (RAM)) and/or nonvolatile media (such as read only memory (ROM), Flash memory, optical disks, magnetic disks, and so forth). The memory/storage component 2612 may include fixed media (e.g., RAM, ROM, a fixed hard drive, and so on) as well as removable media (e.g., Flash memory, a removable hard drive, an optical disc, and so forth). The computer-readable media 2606 may be configured in a variety of other ways as further described below.

Input/output interface(s) 2608 are representative of functionality to allow a user to enter commands and information to computing device 2602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media.

In some embodiments, hardware elements 2610 and computer-readable media 2606 may be representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2610. The computing device 2602 may be configured to implement particular instructions and/or functions corresponding to the software and/or hardware modules. Accordingly, implementation of a module that is executable by the computing device 2602 as software may be achieved at least partially in hardware, e.g., through use of computer-readable storage media and/or hardware elements 2610 of the processing system 2604. The instructions and/or functions may be executable/operable by one or more articles of manufacture (for example, one or more computing devices 2602 and/or processing systems 2604) to implement techniques, modules, and examples described herein.

The techniques described herein may be supported by various configurations of the computing device 2602 and are not limited to the specific examples of the techniques described herein. This functionality may also be implemented all or in part through use of a distributed system, such as over a "cloud" 2614 via a platform 2616 as described below.

The cloud 2614 includes and/or is representative of a platform 2616 for resources 2618. The platform 2616 abstracts underlying functionality of hardware (e.g., servers) and software resources of the cloud 2614. The resources 2618 may include applications and/or data that can be utilized while computer processing is executed on servers that are remote from the computing device 2602. Resources 2618 can also include services provided over the Internet and/or through a subscriber network, such as a cellular or Wi-Fi network.

The platform 2616 may abstract resources and functions to connect the computing device 2602 with other computing devices. The platform 2616 may also serve to abstract scaling of resources to provide a corresponding level of scale to encountered demand for the resources 2618 that are implemented via the platform 2616. Accordingly, in an interconnected device embodiment, implementation of functionality described herein may be distributed throughout the system 2600. For example, the functionality may be implemented in part (or entirely) on the computing device 2602 as well as via the platform 2616 that abstracts the functionality of the cloud 2614.

Example Clauses

Example A, a notification system comprising: one or more processors; and memory communicatively coupled to the one or more processors and storing executable instructions that, when executed by the one or more processors, cause the one or more processors to perform operations comprising: causing display of a user interface that includes a map of a geographical area, an event visual representation representing an event, and an impact visual representation indicating an impact area where the event is estimated to impact, the event including at least one of a hurricane, a tornado, a fire, a flood, or an earthquake; receiving a request to notify users associated with the impact area; retrieving policy data for individual ones of multiple users associated with the impact area, the policy data including information about an insurance policy for individual ones of the multiple users associated with the impact area; generating, for individual ones of the multiple users associated with the impact area and based at least in part on the policy data for individual ones of the multiple users associated with the impact area, a customized notification regarding the event; and sending, for individual ones of the multiple users associated with the impact area, the respective customized notification to a respective client device associated with the respective user to initiate a conversation using a virtual assistant.

Example B, the notification system of Example A, wherein the operations further comprise: retrieving preference data indicating preferences of a first user of the multiple users for receiving notifications; determining a platform to use when sending the customized notification to the first user based at least in part on the preference data, the platform including at least one of an email platform, a text messaging platform, a social media platform, or a telephone platform; and determining a type of content to include in the customized notification for the first user based at least in part on the preference data; wherein the customized notification for the first user is sent to the first user via the platform, the customized notification for the first user including content that is based at least in part on the type of content.

Example C, the notification system of Example A or B, wherein the operations further comprise: receiving location data from a satellite-based navigation system; determining a current location of a first user of the multiple users based at least in part on the location data; and determining that the first user is located within the impact area based at least in part on the current location of the first user; wherein the customized notification is sent to the first user based at least in part on determining that the first user is located within the impact area.

Example D, the notification system of any of Examples A-C, wherein the operations further comprise: receiving location data from a satellite-based navigation system; determining a current location of a first user of the multiple users based at least in part on the location data; and determining an evacuation route for the first user based at least in part on the current location of the first user; wherein the customized notification for the first user indicates the evacuation route.

Example E, the notification system of any of Examples A-D, wherein the operations further comprise: determining that the event has occurred in the impact area; based at least in part on determining that the event has occurred in the impact area, causing the virtual assistant to carry out a first damage assessment conversation with a first user of the multiple users to obtain first loss information regarding damage to a property associated with the first user; associating the first loss information with the policy data for first user; based at least in part on determining that the event has occurred in the impact area, causing the virtual assistant to carry out a second damage assessment conversation with a second user of the multiple users to obtain second loss information regarding damage to a property associated with the second user; and associating the second loss information with the policy data for the second user.

Example F, the notification system of any of Examples A-E, wherein the operations further comprise: based at least in part on the policy data for the first user and the policy data for the second user, determining that the damage to the property associated with the first user has a higher priority than the damage to the property associated with the second user; and dispatching a service to address the damage to the property associated with the first user.

Example G, the notification system of any of Examples A-F, wherein determining that the damage to the property associated with the first user has a higher priority than the damage to the property associated with the second user is based on at least one of: an amount of damage to the property associated with the first user and an amount of damage to the property associated with the second user; a likelihood that that the property associated with the first user is repairable and a likelihood that the property associated with the second user is repairable; or a type of damage to the property associated with the first user and a type of damage to the property associated with the second user.

Example H, the notification system of any of Examples A-G, wherein the operations further comprise: receiving a digital image depicting property associated with a first user of the multiple users; analyzing the digital image to identify damage to the property; generating loss data based at least in part on the identified damage, the loss data indicating the damage to the property; and storing the loss data with the policy data for the first user.

Example I, a method of providing a notification regarding an event, the method comprising: displaying a user interface that includes a map of a geographical area, an event visual representation representing an event, and an impact visual representation indicating an impact area where the event is estimated to impact, the event including at least one of a hurricane, a tornado, a fire, a flood, or an earthquake; receiving, by a system that includes one or more processors, a request to notify users associated with the impact area; obtaining, by the system and from an insurance management system, policy data for individual ones of multiple users associated with the impact area, the policy data including information about an insurance policy for individual ones of the multiple users; generating, by the system and for individual ones of the multiple users associated with the impact area and based at least in part on the policy data for individual ones of the multiple users associated with the impact area, a notification regarding the event; and sending, by the system and for individual ones of the multiple users associated with the impact area, the respective notification to a respective client device associated with the respective user to initiate a conversation using a virtual assistant.

Example J, the method of Example I, further comprising: retrieving preference data indicating preferences of a first user of the multiple users for receiving notifications; determining a platform to use when sending the notification to the first user based at least in part on the preference data, the platform including at least one of an email platform, a text messaging platform, a social media platform, or a telephone platform; and determining a type of content to include in the notification for the first user based at least in part on the preference data; wherein the notification for the first user is sent to the first user via the platform, the notification for the first user including content that is based at least in part on the type of content.

Example K, the method of Example I or J, further comprising: determining that the event has occurred in the impact area; based at least in part on determining that the event has occurred in the impact area, causing the virtual assistant to carry out a first damage assessment conversation with a first user of the multiple users to obtain first loss information regarding damage to a property associated with the first user; associating the first loss information with the policy data for first user; based at least in part on determining that the event has occurred in the impact area, causing the virtual assistant to carry out a second damage assessment conversation with a second user of the multiple users to obtain second loss information regarding damage to a property associated with the second user; and associating the second loss information with the policy data for the second user.

Example L, the method of any of Examples I-K, further comprising: based at least in part on the policy data for the first user and the policy data for the second user, determining that the damage to the property associated with the first user has a higher priority than the damage to the property associated with the second user; and dispatching services to address the damage to the property associated with the first user.

Example M, the method of any of Examples I-L, further comprising: receiving a digital image depicting property associated with a first user of the multiple users; analyzing the digital image to identify damage to the property; generating loss data based at least in part on the identified damage, the loss data indicating the damage to the property; and storing the loss data with the policy data for the first user.

Example N, the method of any of Examples I-M, wherein the conversation comprises a first conversation and the method further comprises: based at least in part on the loss data, causing a virtual assistant to conduct a second conversation with the first user; receiving, during the second conversation, information regarding the damage to the property; and verifying the information by comparing the information to the loss data.

Example O, the method of any of Examples I-N, further comprising: determining a behavior profile for a first user of the multiple users, the behavior profile including preferences of the user for receiving information; storing property information for property of the first user; updating the property information according to a schedule and responsive to a maintenance event occurring that involves the property; generating a maintenance notification based on at least one of the schedule or the occurrence of the maintenance event; and sending the maintenance notification according to the behavior profile of the first user.

Example P, the method of any of Examples I-O, further comprising: determining preferences of a first user of the multiple users for receiving notifications regarding events that cause damage to property; receiving an indication that the event has occurred; retrieving event information regarding the event from one or more sources; and determining an accuracy of the event information and a relevance of the event information for the first user based at least in part on the preferences of the first user; wherein the notification for the first user is generated based at least in part on the accuracy of the event information and the relevance of the event information for the first user.

Example Q, one or more non-transitory computer-readable media storing executable instructions that, when executed by one or more processors, cause the one or more processors to perform operations comprising: providing for display a user interface that includes a map of a geographical area, an event visual representation representing an event, and an impact visual representation indicating an impact area where the event is estimated to impact, the event including at least one of a hurricane, a tornado, a fire, a flood, or an earthquake; receiving a request to notify users associated with the impact area; determining that a first user and a second user are associated with the impact area; retrieving first policy data for the first user and second policy data for the second user, the first policy data including information about an insurance policy for first user and the second policy data including information about an insurance policy for the second user; generating a first customized notification regarding the event based at least in part on the first policy data and a second customized notification regarding the event based at least in part on the second policy data; and sending the first customized notification to a first client device associated with the first user and the second customized notification to a second client device associated with the second user.

Example R, the one or more non-transitory computer-readable media of Example Q, wherein the operations further comprise: determining that the event has occurred in the impact area; based at least in part on determining that the event has occurred in the impact area, causing a virtual assistant to carry out a conversation with the first user to obtain loss information regarding damage to a property associated with the first user; and associating the loss information with the first policy data for the first user.

Example S, the one or more non-transitory computer-readable media of Example Q or R, wherein the causing the virtual assistant to carry out the conversation with the first user comprises: receiving user input data during the conversation; and performing one or more natural language processing techniques to determine the loss information to associate with the first policy data for the first user.

Example T, the one or more non-transitory computer-readable media of any of Examples Q-S, wherein the operations further comprise: receiving, from the first client device, a digital image depicting property; analyzing the digital image to identify damage to the property; generating loss data based at least in part on the identified damage; and storing the loss data with the first policy data for the first user.

Although the disclosure has been described in language specific to structural features and/or methodological acts, it is to be understood that the features defined in the appended claims is not necessarily limited to the specific features or acts described. Rather, the specific features and acts are disclosed as example forms of implementing the claimed features.

What is claimed is:

1. One or more non-transitory computer-readable media storing executable instructions that, when executed by one or more processors, cause the one or more processors to perform operations comprising:
   receiving a request to notify users associated with an impact area where an event is estimated to impact, the event including at least one of a hurricane, a tornado, a fire, a flood, or an earthquake;
   retrieving first policy data for a first user and second policy data for a second user, the first policy data including information about an insurance policy for the first user and the second policy data including information about an insurance policy for the second user;
   based at least in part on the first policy data for the first user and the second policy data for the second user, determining that the first user and the second user are associated with the impact area;
   generating a first customized notification regarding the event based at least in part on the first policy data and a second customized notification regarding the event based at least in part on the second policy data;
   sending the first customized notification to the first user and the second customized notification to the second user;
   determining that the event has occurred in the impact area;
   causing a virtual assistant to carry out a first conversation with the first user;
   receiving first user input data regarding damage to property associated with the first user;
   receiving, from a first client device associated with the first user, a digital image depicting the property associated with the first user;
   processing, using one or more natural language processing techniques, the first user input data to identify one or more terms;
   analyzing, using one or more machine trained algorithms, the digital image to identify one or more objects in the digital image that relate to the one or more terms;
   generating output for the virtual assistant based at least in part on the analysis of the digital image;

causing the virtual assistant to provide the output to the first user;
receiving second user input data regarding the damage to the property;
based at least in part on the second user input data, updating the one or more machine trained algorithms; and
based at least in part on the second user input data, generating data regarding a claim for the property.

2. The one or more non-transitory computer-readable media of claim 1, wherein the operations further comprise determining a first platform that is currently being used by the first user by determining at least one of a device or an application that is currently being used by the first user.

3. The one or more non-transitory computer-readable media of claim 1, wherein the operations further comprise:
generating loss data based at least in part on the damage to the property; and
storing the loss data with the first policy data for the first user.

4. The one or more non-transitory computer-readable media of claim 1, wherein the operations further comprise:
determining that the damage to the property associated with the first user has a higher priority than damage to property associated with the second user; and
dispatching services to address the damage to the property associated with the first user.

5. A method comprising:
receiving, by one or more processors, a request to notify users associated with an impact area where an event is estimated to impact, the event including at least one of a hurricane, a tornado, a fire, a flood, or an earthquake;
retrieving, by the one or more processors, first policy data for a first user and second policy data for a second user, the first policy data including information about an insurance policy for the first user and the second policy data including information about an insurance policy for the second user;
based at least in part on the first policy data for the first user and the second policy data for the second user, determining that the first user and the second user are associated with the impact area;
generating, by the one or more processors, a first customized notification regarding the event based at least in part on the first policy data and generating a second customized notification regarding the event based at least in part on the second policy data;
sending, by the one or more processors, the first customized notification to the first user and the second customized notification to the second user;
determining, by the one or more processors, that the event has occurred in the impact area;
causing, by the one or more processors, a virtual assistant to carry out a first conversation with the first user;
receiving first user input data regarding damage to property associated with the first user;
receiving, from a first client device associated with the first user, a digital image depicting the property associated with the first user;
processing, by the one or more processors and using one or more natural language processing techniques, the first user input data to identify one or more terms;
analyzing, by the one or more processors and using one or more machine trained algorithms, the digital image to identify one or more objects in the digital image that relate to the one or more terms;
generating, by the one or more processors, output for the virtual assistant based at least in part on the analysis of the digital image;
causing, by the one or more processors, the virtual assistant to provide the output to the first user;
receiving second user input data regarding the damage to the property;
based at least in part on the second user input data, updating the one or more machine trained algorithms; and
based at least in part on the second user input data, generating data regarding a claim for the property.

6. The method of claim 5, further comprising:
retrieving preference data indicating preferences of the first user for receiving notifications;
determining a platform to use when sending the first customized notification to the first user based at least in part on the preference data, the platform including at least one of an email platform, a text messaging platform, a social media platform, or a telephone platform; and
determining a type of content to include in the first customized notification for the first user based at least in part on the preference data;
wherein the first customized notification for the first user is sent to the first user via the platform, the first customized notification for the first user including content that is based at least in part on the type of content.

7. The method of claim 5, further comprising:
determining first loss information regarding the damage to the property associated with the first user;
associating the first loss information with the first policy data for the first user;
causing the virtual assistant to carry out a second conversation with the second user to obtain second loss information regarding damage to a property associated with the second user; and
associating the second loss information with the second policy data for the second user.

8. The method of claim 5, further comprising:
determining that the damage to the property associated with the first user has a higher priority than damage to property associated with the second user; and
dispatching services to address the damage to the property associated with the first user.

9. The method of claim 5, further comprising:
storing the data regarding the claim for the property with the first policy data for the first user.

10. The method of claim 5, further comprising:
receiving, during at least one of the first conversation or a second conversation, information regarding the damage to the property; and
verifying the information regarding the damage to the property by comparing the information to previously identified loss data for the property.

11. The method of claim 5, further comprising:
determining a behavior profile for the first user, the behavior profile including preferences of the first user for receiving information;
storing property information for the property of the first user;
updating the property information according to a schedule and responsive to a maintenance event occurring that involves the property;

generating a maintenance notification based on at least one of the schedule or the occurrence of the maintenance event; and sending the maintenance notification according to the behavior profile of the first user.

12. The method of claim 5, further comprising:

determining preferences of the first user for receiving notifications regarding events that cause damage to property;

retrieving event information regarding the event from one or more sources; and determining an accuracy of the event information and a relevance of the event information for the first user based at least in part on the preferences of the first user;

wherein the first customized notification for the first user is generated based at least in part on the accuracy of the event information and the relevance of the event information for the first user.

13. A system comprising:

one or more processors; and memory communicatively coupled to the one or more processors and storing executable instructions that, when executed by the one or more processors, cause the one or more processors to perform operations comprising:

receiving a request to notify users associated with an impact area where an event is estimated to impact, the event including at least one of a hurricane, a tornado, a fire, a flood, or an earthquake;

receiving first policy data for a first user and second policy data for a second user, the first policy data including information about an insurance policy for the first user and the second policy data including information about an insurance policy for the second user;

based at least in part on the first policy data for the first user and the second policy data for the second user, determining that the first user and the second user are associated with the impact area;

generating a first notification regarding the event based at least in part on the first policy data and generating a second notification regarding the event based at least in part on the second policy data;

sending the first notification to the first user and the second notification to the second user;

determining that the event has occurred;

causing a virtual assistant to carry out a first conversation with the first user;

receiving first user input data regarding damage to property associated with the first user;

receiving, from a first client device associated with the first user, a digital image depicting the property associated with the first user;

processing, using one or more natural language processing techniques, the first user input data to identify one or more terms;

analyzing, using one or more machine trained algorithms, the digital image to identify one or more objects in the digital image that relate to the one or more terms;

generating output for the virtual assistant based at least in part on the analysis of the digital image;

causing the virtual assistant to provide the output to the first user;

receiving second user input data regarding the damage to the property;

based at least in part on the second user input data, updating the one or more machine trained algorithms; and based at least in part on the second user input data, generating data regarding a claim for the property.

14. The system of claim 13, wherein the operations further comprise:

receiving location data from a satellite-based navigation system;

determining a current location of the first user based at least in part on the location data;

wherein the determining that the first user is associated with the impact area is based at least in part on the current location of the first user.

15. The system of claim 13, wherein the operations further comprise:

receiving location data from a satellite-based navigation system;

determining a current location of the first user based at least in part on the location data; and determining an evacuation route for the first user based at least in part on the current location of the first user;

wherein the first notification for the first user indicates the evacuation route.

16. The system of claim 13, wherein the operations further comprise:

determining that the damage to the property associated with the first user has a higher priority than damage to a property associated with the second user based on at least one of:

an amount of damage to the property associated with the first user and an amount of damage to the property associated with the second user;

a likelihood that that the property associated with the first user is repairable and a likelihood that the property associated with the second user is repairable; or a type of damage to the property associated with the first user and a type of damage to the property associated with the second user.

17. The system of claim 13, wherein the operations further comprise:

dispatching a service to address the damage to the property associated with the first user.

18. The system of claim 13, wherein the operations further comprise:

determining a behavior profile for the first user, the behavior profile indicating a preference of the first user for receiving information;

storing property information for the property of the first user;

updating the property information according to a schedule and based at least in part on a maintenance event occurring that involves the property;

generating a maintenance notification based on at least one of the schedule or the occurrence of the maintenance event; and sending the maintenance notification according to the behavior profile of the first user.

19. The system of claim 13, wherein the operations further comprise:

determining a preference of the first user for receiving notifications regarding events that cause damage to property;

retrieving event information regarding the event from one or more sources; and determining an accuracy of the event information and a relevance of the event information for the first user based at least in part on the preference of the first user;

wherein the first notification for the first user is generated based at least in part on the accuracy of the event information and the relevance of the event information for the first user.

\* \* \* \* \*